(12) United States Patent
Tsukihara et al.

(10) Patent No.: US 7,109,435 B2
(45) Date of Patent: Sep. 19, 2006

(54) BEAM IRRADIATOR AND LASER ANNEAL DEVICE

(75) Inventors: Koichi Tsukihara, Kanagawa (JP); Koichi Tatsuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 201 days.

(21) Appl. No.: 10/467,518

(22) PCT Filed: Nov. 26, 2002

(86) PCT No.: PCT/JP02/12340

§ 371 (c)(1),
(2), (4) Date: Jan. 30, 2004

(87) PCT Pub. No.: WO03/049175

PCT Pub. Date: Jun. 12, 2003

(65) Prior Publication Data

US 2004/0120050 A1    Jun. 24, 2004

(30) Foreign Application Priority Data

Dec. 7, 2001 (JP) .............................. 2001-374922

(51) Int. Cl.
*B23K 26/067* (2006.01)
*H01L 21/268* (2006.01)

(52) U.S. Cl. .......................... 219/121.65; 219/121.76; 359/618; 359/629

(58) Field of Classification Search ........... 219/121.76, 219/121.77, 121.65, 121.66, 121.73; 359/618, 359/627, 629, 630, 633; 372/9, 29.02; 438/487
See application file for complete search history.

(56) References Cited

U.S. PATENT DOCUMENTS

| | | | |
|---|---|---|---|
| 4,733,944 A * | 3/1988 | Fahlen et al. ................ 359/624 |
| 5,003,543 A | 3/1991 | Morsell | |
| 5,005,969 A | 4/1991 | Kataoka | |
| 5,071,225 A | 12/1991 | Inoue | |
| 5,303,084 A * | 4/1994 | Pflibsen et al. .............. 359/503 |
| 5,440,423 A * | 8/1995 | Ogura ......................... 359/365 |
| 5,502,001 A * | 3/1996 | Okamoto .................... 438/798 |
| 6,031,201 A * | 2/2000 | Amako et al. ......... 219/121.68 |
| 6,229,639 B1 * | 5/2001 | Ozarski et al. ............. 359/223 |
| 6,335,509 B1 * | 1/2002 | Jung ..................... 219/121.77 |
| 6,548,781 B1 * | 4/2003 | Brunwinkel ........... 219/121.73 |

(Continued)

FOREIGN PATENT DOCUMENTS

EP    0 785 473 A2    7/1997

(Continued)

*Primary Examiner*—Samuel M. Heinrich
(74) *Attorney, Agent, or Firm*—Sonnenschein Nath & Rosenthal LLP

(57) ABSTRACT

According to the present invention, a laser annealing apparatus (10) includes a beam splitter (14) composed of first and second beam splitters (21, 22) disposed in parallel to each other to split one laser beam into four laser beams not interfering with each other, and a reflecting mirror (23). Upon the second beam splitter (22), there are incident a transmitted beam from the first beam splitter (21) and a laser beam outgoing from the first beam splitter (21) and then reflected by the reflecting mirror (23). The second beam splitter (22) provides two transmitted beams to outside, and the reflecting mirror (23) reflects the reflected beam from the second beam splitter (22) for traveling to outside. The distance between the two beam splitters (21 and 22), and the distance between the first beam splitter (21) and reflecting mirror (23), is larger than $L/(2 \cos \theta)$ (where $\theta$ is an incident angle and L is a coherence length).

45 Claims, 29 Drawing Sheets

| U.S. PATENT DOCUMENTS | | | | |
|---|---|---|---|---|
| 6,573,162 B1* | 6/2003 | Tanaka et al. | | 438/487 |
| 6,693,257 B1* | 2/2004 | Tanaka | | 219/121.76 |
| 6,710,293 B1* | 3/2004 | Liu et al. | | 219/121.73 |
| 6,813,000 B1* | 11/2004 | Nishi | | 355/53 |
| 6,856,630 B1* | 2/2005 | Tanaka | | 372/9 |
| 6,943,086 B1* | 9/2005 | Hongo et al. | | 438/308 |
| 2001/0005606 A1 | 6/2001 | Tanaka | | |
| 2001/0016430 A1* | 8/2001 | Nakano et al. | | 438/788 |
| 2004/0126674 A1* | 7/2004 | Taniguchi et al. | | 430/5 |
| 2004/0158849 A1* | 8/2004 | Miyaoka | | 720/718 |

| FOREIGN PATENT DOCUMENTS | | |
|---|---|---|
| JP | 01-287924 | 11/1989 |
| JP | 03-203715 | 9/1991 |
| JP | 04-76553 | 3/1992 |
| JP | 05-506748 | 9/1993 |
| JP | 06-29177 | 2/1994 |
| JP | 08-82711 | 3/1996 |
| JP | 09-213628 | 8/1997 |
| JP | 2001-244213 | 9/2001 |

* cited by examiner

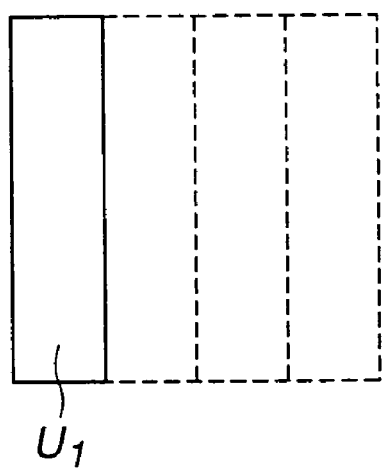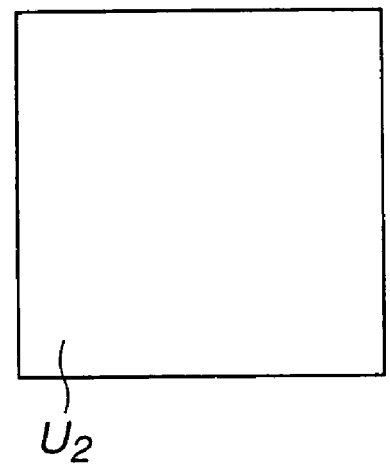
FIG.10A FIG.10B

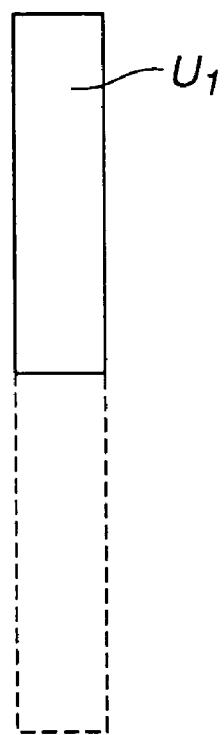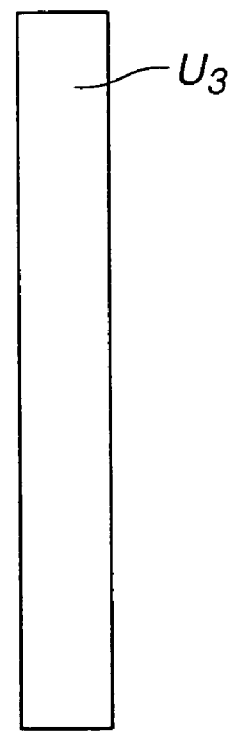
FIG.14A     FIG.14B

BEAM IRRADIATOR AND LASER ANNEAL DEVICE

TECHNICAL FIELD

The present invention relates to a laser annealing apparatus used in production of a thin film transistor including a channel layer formed from polysilicone and in other similar production, a light irradiator applied in the laser annealing apparatus or the like, and an optical multiplexer applied in the laser annealing apparatus or the like.

This application claims the priority of the Japanese Patent Application No. 2001-374922 filed on Dec. 7, 2001, the entirety of which is incorporated by reference herein.

BACKGROUND ART

Recently, in a thin film transistor used in a liquid crystal display (LCD) and the like, a polysilicone film having a high carrier mobility is used as a channel layer. The polysilicone film in the thin film transistor is produced by forming an amorphous silicone over a glass substrate and annealing the amorphous silicone by irradiating a laser beam to the latter. An apparatus to anneal a substance by irradiating a laser beam to the latter is called "laser annealing apparatus".

Conventionally, the laser annealing apparatus used in production of the thin film transistor employs, as the light source, the excimer laser which can emit a high power, ultraviolet-region laser beam. FIG. 1 schematically illustrates the construction of a conventional laser annealing apparatus using the excimer laser as the light source.

As shown in FIG. 1, the conventional laser annealing apparatus generally indicated with a reference 200 includes a stage 202 on which a substrate 201 to be annealed is mounted, a laser source 203 which emits a laser beam, a telescope 204 which shapes the laser beam emitted from the laser source 203 into a parallel beam having a predetermined diameter, first and second fly-eye lenses 205 and 206 which split the laser beam coming from the telescope 204 into a plurality of beams and then condense them together into a group of point light sources, and a condenser lens 207 which multiplex the plurality of laser beams having coming from the second fly-eye lens 206 and irradiate them onto a predetermined area on the substrate 201.

In the above conventional laser annealing apparatus 200, a single laser beam is split by the first and second fly-eye lenses 205 and 206 into a plurality of secondary light sources, and a plurality of laser beams from the secondary light sources are irradiated to the predetermined area on the substrate 201. Generally, in case a single laser beam is irradiated as it is to the substrate 201, the intensity distribution will be a Gaussian distribution so that the substrate 201 cannot homogeneously be given the light energy. In the conventional laser annealing apparatus 200, however, the laser beam can be irradiated to the substrate 201 with the intensity thereof being homogeneously distributed by splitting the laser beam by the first and second fly-eye lenses 205 and 206 and then multiplexing the split beams together.

By making the laser annealing of the substrate 201 with the laser beam having the intensity thereof thus homogeneously distributed, the laser energy can be given homogeneously to the surface of the substrate 201 and a polysilicone film having a uniform particle size can be produced.

Note however that the excimer laser used as the light source in the conventional laser annealing apparatus is not easy to handle because the output is not stable. On this account, the light or laser source for use in the laser annealing apparatus should preferably be an ultraviolet-region solid-state or semiconductor laser or the like which can provide a stable laser beam energy and has a long life.

However, the laser beam emitted from such a solid-state or semiconductor laser is highly coherent as compared with a laser beam emitted from the excimer laser. Therefore, in case a solid-state or semiconductor laser is adopted as the laser source 203, the laser beams provided as the plurality of secondary light sources by splitting the single laser beam by the first and second fly-eye lenses 205 and 206 will interfere with each other when they are multiplexed and irradiated to the substrate 201. They will be coherent with each other to result in an interference fringe as shown in FIG. 2. Therefore, even in case the light source in the conventional laser annealing apparatus 200 is replaced with a highly coherent semiconductor or solid-state laser, the laser beam cannot be irradiated to the substrate 201 with the intensity thereof being homogeneously distributed and thus there cannot be produced any polysilicone film in which the particle size is uniform.

Also, in case the solid-state or semiconductor laser or the like is used as the light source in the laser annealing apparatus, only a single light source can hardly provide a sufficient power. On this account, for application of the solid-state or semiconductor laser as the laser source in the laser annealing apparatus, laser beams emitted from a plurality of sources may be multiplexed to produce a laser beam which has a high power and can be irradiated to a wide area. To form a polysilicone film, however, a substrate has to be annealed with a laser beam with a homogeneous intensity distribution in the beam diameter. If not, the crystal particle size will not be uniform and thus a thin film transistor thus produced from the polysilicone film will have no satisfactory characteristic.

DISCLOSURE OF THE INVENTION

Accordingly, the present invention has an object to overcome the above-mentioned drawbacks of the related art by providing a light irradiator capable of irradiating a laser beam, even if highly coherent for example, to an object to be irradiated with the laser beam with the light intensity being homogeneously distributed.

The present invention has another object to provide a laser annealing apparatus capable of annealing an object as a whole with a highly coherent laser such as a semiconductor laser, solid-state laser or the like with the light intensity being distributed homogeneously distributed.

The present invention has still another object to provide an optical multiplexer simply constructed and capable of multiplexing a plurality of laser beams, and also a light irradiator simply constructed and capable of multiplexing a plurality of laser beams and irradiating the laser beams to an object to be irradiated with the laser beams with the light intensity being homogeneously distributed.

The above object can be attained by providing a light irradiator and laser annealing apparatus including, according to the present invention, a laser source which emits a laser beam; a beam splitting means for splitting a laser beam emitted from the laser source into a plurality of laser beams; and an irradiating means for receiving the plurality of laser beams incident thereupon and irradiating the incident laser beams to an object to be irradiated with the laser beams.

According to the present invention, the beam splitting means includes k (k is a natural number larger than 1) beam splitters each having a beam splitting surface which splits an incident laser beam into two laser beams, namely, reflected and transmitted parts, by reflecting and transmitting, the beam splitting surfaces being disposed in parallel to each other, and a reflecting mirror having a light reflecting surface parallel to the beam splitting surface of each beam splitter and upon which the reflected parts from all the beam splitters is incident; the laser beam emitted from the laser source being incident upon the first one, counted from the laser source, of the beam splitters; the laser beam transmitted through the m-th beam splitter and the laser beam reflected by the m-th beam splitter and then by the reflecting mirror being incident upon the (m+1)th (m is a natural number) beam splitter; the k-th beam splitter providing $2^{(k-1)}$ transmitted beams to outside;

the reflecting mirror reflecting $2^{(k-1)}$ reflected parts incident thereupon from the k-th beam splitter to outside; and the distance between the beam splitting surface of the first beam splitter and that of the (m+1)th beam splitter, and the distance between the beam splitting surface of the first beam splitter and the reflecting surface of the reflecting mirror, being adjusted for an optical path difference between $2^k$ outgoing laser beams to be larger than a coherence length of the laser beam emitted from the laser source.

Also the above object can be attained by providing an optical multiplexer and light irradiator includes, according to the present invention, a first optical means with an optical surface which reflects a part of a first coherent beam incident thereupon at one side thereof while allowing the rest of the first coherent beam to pass through, and allows a part of a second coherent beam incident thereupon at the other side thereof to pass through and multiplexes the transmitted part of the second coherent beam and the reflected part of the first coherent beam coaxially to form a first resultant beam while reflecting the rest of the second coherent beam and multiplexing the reflected part of the second coherent beam and the transmitted rest of the first coherent beam coaxially to provide a second resultant beam; and a second optical means with an optical surface provided in parallel to the first optical means to reflect the second resultant beam in a direction parallel to the first resultant beam; the incident angle of the first coherent beam being adjusted; and the optical surfaces of the first and second optical means being disposed such that the optical path difference between the first and second resultant beams is larger than the length of coherence between the first and second coherent beams and the first and second resultant beams are at a predetermined distance from each other.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 10A shows an area radiated with the laser beam in the laser annealing apparatus as the first embodiment of the present invention shown in FIG. 3, and FIG. 10B shows an area radiated with the laser beam in the laser annealing apparatus as the second embodiment of the present invention shown in FIG. 7.

FIG. 14A shows an area radiated with the laser beam in the laser annealing apparatus as the first embodiment of the present invention shown in FIG. 3, FIG. 14B shows an area radiated with the laser beam in the laser annealing apparatus as the third embodiment of the present invention shown in FIG. 11.

BEST MODE FOR CARRYING OUT THE INVENTION (1) FIRST EMBODIMENT

The laser annealing apparatus as the first embodiment of the present invention will be described hereinafter. The laser annealing apparatus is destined to change an amorphous silicone film to a polysilicone film by making a heat treatment of a TFT substrate having the amorphous silicone film formed thereon, for example, by irradiating laser beams to the TFT substrate.

Figure 1:
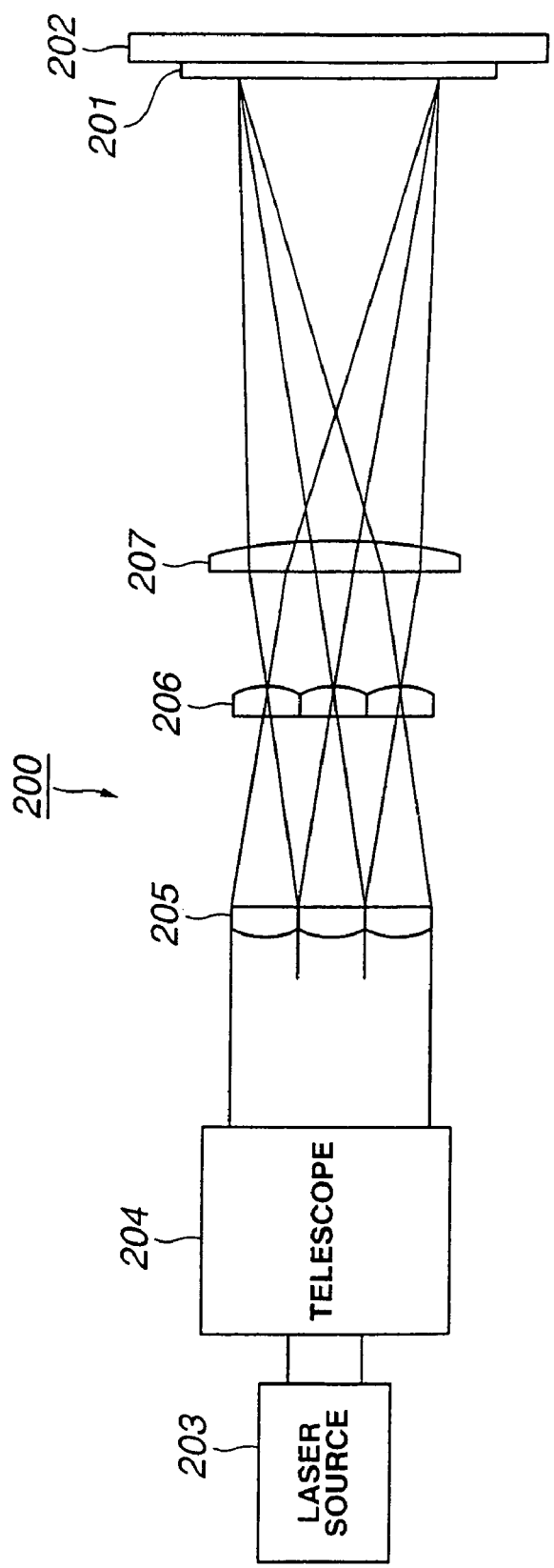
FIG. 1 illustrates the construction of the conventional laser annealing apparatus.
Figure 2:
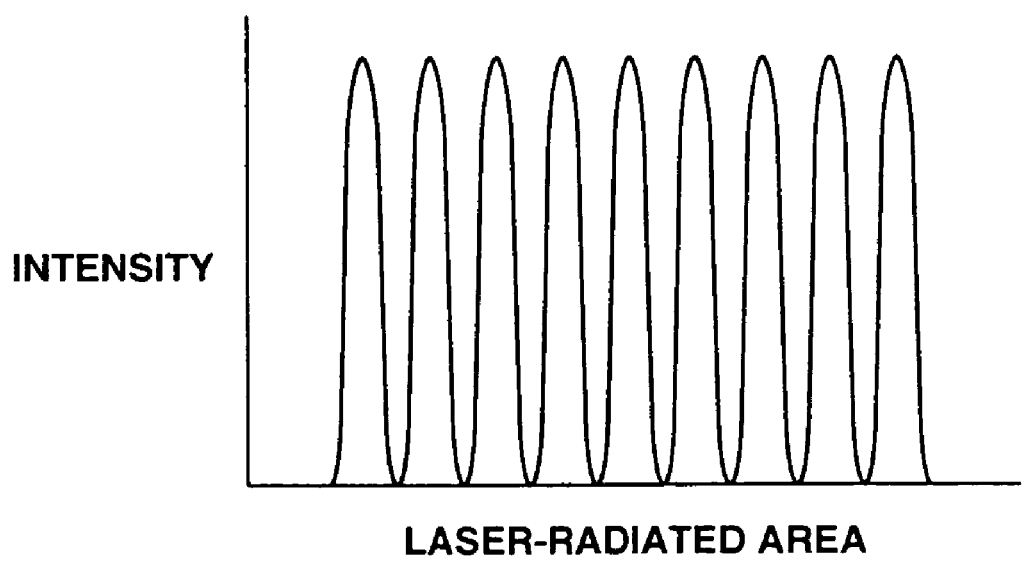
FIG. 2 shows an interference fringe which will take place in case a solid-state laser is used as the light source in the conventional laser annealing apparatus.
Figure 3:
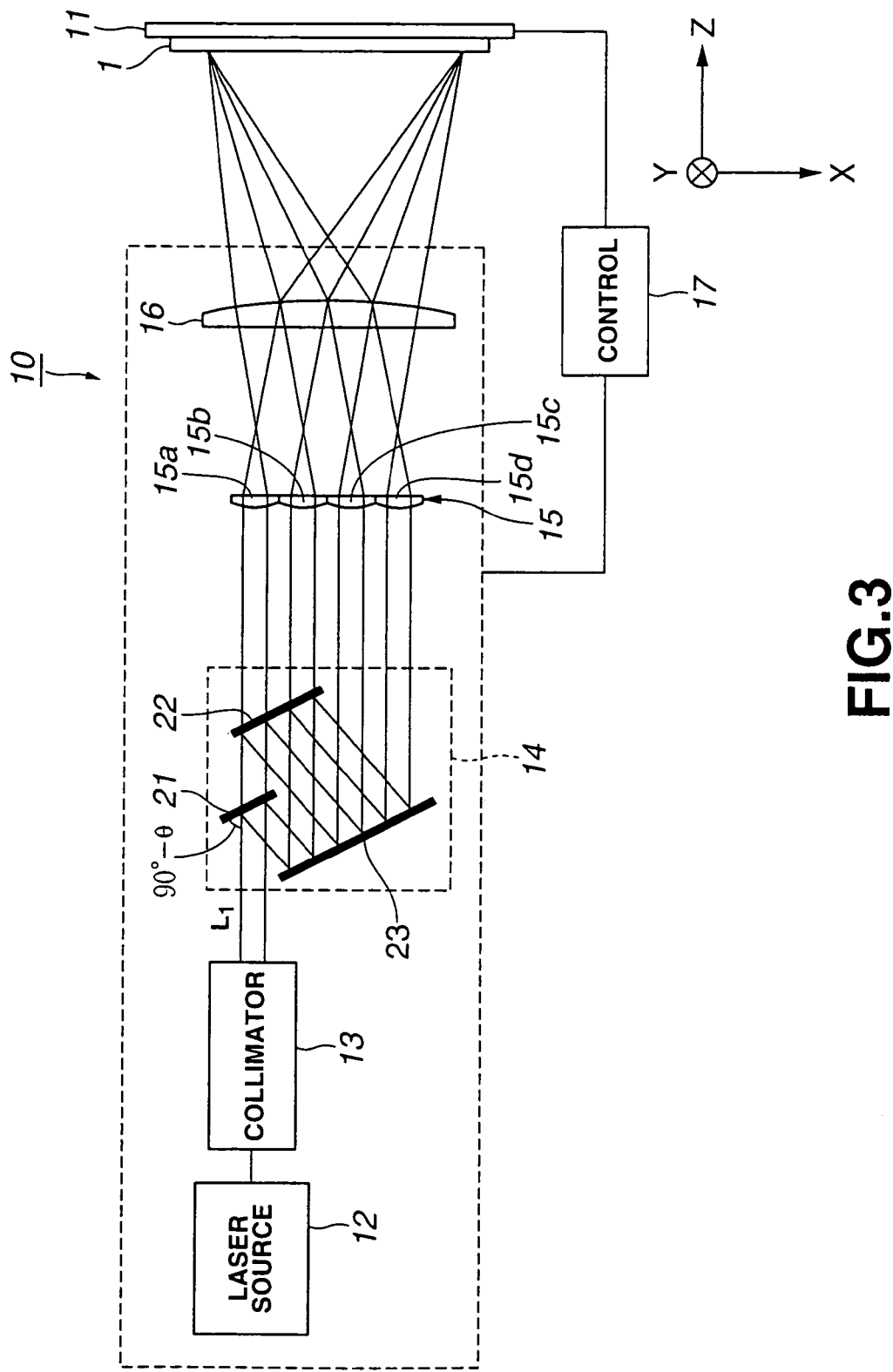
FIG. 3 illustrates the construction of a laser annealing apparatus as a first embodiment of the present invention.

Referring now to FIG. 3, there is schematically illustrated the construction of the laser annealing apparatus as the first embodiment of the present invention. This laser annealing apparatus is generally indicated with a reference 10.

As shown, the laser annealing apparatus 10 includes a stage 11 on which a substrate 1 to be annealed is to be mounted, a laser source 12 which emits a laser beam, a collimator 13 provided on the optical path of a laser beam emitted from the laser source 12, a beam splitter unit 14 which splits a single laser beam coming from the collimator 13 into four laser beams, a lens array 15 composed of four convex lenses, a condenser lens 16 which guides the four laser beams coming from the lens array 15 to a predetermined area on the substrate 1, and a controller 17 which controls the position of the stage 11 and operates otherwise.

The stage 11 has a flat main side on which a flat substrate 1 can be mounted. The substrate 1 mounted on the stage 11 is a TFT substrate having an amorphous silicone film form thereon, for example. The stage 11 is moved in a direction (X and Y directions in FIG. 3) parallel to the main side thereof while holding the substrate 1 on the main side. In the laser annealing apparatus 10, the laser-radiated position can be moved in relation to the substrate 1 by moving the stage 11. That is, the to-be-annealed position on the substrate 1 can be controlled by moving the stage 11. It should be noted that the movement of the stage 11 is controlled by the controller 17.

The laser source 12 is to make pulse oscillation of a laser beam. In the laser annealing apparatus 10 according to the present invention, a solid-state laser is adopted as the laser source 12. The solid-state laser is a solid-state laser material produced by doping rare-earth or transition-metal ions into a base material prepared from a transparent substance such as a crystal, glass or the like except for a semiconductor. When excited with light, the solid-state laser emits a laser beam. Solid-state lasers include a glass laser obtained by doping $Nd^{3+}$ ions in glass (base material), ruby laser obtained by doping $Cr^{3+}$ ions in ruby, YAG laser obtained by doping $Nd^{3+}$ ions in yttrium aluminum garnet (YAG) and the like. Each of such lasers may also be used by changing the wavelength of the laser by a nonlinear optical crystal and the like, for example. Also, it should be noted that according to the present invention, the laser source 12 may be a semiconductor laser or the like, not the solid-state laser.

A laser light emitted from the laser source 12 is incident upon the collimator 13.

The collimator 13 is provided to shape the incident laser beam into a parallel beam having a predetermined diameter. The laser beam from the collimator 13 is incident upon the beam splitter unit 14. It should be noted that the laser beam coming from the collimator 13 may be expanded in diameter by a beam expander.

In the following explanation, a laser beam outgoing from the collimator 13 and incident upon the beam splitter unit 14 will be referred to as "laser beam L1".

The beam splitter unit 14 splits the laser beam L1 into four parallel laser beams equidistant from each other. The four laser beams outgoing from the beam splitter unit 14 are oriented in the X direction shown in FIG. 3, for example. Also, the four laser beams going out from the beam splitter unit 14 are no coherent with each other. In the beam splitter unit 14, the optical paths formed for splitting the laser beam are different in length from one laser beam to another. That is, the optical paths of all the four laser beams, from the inlet port of the beam splitter unit 14, upon which the laser beam L1 is incident, to the outlet port from which the split laser beams outgo, are different from one to another. Further, the distance from one to another of the optical paths is larger than a predetermined coherence length set for the laser source 12. Thus, the laser beams outgoing from the beam splitter unit 14 are not coherent with each other.

Note that the construction of the beam splitter unit 14 will be described in detail later.

The four laser beams going out from the beam splitter unit 14 are incident upon the lens array 15.

The lens array 15 is composed of four convex lenses 15a to 15d disposed equidistantly in line with the four laser beams, respectively, from the beam splitter unit 14 (in the X direction in FIG. 3, for example). The convex lenses 15a to 15d are disposed on the optical paths, respectively, of the four laser beams and at the same intervals as those of the four laser beams coming from the beam splitter unit 14. The lens array 15 condense the four incident laser beams to produce four secondary light sources. The four laser lights coming from the lens array 15 are condensed once to be secondary light sources, and then incident upon the condenser lens 16.

The four laser beams condensed by the lens array 15 are incident upon the condenser lens 16 which will irradiate and multiplexes the four incident laser beams for incidence upon the substrate 1 in the same position on the latter.

Moving the stage 11 in the X-Y direction in FIG. 3, the controller 17 controls the position on the substrate 1 to which the laser beams are to be irradiated.

In the laser annealing apparatus 10 constructed as above, the substrate 1 is mounted on the stage 11. When the laser annealing apparatus 10 is put into operation and the laser annealing is started, a pulsed laser is emitted from the laser source 12.

The laser beam emitted from the laser source 12 passes through the collimator 13 and beam splitter unit 14 as mentioned above to provide four parallel beams not coherent with each other and having the same intensity.

The four laser beams coming from the beam splitter unit 14 are condensed by the lens array 15 to provide four secondary light sources. Four laser beams from the secondary light sources are condensed and multiplexed by the condenser lens 16 for incidence upon the substrate 1 in a predetermined area on the latter.

In the laser annealing apparatus 10, the stage 11 is translated to move the flat substrate 1 in a direction parallel to the main side of the substrate 1 (in the X-Y direction in FIG. 3) and the laser beams are irradiated to over the substrate 1 for annealing the latter.

Figure 4:
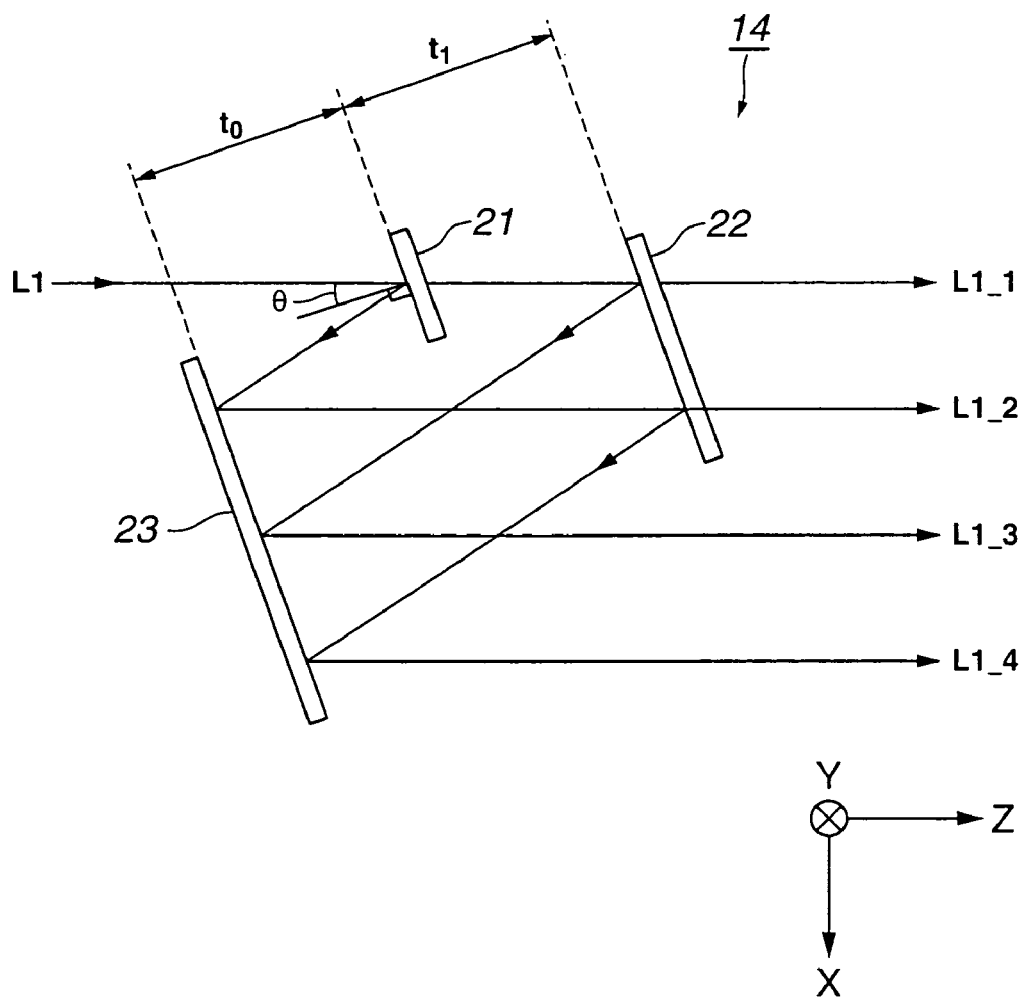
FIG. 4 illustrates the construction of a included in the laser annealing apparatus as the first embodiment of the present invention shown in FIG. 3.

Next, the beam splitter unit 14 will be detailed concerning its construction. FIG. 4 illustrates the construction of the beam splitter unit 14. It should be noted that it is assumed that the optical axis of the laser beam L1 incident upon the beam splitter unit 14 is oriented in the Z direction in FIG. 4. Also, the four laser beams have their respective optical axes oriented also in the Z direction. The Z direction is a direction perpendicular to the main side of the state 11. The four laser beams outgoing from the beam splitter unit 14 are parallel to each other and to a predetermined direction, namely, the X direction in FIG. 4. The X direction is a direction parallel to the main side of the stage 11. It should be noted that the Y direction in FIG. 4 are perpendicular to the X and Z directions.

As shown in FIG. 4, the beam splitter unit 14 includes a first beam splitter ("beam splitter" will be referred to simply as "BS" hereunder) 21 and a second BS 22 disposed to have their flat beam splitting surfaces oriented in the Z direction. The first and second BSs 21 and 22 reflect and allow the laser beam incident upon the beam splitting surfaces to pass through to split the laser beam into two laser beams. The beam splitter unit 14 is designed to split a laser beam at a ratio of 1:1 between transmission and reflection.

The beam splitter unit 14 further includes a mirror 23 having a reflecting surface disposed in parallel to the beam splitting surfaces of the first and second BSs 21 and 22 and which is oriented along with the first and second BSs 21 and 22 in the Z direction. The mirror 23 is provided to reflect laser beams incident upon its flat reflecting surface. As will be seen in the illustration, the mirror 23 is located nearer to the incident position of the laser beam L1 than the first BS 21.

The beam splitting surfaces of the first and second BSs 21 and 22 and the reflecting surface of the mirror 23 are disposed perpendicular to a plane defined by the X and Z axes, and at a predetermined angle (90°−θ) (0°<θ<90°) in relation to the direction of incidence of the laser beam L1 (i.e., Z direction). Namely, the laser beam L1 is incident at an angle θ upon the first and second BSs 21 and 22 at the beam splitting surfaces of the latter.

The first BS 21 is disposed on the optical axis of the laser beam L1. Also, the second BS 22 is disposed on the optical axis of the laser beam L1. The first BS 21 is located and dimensioned such that only the laser beam L1 will be incident thereupon but no other laser beam will. The second BS 22 is located and dimensioned such that the laser beam transmitted through the first BS 21 and the laser beams reflected by the first BS 21 and then by the mirror 23 will be incident thereupon but no other laser beams will. The mirror 23 is located and dimensioned so that the laser beam reflected by the first BS 21 and two laser beams reflected by the second BS 22 will be incident thereupon and it will not intercept the laser beam L1.

Further, the distance t0 between the first BS 21 and mirror 23 is set larger than $L/(2 \cos \theta)$ (where L is the coherence length set for the laser source 12). Also, the distance t1 between the first and second BSs 21 and 22 is also larger than $L/(2 \cos \theta)$ (where L is the coherence length set for the laser source 12).

Because the beam splitter unit 14 is constructed as above, it can provide the four laser beams oriented in parallel to each other in the X direction and not coherent with each other.

More specifically, on the assumption that of the four laser beams outgoing from the beam splitter unit 14, the first one is L1_1, second one is L1_2, third one is L1_3 and the fourth one is L1_4, the four laser beams L1_1 to L1_4 are produced along the following routes. Namely, the first laser beam L1_1 is produced from the laser beam L1 traveling along a route along which it passes through the first BS 21 and then the second BS 22 to outside. The second laser beam L1_2 is produced from the laser beam L1 traveling along a route along which it is reflected by the first BS 21, then by the mirror 23 and passes through the second BS 22 to outside. The third laser beam L13 is produced from the laser beam L1 traveling along a route along which it passes through the first BS 21, reflected by the second BS 22 and then by the mirror 23 to outside. The fourth laser beam L1_4 is produced from the laser beam L1 traveling along a route along which it is reflected by the first BS 21, then by the mirror 23 and further by the second BS 22 and finally by the mirror 23 to outside.

Thus, the four laser beams L1_1 to L1_4 outgoing from the beam splitter unit 14 are produced from the laser beam L1 having traveled along the optical paths, respectively, spaced a distance longer than the coherence length from each other and so they will not be coherent with each other when they are multiplexed at the same position.

That is to say, in comparison in length between the optical path along which the first laser beam $L1_{\_1}$ travels and that along the second laser beam L1_2 travels, the distance t0 between the first BS 21 and mirror 23 is more than $L/(2 \cos \theta)$ (where L is the coherence length), and so the optical path length of the second laser beam L1_2 is longer more than the coherence length L than that of the first laser beam L1_1. In comparison in length between the optical path along which the second laser beam L1_2 travels and that along the third laser beam L1_3 travels, the distance t1 between the first BS 21 and second BS 22 is more than $L/(2 \cos \theta)$ (where L is the coherence length), and so the optical path length of the third laser beam L1_3 is longer more than the coherence length L than that of the second laser beam L1_2. In comparison in length between the optical path along which the third laser beam L1_3 travels and that along the fourth laser beam L1_4 travels, the distance t0 between the first BS 21 and mirror 23 is more than $L/(2 \cos \theta)$ (where L is the coherence length), and so the optical path length of the fourth laser beam L1_4 is longer more than the coherence length L than that of the third laser beam L1_3.

The laser annealing apparatus 10 as the first embodiment of the present invention includes the beam splitter 14 constructed simply as above and which can split a single laser beam into four laser beams not coherent with each other.

Figure 5:
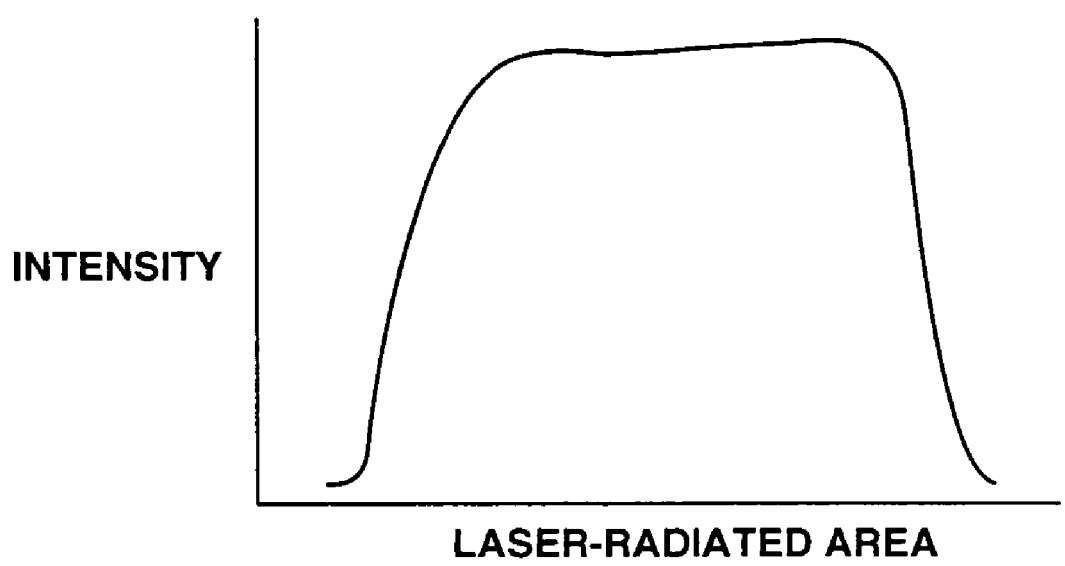
FIG. 5 shows the intensity distribution of laser beam emitted from the laser annealing apparatus as first embodiment of the present invention shown in FIG. 3.

Therefore, in the laser annealing apparatus 10 as the first embodiment of the present invention, the four laser beams having the minimized coherence with each other can be irradiated to the same position on the substrate 1. Thus, in the laser annealing apparatus 10 as the first embodiment, since the four laser beams are not coherent with each other when they are multiplexed on the substrate 1, the substrate 1 can be irradiated with the laser beams with a homogeneous distribution of intensity over an intended area thereof as shown in FIG. 5.

As above, the laser annealing apparatus 10 according to the present invention can give the optical energy homogeneously to the substrate 1 and thus form a polysilicone film uniform in particle size. Namely, with the laser annealing apparatus 10, it is possible to produce a TFT having a good characteristic. For example, when a display device is produced using the TFT, it will be less defective and streaks and luminescent spots will hardly occur on the screen.

Furthermore, the laser annealing apparatus 10 can use a solid-state laser as the laser source 12, the latter can have a longer service life and its output will be more stable. Therefore, the laser annealing apparatus 10 can be used longer and emit laser beams stable in intensity, which contributes much to an improved efficiency of production.

Figure 6:
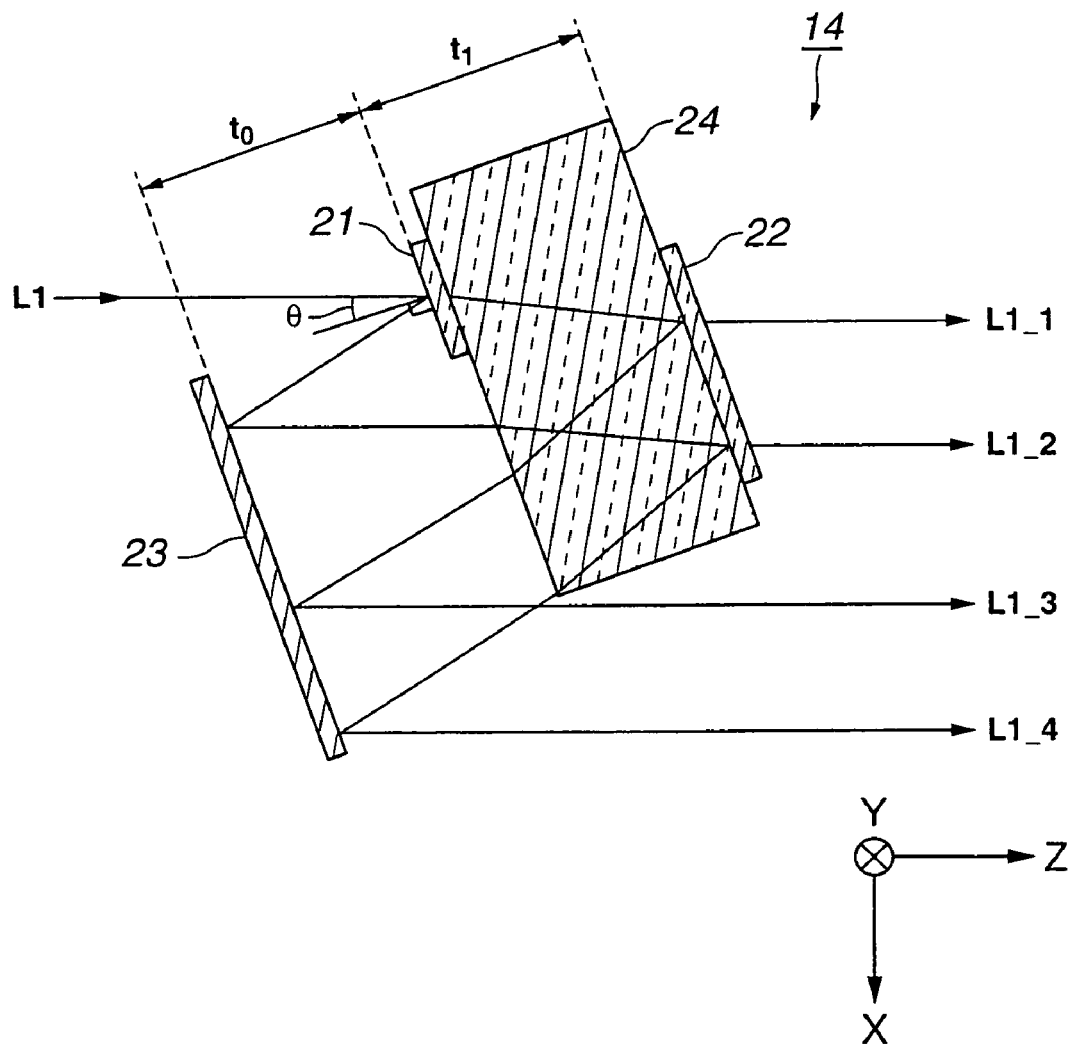
FIG. 6 shows a variant of the beam splitter in the laser annealing apparatus as the first embodiment of the present invention shown in FIG. 3.

Note that as shown in FIG. 6, a light-transmissive member 24 formed from glass for example which allows the laser beam to pass through may be provided inside the beam splitter unit 14 and the first and second BSs 21 and 22 be installed integrally on the light-transmissive member 24. Thereby, it will be easier to adjust the positions of the first an second BSs 21 and 22 and the mirror 23.

(2) SECOND EMBODIMENT

The second embodiment of the present invention will be described hereinafter. Similarly to the aforementioned first embodiment, the laser annealing apparatus as the second embodiment of the present invention is destined to change an amorphous silicone film to a polysilicone film by making a heat treatment of a TFT substrate having the amorphous silicone film formed thereon, for example, by irradiating laser beams to the TFT substrate.

Note that in the following description of the laser annealing apparatus as second embodiment of the present invention, the same or similar parts in the laser annealing apparatus as the second embodiment as or to those in the laser annealing apparatus 10 as the first embodiment of the present invention will be indicated with the same or similar references as used in the explanation of the first embodiment and will not be described in detail any longer. Also, X, Y and Z directions which will be referred to in the explanation of the second embodiment are the same as in the description of the first embodiment.

Figure 7:
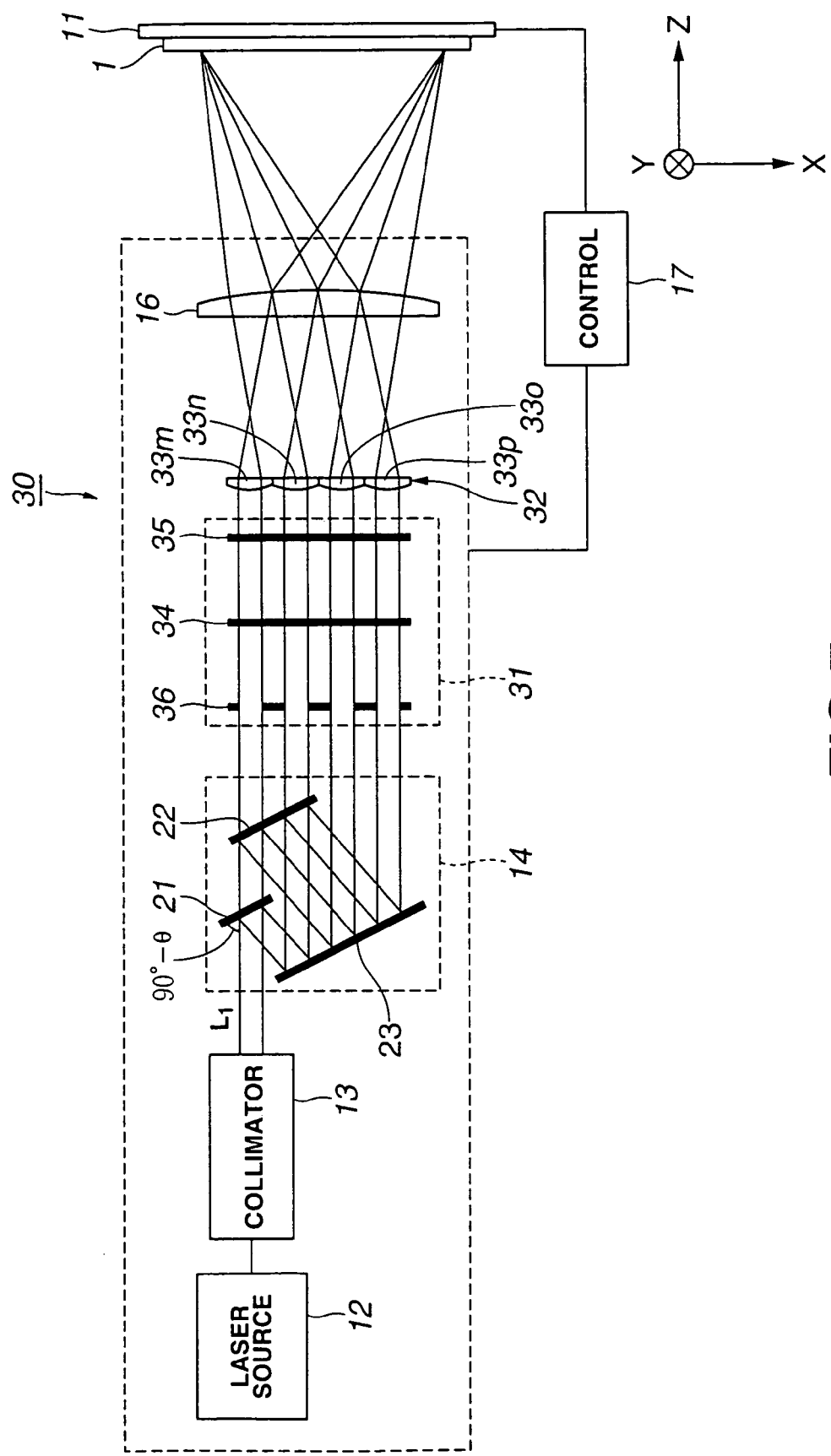
FIG. 7 illustrates the construction of a laser annealing apparatus as a second embodiment of the present invention.

Referring now to FIG. 7, there is schematically illustrated the construction of the laser annealing apparatus as the second embodiment of the present invention. The laser annealing apparatus is generally indicated with a reference 30.

As shown, the laser annealing apparatus 30 includes a stage 11 on which a substrate 1 to be annealed is to be mounted, a laser source 12 which emits a laser beam, a collimator 13 provided on the optical path of a laser beam emitted from the laser source 12, a first beam splitter unit 14 which splits a single laser beam coming from the collimator 13 into four laser beams, a second beam splitter unit 31 which splits each of the four laser beams coming from the first beam splitter unit 14 into four laser beams to provide sixteen laser beams in total, a lens array 32 composed of sixteen convex lenses, a condenser lens 16 which guides the sixteen laser beams coming from the lens array 32 to a predetermined area on the substrate 1, and a controller 17 which controls the position of the stage 11 and operates otherwise.

The first beam splitter unit 14 splits a laser beam L1 into four laser beams equidistantly parallel to each other. The four laser beams outgoing from the first beam splitter unit 14 are oriented in the X direction. The four laser beams from the first beam splitter 14 are incident upon the second beam splitter unit 31.

The second beam splitter unit 31 splits each of the four laser beams oriented in parallel to each other in the X direction into four laser beams which are oriented in the Y direction. Therefore, a total of sixteen laser beams will outgo from the second beam splitter unit 31. The sixteen laser beams coming from the second beam splitter unit 31 will have optical axes thereof laid in the form of a matrix of four arrays in the X direction and four arrays in the Y direction. Also, the sixteen laser beams coming from the second beam splitter 31 are incoherent with each other. That is, the optical paths of the sixteen laser beams, from the inlet port of the first beam splitter unit 14, upon which the laser beam L1 is incident, to the outlet port of the second beam splitter unit 31, from which the split laser beams go out, are different in length from each other. Further, the difference in length between the optical paths is larger than a coherence length set for the laser source 12.

The sixteen laser beams outgoing from the second beam splitter unit 31 are incident upon the lens array 32.

Figure 8:
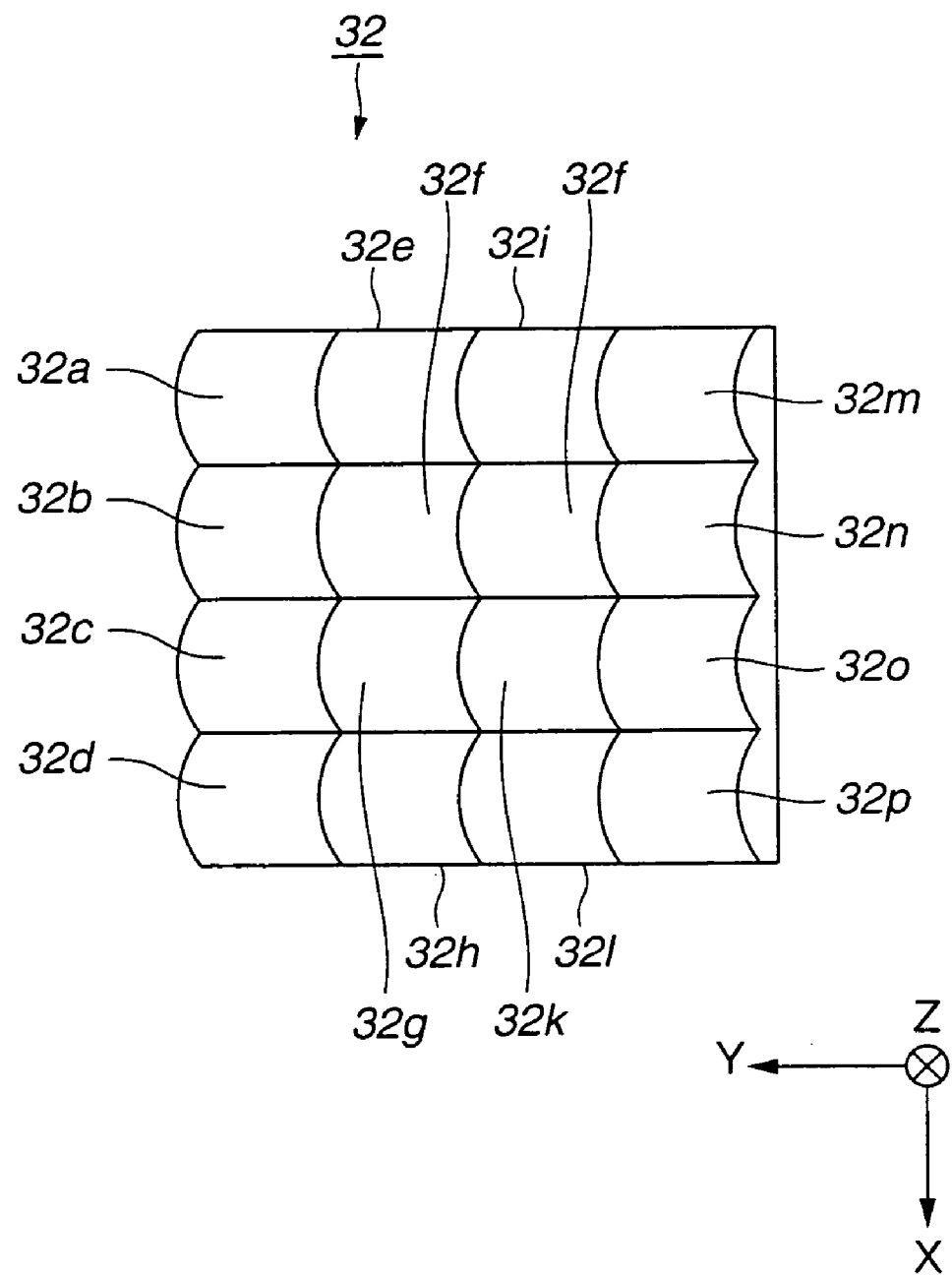
FIG. 8 shows a lens array included in the laser annealing apparatus as the second embodiment of the present invention shown in FIG. 7.

As shown in FIG. 8, the lens array 32 is composed of sixteen convex lenses 32a to 32p disposed in the form of a matrix of four lenses in each of the X and Y directions. The convex lenses 32a to 32p are disposed at the same intervals as those between the sixteen laser beams outgoing from the second beam splitter unit 31, and each of them is disposed on the optical path of a corresponding one of the laser beams. The lens array 32 condenses the sixteen incident laser beams to produce sixteen secondary light sources. The sixteen laser beams outgoing from the lens array 32 are condensed once to be the secondary light sources, and then incident upon the condenser lens 16.

The condenser lens 16 irradiates and multiplexes the sixteen laser beams condensed by the lens array 32 for incidence upon the substrate 1 in the same position on the latter.

In the laser annealing apparatus 30 constructed as above, the substrate 1 is mounted on the stage 11. Thereafter, the laser annealing is started. When the laser annealing apparatus 30 is put into operation and the laser annealing is started, a pulsed laser is emitted from the laser source 12.

The laser beam emitted from the laser source 12 passes through the collimator 13, first and second beam splitter units 14 and 31 as mentioned above to provide the sixteen parallel beams not coherent with each other and having the same intensity.

The sixteen laser beams coming from the second beam splitter unit 31 are condensed by the lens array 32 to provide sixteen secondary light sources. Sixteen laser beams from the secondary light sources are condensed and multiplexed by the condenser lens 16 for incidence upon the substrate 1 in a predetermined area on the latter.

In the laser annealing apparatus 30, the stage 11 is translated to move the flat substrate 1 in a direction parallel to the main side of the substrate 1 (in the X-Y direction in FIG. 7) and the laser beams are irradiated to over the substrate 1 for annealing the latter.

Figure 9:
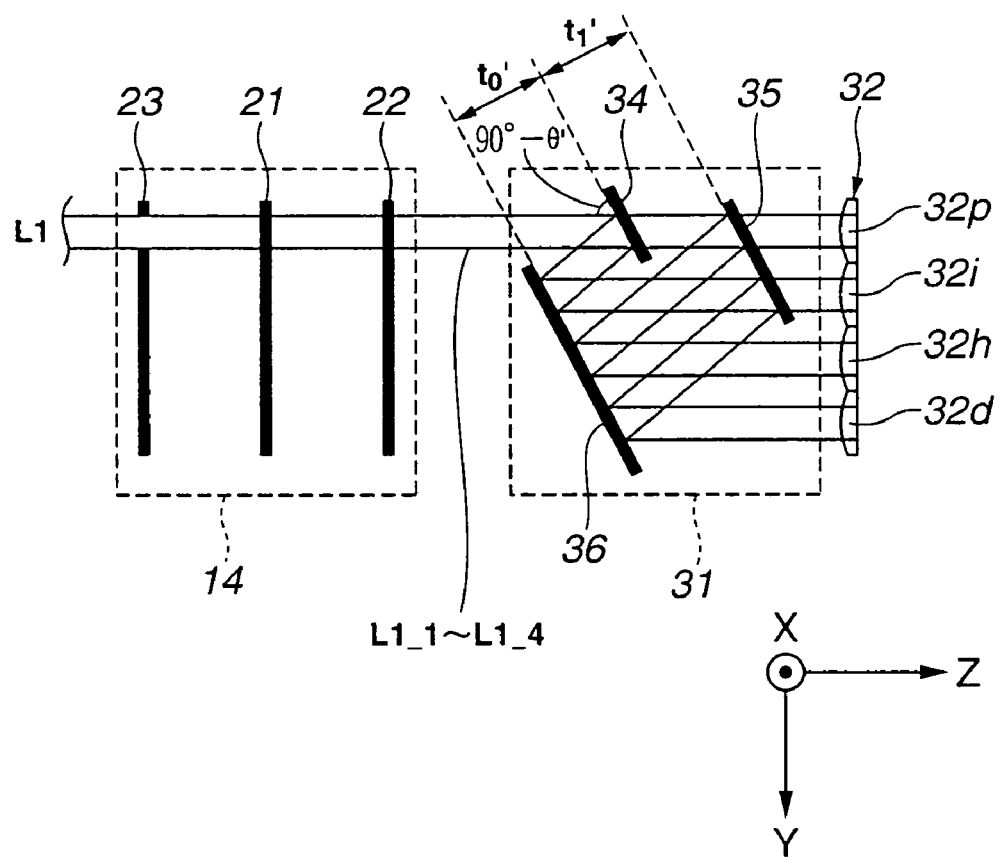
FIG. 9 illustrates the construction of first and second beam splitters included in the laser annealing apparatus as the second embodiment of the present invention shown in FIG. 7.

Next, the second beam splitter unit 31 will be detailed concerning its construction. FIG. 9 illustrates the construction of the first and second beam splitter units 14 and 31. It should be noted that FIG. 9 is a view of the first and second beam splitter units 14 and 31 from the X direction.

The second beam splitter unit 31 is a version of the first beam splitter unit 14 which is turned 90 degrees about an axis parallel to the Z direction. Since four laser beams oriented in the X direction are incident upon the second beam splitter unit 31, the latter should be wide enough in the X direction for the four laser beams to be incident thereupon.

The second beam splitter unit 31 is constructed as will be described in detail hereinafter.

As shown in FIG. 9, the second beam splitter unit 31 includes a first beam splitter ("beam splitter" will be referred to simply as "BS" hereunder) 34 and a second BS 35 disposed to have their flat beam splitting surfaces oriented in the Z direction. The first and second BSs 34 and 35 reflect and allow the laser beam incident upon the beam splitting surfaces thereof to pass through to split the laser beam into two laser beams. The beam splitter unit 14 is designed to split a laser beam at a ratio of 1:1 between transmission and reflection.

The second beam splitter unit 31 further includes a mirror 36 having a reflecting surface disposed in parallel to the beam splitting surfaces of the first and second BSs 34 and 35 and which is oriented along with the first and second BSs 34 and 35 in the Z direction. The mirror 36 is provided to reflect laser beams incident upon the flat reflecting surface thereof. As will be seen in FIG. 9, the mirror 36 is located nearer to the incident position of the laser beam L1 than the first BS 34.

The beam splitting surfaces of the first and second BSs 34 and 35 and the reflecting surface of the mirror 36 are disposed perpendicular to a plane defined by the Y and Z axes, and at a predetermined angle $(90°-\theta')$ $(0°<\theta'<90°)$ in relation to the direction of incidence of the laser beams $L1_{-1}$ to $L1\_4$ (i.e., Z direction). Namely, the laser beams $L1\_1$ to $L1\_4$ are incident at an angle $\theta'$ upon the first and second BSs 34 and 35 at the beam splitting surfaces of the latter.

The first BS 34 is disposed on the optical axis of the laser beams $L1_{-1}$ to $L1\_4$. Also, the second BS 35 is disposed on the optical axis of the laser beams $L1\_1$ to $L1\_4$. The first BS 34 is located and dimensioned such that only the laser beams $L1\_1$ to $L1\_4$ will be incident upon this BS 34 but no other laser beams will. The second BS 35 is located and dimensioned such that only the laser beam transmitted through the first BS 34 and laser beam reflected by the first BS 34 and then by the mirror 36 will be incident thereupon but no other laser beams will. The mirror 36 is located and dimensioned so that the laser beam reflected by the first BS 34 and two laser beams reflected by the second BS 35, will be incident thereupon and it will not intercept the laser beams $L1_{-1}$ to $L1\_4$.

Note that the distance t'0 between the first BS 34 in the second beam splitter unit 31 and the mirror 36, and the distance t'1 between the first and second BSs 34 and 35, are given by the following expressions (1) and (2), respectively:

$$t'0 \geq \{(L\max - L\min) + L\}/(2 \cos \theta') \quad (1)$$

$$t'1 \geq \{(L\max - L\min) + L\}/(2 \cos \theta') \quad (2)$$

In the above expressions (1) and (2), Lmin and Lmax depends in value upon the construction of the first beam splitter unit 14. Lmin is an optical path length of a one having the shortest optical path length among the plurality of laser beams coming from the first beam splitter unit 14. Lmax is an optical path length of a one having the longest optical path length among the plurality of laser beams coming from the first beam splitter unit 14.

Because the second beam splitter unit 31 is constructed as above, it can provide the sixteen laser beams oriented in the form of a matrix in the X and Y directions and not coherent with each other.

The laser annealing apparatus 30 as the second embodiment includes the first and second beam splitter units 14 and 31 constructed simply as above and capable of splitting a single laser beam into sixteen laser beams not coherent with each other.

Therefore, in the laser annealing apparatus 30 as the second embodiment, the sixteen laser beams whose coherence with each other is suppressed to the minimum can be irradiated to the same position on the substrate 1. Thus, in this laser annealing apparatus 30, since four laser beams will not be coherent with each other when the sixteen laser beams are multiplexed on the substrate 1, the laser beam energy intensity can be distributed homogeneously over the laser-irradiated area on the substrate 1.

Also, in the laser annealing apparatus 30 as the second embodiment of the present invention, the second beam splitter unit 31 permits to irradiate the substrate 1 with a larger number of split laser beams and more homogeneously than in the laser annealing apparatus 10 as the first embodiment.

Also, in the laser annealing apparatus 30 as the second embodiment of the present invention, a laser beam is split into the form of a two-dimensional matrix while in the laser annealing apparatus 10 as the first embodiment, the four laser beams are oriented in an array for irradiation. Thus, in the laser beam 10 as the first embodiment, a linear area is irradiated with the laser beams as indicated with a reference U1 in FIG. 10A while in the laser annealing apparatus 30 as the second embodiment, a rectangular area is irradiated with the laser beams as indicated with a reference U2 in FIG. 10B. Say, the laser annealing apparatus as the second embodiment is designed for a wider area to be irradiated with the laser beams.

Also in the laser annealing apparatus 30 as the second embodiment of the present invention, the light transmissive member formed from glass which allows the laser beam to pass through may be provided in the second beam splitter unit 31 and the first and second BSs 34 and 35 be installed integrally on the light transmissive member, as in the first embodiment. With this construction, it is easier to adjust the positions of the first and second BSs 34 and 35 and the mirror 36.

(3) THIRD EMBODIMENT

The third embodiment of the present invention will be described hereinafter. Similarly to the aforementioned first embodiment, the laser annealing apparatus as the third embodiment of the present invention is destined to change an amorphous silicone film to a polysilicone film by making a heat treatment of a TFT substrate having the amorphous silicone film formed thereon, for example, by irradiating laser beams to the TFT substrate.

Note that in the following description of the laser annealing apparatus as the third embodiment of the present invention, the same or similar parts in the laser annealing apparatus as the second embodiment as or to those in the laser annealing apparatus 10 as the first embodiment of the present invention will be indicated with the same or similar references as used in the explanation of the first embodiment and will not be described in detail any longer. Also, X, Y and Z directions which will be referred to in the explanation of the third embodiment are the same as in the description of the first embodiment.

Figure 11:
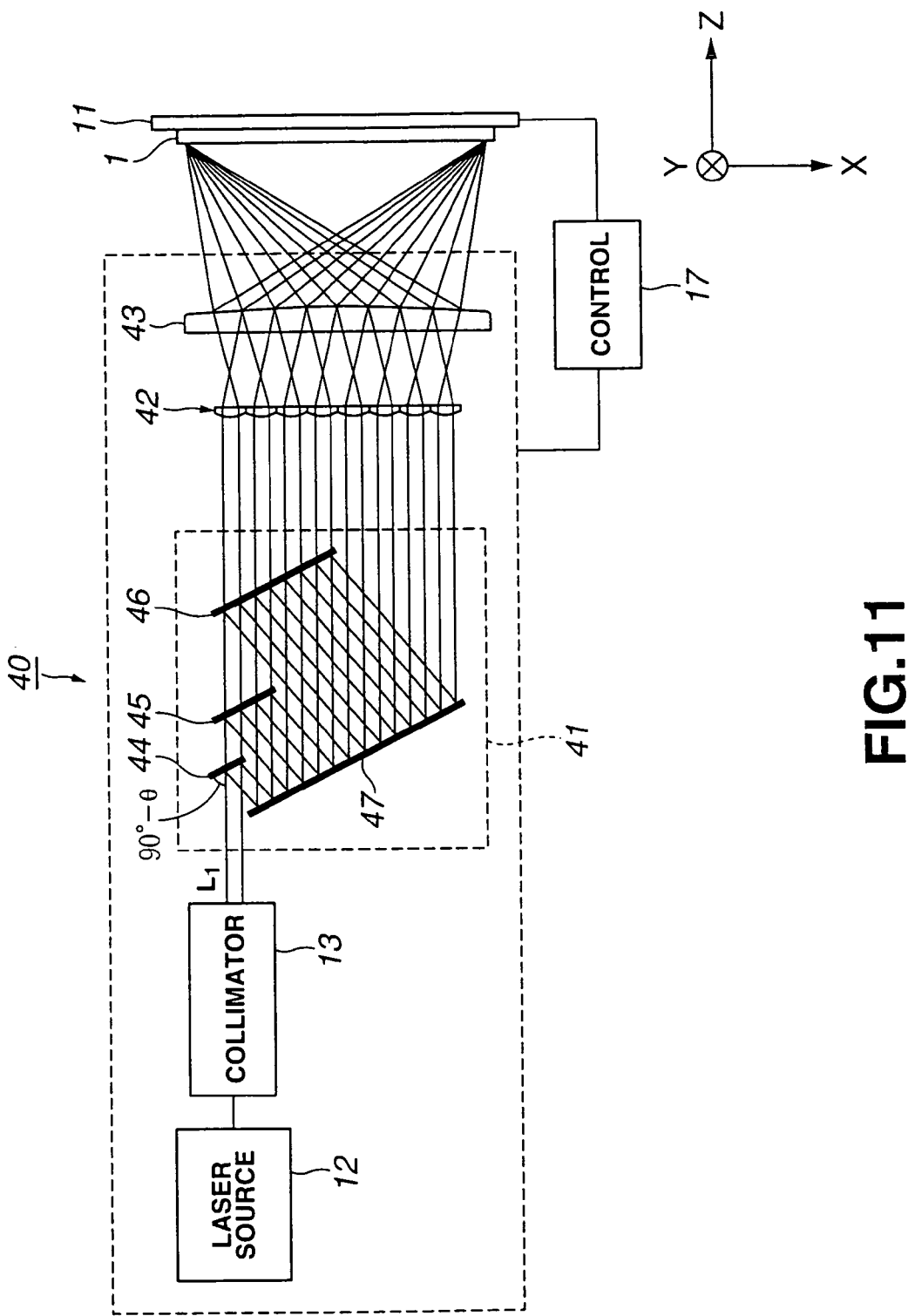
FIG. 11 illustrates the construction of a laser annealing apparatus as a third embodiment of the present invention.

Referring now to FIG. 11, there is schematically illustrated the construction of the laser annealing apparatus as the third embodiment of the present invention. The laser annealing apparatus is generally indicated with a reference 40.

As shown, the laser annealing apparatus 40 includes a stage 11 on which a substrate 1 to be annealed is to be mounted, a laser source 12 which emits a laser beam, a collimator 13 provided on the optical path of a laser beam emitted from the laser source 12, a beam splitter unit 41 which splits a single laser beam coming from the collimator 13 into eight laser beams, a lens array 42 composed of eight convex lenses, a condenser lens 43 which guides the eight laser beams coming from the lens array 42 to a predetermined area on the substrate 1, and a controller 17 which controls the position of the stage 11 and operates otherwise.

The beam splitter unit 41 splits a laser beam L1 into eight laser beams equidistantly parallel to each other. The eight laser beams outgoing from the beam splitter unit 41 are oriented in the X direction. The eight laser beams from the beam splitter 41 are not coherent with each other. That is, the optical paths of the eight laser beams, from the inlet port of the beam splitter unit 41, upon which the laser beam L1 is incident, to the outlet port of the beam splitter unit 41, from which the split laser beams go out, are different in length from each other. Further, the difference in length between the optical paths is larger than a coherence length set for the laser source 12.

Note that the construction of the beam splitter unit 41 will be described in detail later.

The eight laser beams outgoing from the beam splitter unit 41 are incident upon the lens array 42.

Figure 12:
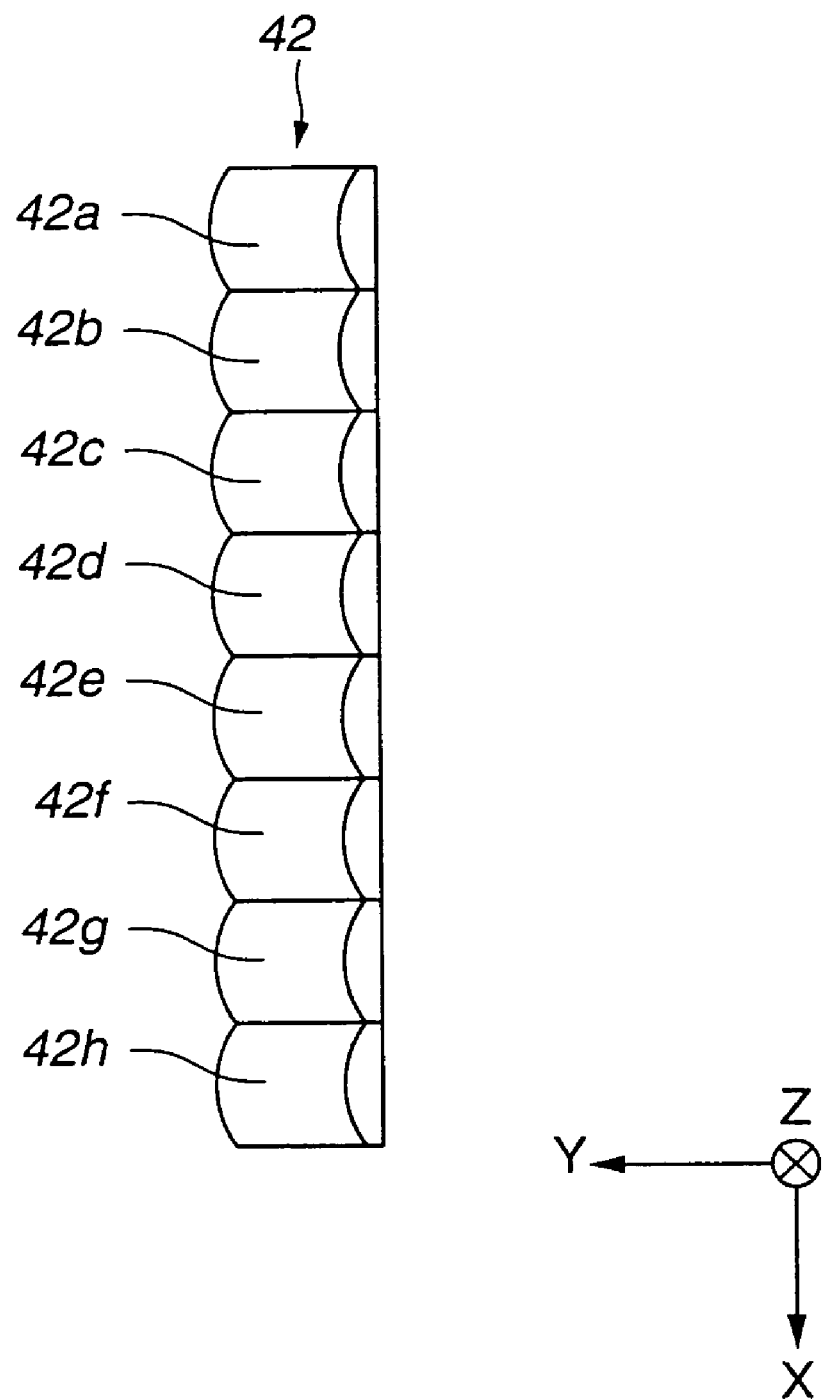
FIG. 12 shows a lens array included in the laser annealing apparatus as the third embodiment of the present invention in FIG. 11.

As shown in FIG. 12, the lens array 42 is composed of eight convex lenses 42a to 42h disposed equidistantly from each other in an array in the direction in which the eight laser beams outgoing from the beam splitter unit 41 are oriented. The convex lenses 42a to 42h are disposed at the same intervals as those between the eight laser beams outgoing from the beam splitter unit 41, and each of them is disposed on the optical path of a corresponding one of the laser beams. The lens array 42 condenses the eight incident laser beams to produce eight secondary light sources. The eight laser beams outgoing from the lens array 42 are condensed once to be the secondary light sources, and then incident upon the condenser lens 43.

The condenser lens 43 irradiates and multiplexes the eight laser beams condensed by the lens array 42 for incidence upon the substrate 1 in the same position on the latter.

In the laser annealing apparatus 40 constructed as above, the substrate 1 is mounted on the stage 11. Thereafter, the laser annealing is started. When the laser annealing apparatus 40 is put into operation and the laser annealing is started, a pulsed laser is emitted from the laser source 12.

The laser beam emitted from the laser source 12 passes through the collimator 13 and beam splitter units 41 as mentioned above to provide the eight parallel beams not coherent with each other and having the same intensity.

The eight laser beams coming from the beam splitter unit 41 are condensed by the lens array 42 to provide eight secondary light sources. Eight laser beams from the secondary light sources are condensed and multiplexed by the condenser lens 43 for incidence upon the substrate 1 in a predetermined area on the latter.

In the laser annealing apparatus 40, the stage 11 is translated to move the flat substrate 1 in a direction parallel to the main side of the substrate 1 (in the X-Y direction in FIG. 11) and the laser beams are irradiated to over the substrate 1 for annealing the latter.

Figure 13:
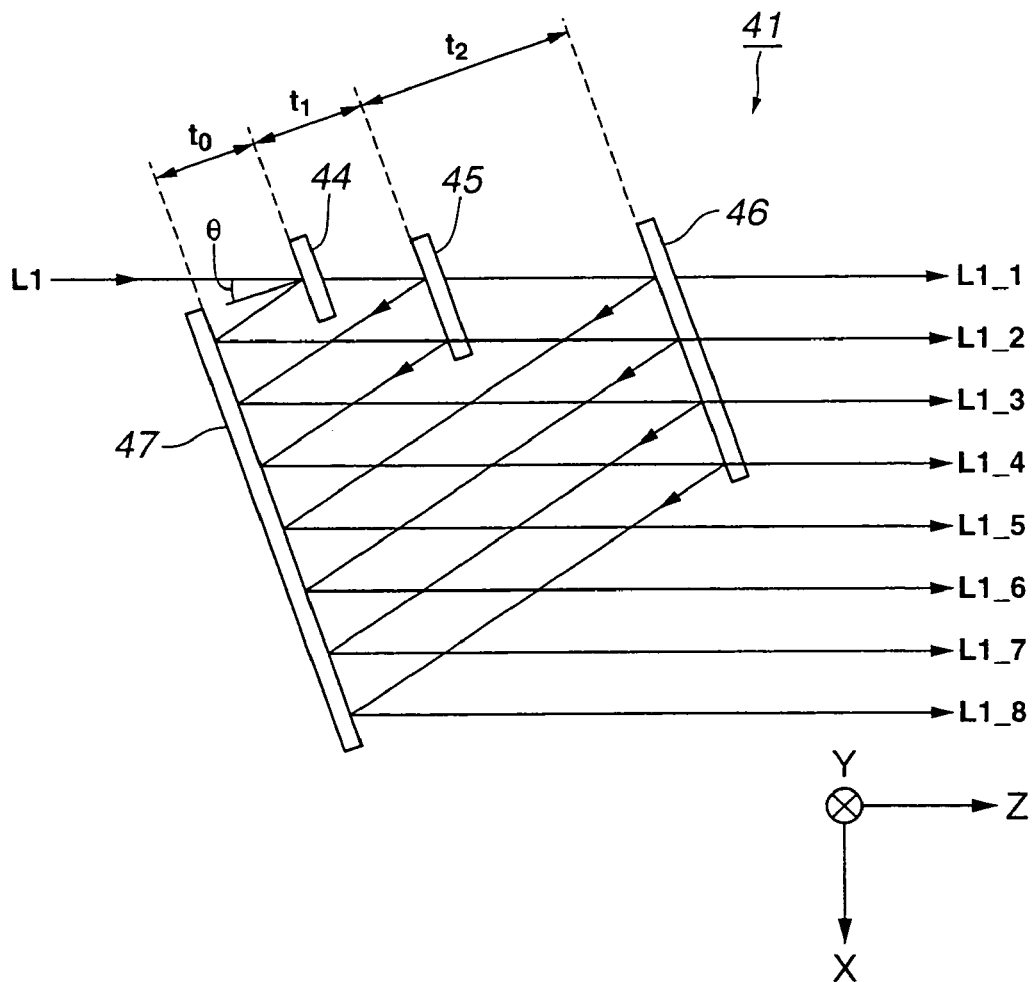
FIG. 13 illustrates the construction of a beam splitter included in the laser annealing apparatus as the third embodiment of the present invention shown in FIG. 11.

Next, the beam splitter unit 41 will be detailed concerning its construction. FIG. 13 illustrates the construction of the beam splitter units 41. It should be noted that FIG. 13 is a view of the beam splitter units 41 from the Y direction.

The beam splitter unit 41 is constructed as will be described in detail hereinafter:

As shown in FIG. 13, the beam splitter unit 41 includes a first beam splitter ("beam splitter" will be referred to simply as "BS" hereunder) 44, second BS 45 and a third BS 46 disposed to have their flat beam splitting surfaces oriented in the Z direction. The first, second and third BSs 44, 45 and 46 reflect and allow the laser beam incident upon the beam splitting surfaces to pass through to split the laser beam into two laser beams. The beam splitter unit 41 is designed to split a laser beam at a ratio of 1:1 between transmission and reflection.

The beam splitter unit 41 further includes a mirror 47 having a reflecting surface disposed in parallel to the beam splitting surfaces of the first, second and third BSs 44, 45 and 46 and which is oriented along with the first, second and third BSs 44, 45 and 46 in the Z direction. The mirror 47 is provided to reflect laser beams incident upon the flat reflecting surface thereof. As will be seen in FIG. 13, the mirror 47 is located nearer to the incident position of the laser beam L1 than the first BS 44.

The beam splitting surfaces of the first, second and third BSs 44, 45 and 46 and the reflecting surface of the mirror 47 are disposed perpendicular to a plane defined by the X and Z axes, and at a predetermined angle $(90°-\theta')$ $(0<\theta'<90°)$ in relation to the direction of incidence of the laser beam L1 (i.e., Z direction). Namely, the laser beam L1 is incident at an angle $\theta$ upon the first, second and third BSs 44, 45 and 46 at the beam splitting surfaces of the latter.

The first BS 44 is disposed on the optical axis of the laser beams L1. Also, the second and third BSs 45 and 46 are disposed on the optical axis of the laser beams L1. The first BS 44 is located and dimensioned such that only the laser beams L1 will be incident thereupon but no other laser beams will. The second BS 45 is located and dimensioned such that the laser beams passed through the first BS 44 and a laser beam reflected by the first BS 44 and then by the mirror 47 will be incident thereupon. The third BS 46 is located and dimensions such that two laser beams passed through the second BS 45 and two laser beams reflected by the mirror 47 and then by the second BS 45 will be incident thereupon but no other laser beams will. The mirror 47 is located and dimensioned so that one laser beam reflected by the first BS 44, two laser beams reflected by the second BS 45 and four laser beams reflected by the third BS 46 will be incident thereupon and it will not intercept the laser beams L1.

Note that the distance t0 between the first BS 44 and mirror 47 is more than $L/(2 \cos \theta)$ (where L is the coherence length set for the laser source 12). The distance t1 between the first and second BSs 44 and 45 is also more than $L/(2 \cos \theta)$ (L is the coherence length set for the laser source 12). The distance t2 between the second and third BSs 45 and 46 is more than $(2\times L)/(2 \cos \theta)$ (where L is the coherence length se for the laser source 12).

Because the beam splitter unit 41 is constructed as above, it can provide the eight laser beams oriented in parallel to the X direction and not coherent with each other.

More specifically, the eight laser beams outgoing from the beam splitter unit 41 are assumed to include a first laser beam L1_1, second laser beam L1_2, third laser beam L1_3, fourth laser beam L1_4, fifth laser beam L1_5, sixth laser beam L1_6, seventh laser beam L1_7 and eighth laser beam L1_8. These first to eighth laser beams L1_1 to L1_8 are produced along the following routes.

Namely, the first laser beam L1_1 is produced along a route from the inlet port extending to the outlet port through the first BS 44 (transmission), second BS 45 (transmission) and third BS 46 (transmission). The second laser beam L1_2 is produced from a route from the inlet port extending to the outlet port through the first BS 44 (reflection), mirror 47, second BS 45 (transmission) and third BS 46 (transmission). The third laser beam L1_3 is produced along a route from the inlet port extending to the outlet port through the first BS 44 (transmission), second BS 45 (reflection), mirror 47 and third BS 46 (transmission). The fourth laser beam L1_4 is produced along a route from the inlet port extending to the outlet port through the first BS 44 (reflection), mirror 47, second BS 45 (reflection), mirror 47 and third BS 46 (transmission). The fifth laser beam L1_5 is produced along a route from the inlet port extending to the outlet port through the first BS 44 (transmission), second BS 45 (transmission), third BS 46 (reflection) and mirror 47. The sixth laser beam L1_6 is produced along a route from the inlet port extending to the outlet port through the first BS 44 (reflection), mirror 47, second BS 45 (transmission), third BS 46 and mirror 47. The seventh laser beam L1_7 is produced along a route from the inlet port extending to the outlet port through the first BS 44 (transmission), second BS 45 (reflection), mirror 47, third BS 46 (reflection) and mirror 47. The eight laser beam L1_8 is produced along a route from the inlet port extending to the outlet port through the first BS 44 (reflection), mirror 47, second BS 45 (reflection), mirror 47, third BS 46 (reflection) and mirror 47.

Therefore, the eight laser beams L1_1 to L1_8 outgoing from the beam splitter unit 41 are resulted from one laser beam having traveled along their respective optical paths spaced a distance larger than the coherence length from each other, and thus will not be coherent with each other when multiplexed on the substrate 1.

The laser annealing apparatus 40 as the third embodiment of the present invention includes the beam splitter unit 41 constructed simply as above and capable of splitting a single laser beam into eight laser beams which are not coherent with each other.

Therefore, in the laser annealing apparatus 40 as the third embodiment, the eight laser beams whose coherence with each other is suppressed to the minimum can be irradiated to the same position on the substrate 1. Thus, in this laser annealing apparatus 40, since the eight laser beams will not be coherent with each other when they are multiplexed on the substrate 1, the laser beam energy intensity can be distributed homogeneously over the laser-radiated area on the substrate 1.

Also, in the laser annealing apparatus 40 as the third embodiment of the present invention, the beam splitter unit 41 permits to irradiate the substrate 1 with a larger number of split laser beams and more homogeneously than in the laser annealing apparatus 10 as the first embodiment.

Also, in the laser annealing apparatus 40 as the third embodiment of the present invention, the eight laser beams are irradiated in an array for irradiation while in the laser annealing apparatus 10 as the first embodiment, the four laser beams are oriented in an array for irradiation. Thus, in the laser beam 10 as the first embodiment, a linear area is irradiated with the laser beams as indicated with a reference U1 in FIG. 14A while in the laser annealing apparatus 40 as the third embodiment, an area which is also linear but has a length nearly double that of the area U1 is irradiated with the laser beams as indicated with a reference U3 in FIG. 14B. Say, the laser annealing apparatus as the third embodiment of the present invention is designed for a wider area to be irradiated with the laser beams.

Note that the beam splitter 41 in the third embodiment splits a single laser beam into eight laser beams as mentioned in the foregoing. According to the present invention, by increasing the number of beam splitters parallel to each other according to expressions (4) to (7) given below, it is possible to split a laser beam into an increased number of laser beams.

Assume here that the beam splitter unit splits a single laser beam into j laser beams, k beam splitters are provided in the beam splitter unit and the beam splitter disposed in an m-th position counted from the collimator 13 (mirror inside the beam splitter unit) is referred to as "$BS_m$". It should be noted that m is a natural number whose maximum value is j.

First, the relation between j and k is given by the following expression (4):

$$j = 2^k \quad (4)$$

Also, on the assumption that the transmittance T and reflectance R of each beam splitter are all 50%, the energy $P_2$ of each of the split laser beams is given by the following expression (5):

$$P_2 = P_1/j \quad (5)$$

where $P_1$ is the energy of the laser beam before split.

Also, for the j output laser beams to be incoherent with each other, the beam splitters and mirror have to be disposed as will be described below. It is assumed here that laser beams are incident at an angle θ upon the beam splitters with a length L of coherence between the laser beams.

The distance t0 between the first beam splitter $BS_1$ and mirror is set as given by the following expression (6);

$$t0 \geq L/(2 \cos \theta) \quad (6)$$

Also, the distance $T_m$ between the m-th beam splitter $BS_m$ and (m+1)th beam splitter $BS_{(m+1)}$ is set as given by the expression (7).

$$t_m \geq (2^{(m-1)} \times L)/(2 \cos \theta) \quad (7)$$

By disposing the beam splitters as above, it is possible to split a single laser beam into k parallel laser beams incoherent with each other and having the same intensity.

(4) FOURTH EMBODIMENT

The fourth embodiment of the present invention will be described hereinafter. Similarly to the aforementioned first embodiment, the laser annealing apparatus as the fourth embodiment of the present invention is destined to change an amorphous silicone film to a polysilicone film by making a heat treatment of a TFT substrate having the amorphous silicone film formed thereon, for example, by irradiating laser beams to the TFT substrate.

In the laser annealing apparatus as fourth embodiment of the present invention, two laser sources are used, a laser beam emitted from each of the two laser sources is split and laser beams thus split are irradiated to the same position on a substrate.

Note that in the following description of the laser annealing apparatus as the fourth embodiment of the present invention, the same or similar parts in the laser annealing apparatus as the fourth embodiment as or to those in the laser annealing apparatus 10 as the first embodiment of the present invention will be indicated with the same or similar references as used in the explanation of the first embodiment and will not be described in detail any longer. Also, X, Y and Z directions which will be referred to in the explanation of the fourth embodiment are the same as in the description of the first embodiment.

Figure 15:
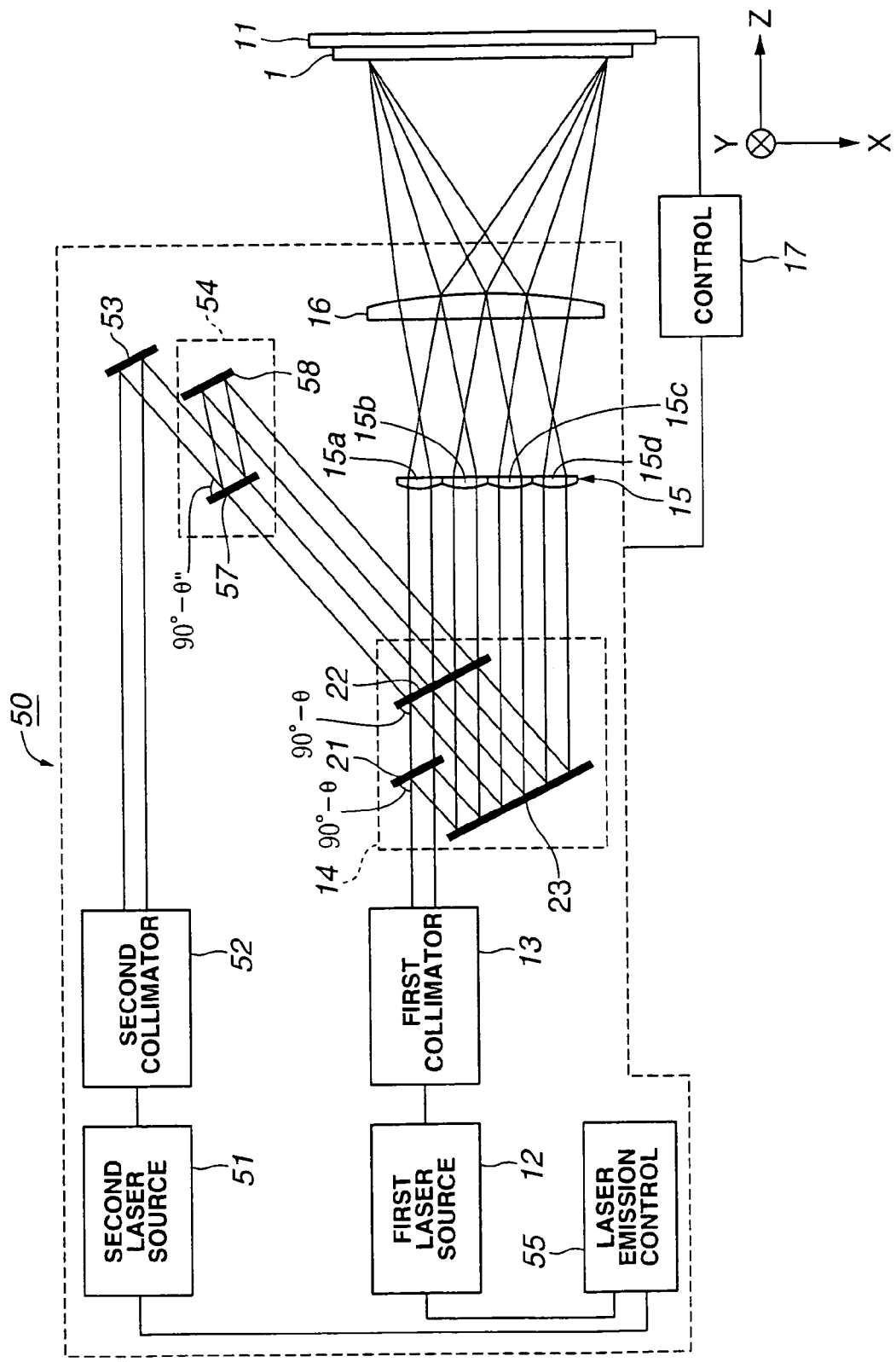
FIG. 15 illustrates the construction of a laser annealing apparatus as a fourth embodiment of the present invention according to the present invention.

Referring now to FIG. 15, there is schematically illustrated the construction of the laser annealing apparatus as the fourth embodiment of the present invention. The laser annealing apparatus is generally indicated with a reference 50.

As shown in FIG. 15, the laser annealing apparatus 50 as the fourth embodiment includes a stage 11 on which a substrate 1 to be annealed is to be mounted, a laser source 12 which emits a laser beam, a collimator 13 provided on the optical path of a laser beam emitted from the laser source 12, a beam splitter unit 14 which splits a single laser beam coming from the collimator 13 into four laser beams, a lens array 15 composed of four convex lenses, a condenser lens 16 which guides the sixteen laser beams coming from the lens array 15 to a predetermined area on the substrate 1, and a controller 17 which controls the position of the stage 11 and operates otherwise.

Note that the stage 11, laser source 12, collimator 13, beam splitter unit 14, lens array 15 and condenser lens 16 are constructed and disposed identically to those in the first embodiment. In addition, the laser annealing apparatus 50 as the fourth embodiment of the present invention includes a laser source 51 which emits a laser beam, a collimator 52 provided on the optical path of the laser beam emitted from the laser source 51, a light-guide mirror 53 which reflects the laser beam coming from the collimator 52, a beam splitter unit 54 which splits a single laser beam coming from the light-guide mirror 53, and a laser emission controller 55 which controls the laser emission from the laser sources 12 and 51.

In the following description of the laser annealing apparatus 50 as the fourth embodiment of the present invention, the laser source 12 will be referred to as "first laser source" while the laser source 51 be referred to as "second laser source", the collimator 13 be referred to as "first collimator" while the collimator 52 be referred to as "second collimator", the beam splitter unit 14 be referred to as "first beam splitter unit" while the beam splitter unit 54 be referred to "second beam splitter unit", and the laser beam outgoing from the first collimator 13 to the first beam splitter unit 54 be referred to as "first laser beam" L1.

The second laser source 51 has the same function as the laser source 12 used in the laser annealing apparatus 10 as the first embodiment of the present invention. The laser beam emitted from the second laser source 51 is incident upon the second collimator 52.

The second collimator 52 shapes the laser beam incident thereupon from the second laser source 51 into a parallel beam having a predetermined diameter. The laser beam outgoing from the second collimator 52 is first reflected by the light-guide mirror 53 and then incident upon the second beam splitter unit 54. It should be noted that the laser beam outgoing from the second collimator 52 to the second beam splitter unit 54 will be referred as "second laser beam L2" hereunder.

The second beam splitter 54 splits the second laser beam L2 into two laser beams equidistantly oriented in parallel to each other. The two laser beams outgoing from the second beam splitter unit 54 are not coherent with each other. For example, in the second beam splitter unit 54, the optical path length from the inlet port thereof, upon which the second laser beam L2 is incident, to the outlet port from which the split laser beams outgo, is different from one of the two laser beams to the other, and the optical path difference is larger than a coherence length set for the second laser source 51. It should be noted that the second beam splitter unit 54 is constructed as will be described in detail later.

The two laser beams outgoing from the second beam splitter unit 54 are incident upon the first beam splitter unit 14.

The first beam splitter unit 14 has the two laser beams incident thereupon from the second beam splitter unit 54, splits the two laser beams into four laser beams. Namely, the first beam splitter unit 14 splits the first laser beam L1 into four laser beams and the second laser beam L2 into four laser beams, for irradiation to the substrate 1. The first beam splitter unit 14 multiplexes the four laser beams resulted from splitting of the first laser beam L1 and four laser beams resulted from splitting of the second laser beam L2 coaxially for irradiation to the substrate 1.

The laser beams outgoing from the first beam splitter unit 14 will be described in detail later.

The laser emission controller 55 controls the first and second laser sources 12 and 51 for timed emission of the pulsed laser from each of the laser sources It should be noted that an example of control operation of the laser emission controller 55 will be detailed later.

In the laser annealing apparatus 50 constructed as above, the substrate 1 is mounted on the stage 11. Thereafter, the laser annealing is started. When the laser annealing apparatus 50 is put into operation and the laser annealing is started, pulsed laser beams is emitted from the first and second laser sources 12 and 51.

The laser beams emitted from the first and second laser sources 12 and 51 pass through the first beam splitter 14 to provide four parallel beams not coherent with each other and having the same intensity.

The four laser beams coming from the first beam splitter unit 14 are condensed by the lens array 15 to provide four secondary light sources. Four laser beams from the secondary light sources are multiplexed by the condenser lens 16 for incidence upon the substrate 1 in a predetermined area on the latter.

In the laser annealing apparatus 50, the stage 11 is translated to move the flat substrate 1 in a direction parallel to the main side of the substrate 1 (in the X-Y direction in FIG. 15) and the laser beams are irradiated to over the substrate 1 for annealing the latter.

Figure 16:
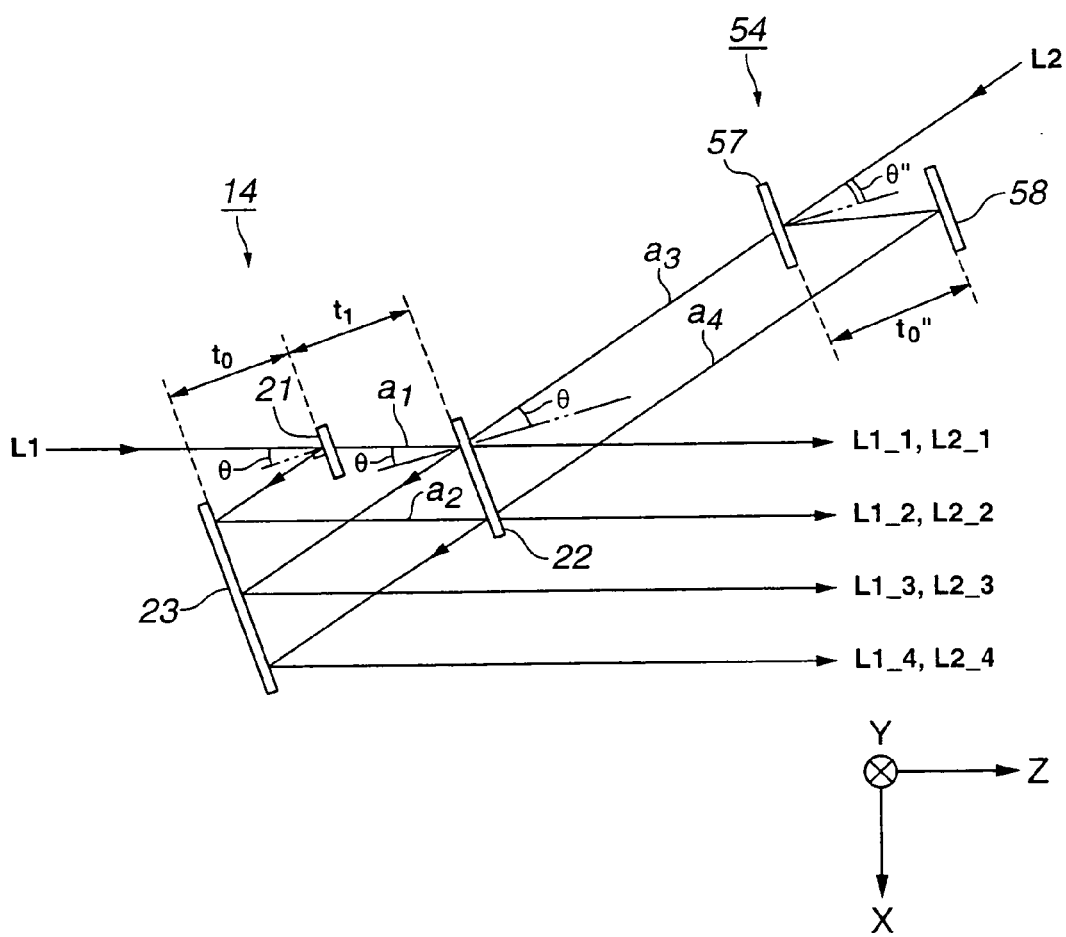
FIG. 16 illustrates the construction of first and second beam splitters included in the laser annealing apparatus as fourth embodiment of the present invention shown in FIG. 15.

Next, the first and second beam splitter units 14 and 54 will be detailed concerning its construction. FIG. 16 illustrates the construction of the first and second beam splitter units 14 and 54.

As shown in FIG. 16, the second beam splitter unit 54 includes a beam splitter ("beam splitter" will be referred to simply as "BS" hereunder) 57 disposed to have the flat beam splitting surface thereof oriented in the Z direction. The BS 57 reflects and allows the laser beam incident upon the beam splitting surface thereof to pass through to pass to split the laser beam into two laser beams. The BS 57 is designed to split a laser beam at a ratio of 1:1 between transmission and reflection.

The second beam splitter unit 54 further includes a mirror 58 having a reflecting surface in parallel to the beam splitting surface of the BS 57 and which is oriented along with the BS 57 in the Z direction. The mirror 58 is provided to reflect the laser beam incident upon the flat reflecting surface thereof. As will be seen in FIG. 16, the mirror 58 is located nearer to the incident position of the laser beam L2 than the BS 57.

The beam splitting surface of the BS 57 and the reflecting surface of the mirror 58 are disposed perpendicular to a plane defined by the X and Z axes, and at a predetermined angle (90°−θ") (0°<θ"<90°) in relation to the direction of incidence of the laser beam L2. Namely, the laser beam L2 is incident at an angle θ" upon the BS 57 at the beam splitting surface of the latter.

The BS 57 is disposed on the optical axis of the laser beams L2. Also, the BS 57 is located and dimensioned such that only the laser beams L2 will be incident thereupon but no other laser beams will. The mirror 58 is located and dimensioned so that one laser beam reflected by the BS 57 will be incident thereupon and it will not intercept the laser beams L2.

Also, the distance t"0 between the BS 57 and mirror 58 is more than L"/(2 cos θ") (where L" is the coherence length set for the laser source 51).

Because the second beam splitter unit 54 is constructed as above, it can provide the two laser beams not coherent with each other.

Next, the routes along which the laser beam incident upon the first beam splitter unit 14 and laser beam outgoing from the first beam splitter unit 14 are produced will be described.

Note that the laser beam transmitted through the first BS 21 in the first beam splitter unit 14 and incident upon the second BS 22 is taken as a first beam a1 and the laser beam reflected by the first BS 21 in the first beam splitter unit 14 and then reflected by the mirror 23 for incidence upon the second BS 22 is taken as a second beam a2. It should also be noted that the second beam splitter unit 54 provides two laser beams which will be incident upon the second BS 22 in the first beam splitter unit 14. The laser beam transmitted through the first BS 57 in the second beam splitter unit 54 is taken as a third beam a3 and the laser beam reflected by the first BS 57 in the second beam splitter unit 54 and reflected by the mirror 23 is taken as a fourth beam a4.

First, the first and second beams a1 and a2 are incident upon the second BS 22 on one side (will be referred to as "front side" hereunder) of the latter. The first beam a1 is split by the second BS 22 into two laser beams. The transmitted part of them goes as a laser beam L1_1 to outside and the reflected part is reflected by the mirror 23 and then goes as a laser beam L1_3 to outside. The second beam a2 is split by the second BS 22 into two laser beams. The transmitted part of them goes as a laser beam L1_2 to outside and the reflected part of them is reflected by the mirror 23 and then goes as a laser beam L1_4 to outside.

On the other hand, the third and fourth beams a3 and a4 are incident upon the second BS 22 on a side opposite to the side of the latter upon which the first and second beams a1 and a2 are incident (will be referred to as "rear side" hereunder). The third beam a3 is split by the second BS 22 into two laser beams. The reflected part of them goes as a laser beam L2_1 to outside and the transmitted part is reflected by the mirror 23 and then goes as a laser beam L2_3 to outside. The fourth beam a4 is split by the second BS 22 into two laser beams. The reflected part of them goes as a laser beam L2_2 to outside and the transmitted part is reflected by the mirror 23 and then goes as a laser beam L2_4 to outside.

Also, the first to fourth beams a1 to a4 are all incident upon the second BS 22 after traveling along a plane perpendicular to the beam splitting surface of the second BS 22 (namely, a plane defined by the X and Z axes). Also, the first to fourth beams a1 to a4 are incident upon the second BS 22 at a predetermined angle θ (0°<θ<90°) in relation to the beam splitting surface of the second BS 22.

Further, the first and third beams a1 and a3 are incident upon the second BS 22 in the same position on the beam splitting surface of the latter (one is incident upon the BS 22 at the front side of the latter and the other is incident at the rear side) for their optical axes not to coincide with each other. Also, the second and fourth beams a2 and a4 are incident upon the second BS 22 in the same position on the beam splitting surface of the latter (one is incident upon the BS 22 at the front side of the latter and the other is incident at the rear side) for their optical axes not to coincide with each other.

Therefore, the laser beam L1_1 resulted from the first beam a1 transmitted through the first and second BSs 21 and 22 and the laser beam L2_1 resulted from the third beam a3 reflected by the second BS 22 are coaxially multiplexed for irradiation to the substrate 1. The laser beam L1_3 resulted from the first beam a1 reflected by the second BS 22 and mirror 23 and the laser beam L2_3 resulted from the third beam a3 transmitted through the second BS 22 are coaxially multiplexed for irradiation to the substrate 1. The laser beam L1_2 resulted from the second beam a2 transmitted through the second BS 22 and the laser beam L2_2 resulted from the fourth beam a4 reflected by the second BS 22 are coaxially multiplexed for irradiation to the substrate 1. The laser beam L1_4 resulted from the second beam a2 reflected by the second BS 22 and the laser beam L2_4 resulted from the fourth beam a4 transmitted through the second BS 22 are coaxially multiplexed for irradiation to the substrate 1.

Therefore, the first and second beam splitter units 14 and 54 can split each of laser beams emitted from the two laser sources into four laser beams not coherent with each other and multiplex the four laser beams coaxially for irradiation to the substrate 1.

Note that in case the length of coherence between the laser beams emitted from the first laser source 12 and that between the laser beams emitted from the second laser source 51 are different from each other, the beam splitters and mirror are positioned in the beam splitter unit 14 with reference to one of the laser sources that emits laser beams between which the length of coherence is longer than that between the laser beams emitted from the other.

Next, the timed emission of a pulsed laser from each of the first and second laser sources 12 and 51 will be described.

The laser emission controller 55 is provided to control the first and second laser sources 12 and 51 for timed emission of a pulsed laser from each of these laser sources. Namely, the laser emission controller 55 staggers the emission time of pulsed laser from the first laser source 12 and that from the second laser source 51 a predetermined time (Δt) from each other.

Figure 17:
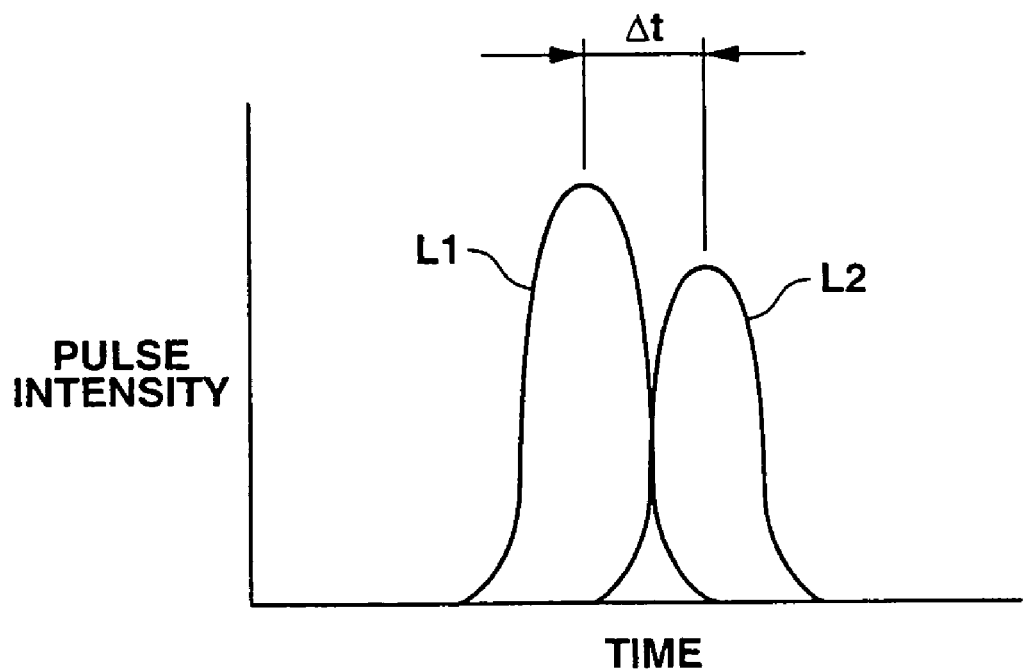
FIG. 17 shows a timing of laser emission in the laser annealing apparatus as fourth embodiment of the present invention shown in FIG. 15.

More specifically, the laser emission controller 55 controls the first and second laser sources 12 and 51 for timed emission of the laser beams L1 and L2 from the laser sources 12 and 51, respectively, so that immediately after the intensity of the laser beam L1 emitted from the first laser source 12 has climbed to the peak value on the substrate 1, the intensity of the laser beam L2 emitted from the second laser source 51 increases as shown in FIG. 17. In FIG. 17, "Δt" indicates a time difference between a time when the first laser source 12 emits the laser beam L1 and a time when the second laser source 51 emits the laser beam L2. By staggering the time when the laser beam emitted from the first laser source 12 is irradiated to the substrate 1 and the time when the laser beam emitted from the second laser source 51 is irradiated to the substrate 1 from each other, it is possible to increase the effective pulse duration of the laser beam irradiated to the substrate 1. That is to say, the time for which the laser beam is irradiated to the substrate 1 can be lengthened. Also, by making the peak intensity of a pulsed beam weaker than that of a preceding pulse beam, the cooling of the substrate 1 can be made slower as shown in FIG. 17. Such a slower cooling of the substrate 1 will result in a polysilicone whose crystal particle size is larger.

The laser annealing apparatus 50 as the fourth embodiment of the present invention is constructed simply as above and can split each of the two laser beams emitted from each of the two laser sources into four laser beams and multiplex the four laser beams coaxially.

Therefore, in the laser annealing apparatus 50 as the fourth embodiment, the four laser beams whose coherence with each other is suppressed to the minimum can be irradiated to the same position on the substrate 1. Further, the intensity of the laser beams irradiated to the substrate 1 can be increased or the pulse duration of the pulsed laser can be increased.

(5) FIFTH EMBODIMENT

The fifth embodiment of the present invention will be described hereinafter. Similarly to the aforementioned first embodiment, the laser annealing apparatus as the fifth embodiment of the present invention is destined to to change an amorphous silicone film to a polysilicone film by making a heat treatment of a TFT substrate having the amorphous silicone film formed thereon, for example, by irradiating laser beams to the TFT substrate.

In the laser annealing apparatus as the fifth embodiment, four laser sources are used and a laser beam emitted from each of the four laser sources is split into two laser beams, these laser beams are multiplexed with laser beams emitted from the other laser sources and the laser beams thus multiplexed are irradiated to the same area on a substrate.

Note that in the following description of the laser annealing apparatus as the fifth embodiment of the present invention, the same or similar parts in the laser annealing apparatus as the fifth embodiment as or to those in the laser annealing apparatus 10 as the first embodiment of the present invention will be indicated with the same or similar references as used in the explanation of the first embodiment and will not be described in detail any longer. Also, X, Y and Z directions which will be referred to in the explanation of the fifth embodiment are the same as in the description of the first embodiment.

Figure 18:
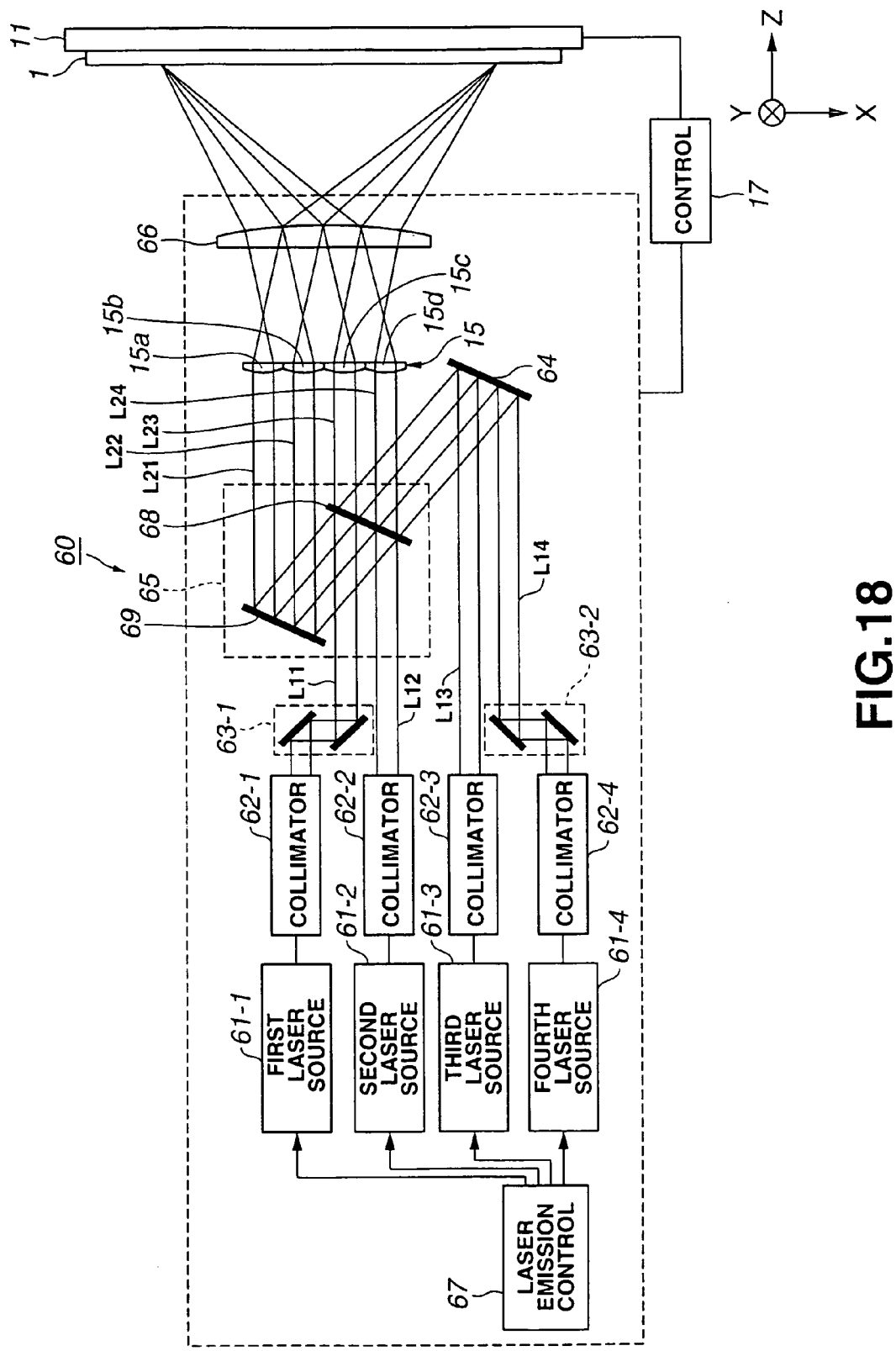
FIG. 18 illustrates the construction of a laser annealing apparatus as a fifth embodiment of the present invention.

Referring now to FIG. 18, there is schematically illustrated the construction of the laser annealing apparatus as the fifth embodiment of the present invention. The laser annealing apparatus is generally indicated with a reference 60.

As shown in FIG. 18, the laser annealing apparatus 60 as the fifth embodiment includes a stage 11 on which a substrate 1 to be annealed is to be mounted, first to fourth laser sources 61-1 to 61-4 of which each emits a laser beam, first to fourth collimators 62-1 to 62-4 provided on the optical paths, respectively, of laser beams emitted from the first to fourth laser sources 61-1 to 61-4, a first light guide 63-1 which guides a laser beam emitted from the first laser source 61-1, a second light guide 63-2 which guides a laser beam emitted from the second laser source 62-4, a light-guide mirror 64 which reflects the laser beam coming from the third collimator 62-3 and laser beam transmitted through the second light guide 63-2, a beam splitter/multiplexer 65 which splits and multiplexes the laser beams emitted from the first to fourth laser sources 61-1 to 61-4, a lens array 15 composed of four convex lenses, a condenser lens 66 which guides the four laser beams coming from the lens array 15 to a predetermined area on the substrate 1, and a controller 17 which controls the position of the stage 11 and operates otherwise, and a laser emission controller 67 which controls the laser emission from the first to fourth laser sources 61-1 to 61-4.

Note that in the explanation of the fifth embodiment, it is assumed that the laser beam coming from the first collimator 62-1 is "laser beam L11", the laser beam from the second collimator 62-2 is "laser beam L12", the laser beam from the third collimator 62-3 is "laser beam L13" and the laser beam coming from the fourth collimator 62-4 is "laser beam L14".

The first to fourth laser sources 61-1 to 61-4 have the same function as the laser source 12 used in the laser annealing apparatus 10 as the first embodiment of the present invention. The laser beam emitted from the first laser source 61-1 is incident upon the first collimator 62-1, the laser beam emitted from the second laser source 61-2 is incident upon the second collimator 62-2, the laser beam emitted from the third laser source 61-3 is incident upon the third collimator 62-3, and the laser beam emitted from the fourth laser source 61-4 is incident upon the fourth collimator 62-4.

Each of the first to fourth collimators 62-1 to 62-4 shapes the incident laser beam into a parallel beam having a predetermined diameter. The laser beam L11 outgoing from the first collimator 62-1 is passed through the first light guide 63-1 and then incident upon the beam splitter/multiplexer 65 The laser beam L12 outgoing from the second collimator 62-2 is incident directly upon the beam splitter/multiplexer 65. The laser beam L13 outgoing from the third collimator 623 is reflected by the light-guide mirror 64 and then incident upon the beam splitter/multiplexer 65. The laser beam L14 outgoing from the fourth collimator 62-4 is passed through the second light guide 63-2, reflected by the light-guide mirror 64 and then incident upon the beam splitter/multiplexer 65.

As above, the beam splitter/multiplexer 65 receives the first to fourth laser beams L11 to L14 incident thereupon. The beam splitter/multiplexer 65 mixes the incident laser beams L11 to L14 and emits four equidistantly parallel laser beams. The four laser beams outgoing from the beam splitter/multiplexer 65 are not coherent with each other. Also, the four laser beams from the beam splitter/multiplexer 65 are oriented in the X direction as in FIG. 18.

The four laser beams outgoing from the beam splitter/multiplexer 65 are numbered in their order in the X direction. More specifically, the first laser beam from the beam splitter/multiplexer 65 is taken herein as a laser beam L21, the second one is as a laser beam L22, the third one is as a laser beam L23, and the fourth one is as a laser beam L24. It should be noted that the beam splitter/multiplexer 65 is constructed as will be described in detail later.

The lens array 15 is composed of four convex lenses 15a to 15d disposed equidistantly in an array in a direction perpendicular to the four laser beams from the beam splitter/multiplexer 65 (in the X direction in FIG. 18, for example). The convex lenses 15a to 15d are disposed on the optical axes of the laser beams, respectively. The lens array 15 condenses the incident four laser beams to produce four secondary light sources. The four laser beams outgoing from the lens array 15 are condensed once to provide the secondary light sources, and then incident upon the condenser lens 66.

The condenser lens 66 irradiates the four laser beams condensed by the lens array 15 to the same position on the substrate 1 and multiplexes them in the position.

The laser emission controller 67 controls the first to fourth laser sources 61-1 to 61-4 for timed emission of pulsed lasers from them.

In the laser annealing apparatus 60 constructed as above, the substrate 1 is mounted on the stage 11. Thereafter, the laser annealing is started. When the laser annealing apparatus 60 is put into operation and the laser annealing is started, a pulsed laser is emitted from each of the first to fourth laser sources 61-1 to 61-4.

The laser beams emitted from the first to fourth laser sources 61-1 to 61-4 pass through the beam splitter/multiplexer 65 to provide four parallel beams not coherent with each other and having the same intensity.

The four laser beams coming from the beam splitter/multiplexer 65 are condensed by the lens array 15 to provide four secondary light sources. Four laser beams from the secondary light sources are condensed and multiplexed by the condenser lens 66 for incidence upon the substrate 1 in a predetermined area on the latter.

In the laser annealing apparatus 60, the stage 11 is translated to move the flat substrate 1 in a direction parallel to the main side of the substrate 1 (in the X-Y direction in FIG. 18) and the laser beams are irradiated to over the substrate 1 for annealing the latter.

Figure 19:
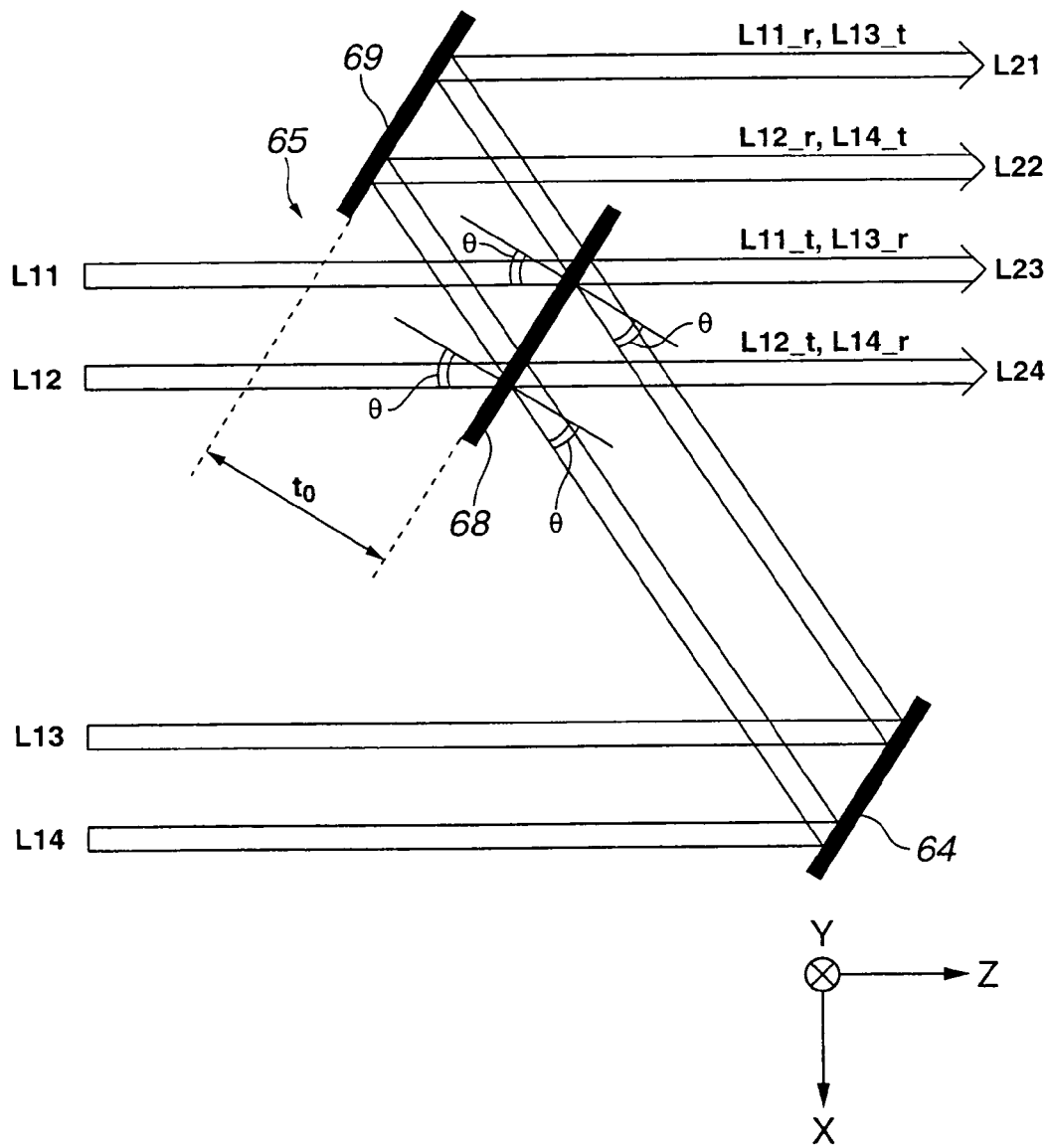
FIG. 19 illustrates the construction of an optically-coupled device/demultiplexer included in the laser annealing apparatus as the fifth embodiment of the present invention shown in FIG. 18.

Next, the beam splitter/multiplexer 65 will be detailed concerning its construction. FIG. 19 illustrates the construction of the beam splitter/multiplexer 65 and light-guide mirror 64 in an enlarged scale.

As shown in FIG. 19, the beam splitter/multiplexer 65 includes a beam splitter ("beam splitter" will be referred to simply as "BS" hereunder) 68 which reflects and allows an incident laser beam to pass through to split the incident laser beam into two laser beams having an equal strength, and a projection mirror 69 which reflects an incident laser beam.

The projection mirror 69, BS 68 and light-guide mirror 64 are disposed in this order from the first to fourth collimators 62-1 to 62-4. Also, the beam splitting surface of the BS 68 and the reflecting surface of the projection mirror 69 are parallel to each other and to the light-guide mirror 64 as well.

The laser beam L11 emitted from the first laser source 61-1 travels along a path including the first collimator 62-1 and first light guide 63-1 for incidence upon the BS 68 at one side (will be referred to as "front side" hereunder) of the latter. The laser beam L12 emitted from the second laser source 61-2 is transmitted through the second collimator 62-2 for incidence upon the BS 68 at the front side of the latter. The laser beams L11 and L12 are thus oriented in parallel with each other for incidence upon the BS 68.

The laser beam L13 emitted from the third laser source 61-3 travels along a path including the third collimator 62-3 and light-guide mirror 64 for incidence upon the BS 68 at a side of the latter opposite to the front side (will be referred to as "rear side" hereunder). The laser beam L14 emitted from the fourth laser source 61-4 travels along a path including the fourth collimator 62-4, second light guide 63-2 and light-guide mirror 64 for incidence upon the BS 68 at the rear side of the latter. The laser beams L13 and L14 are oriented in parallel with each other for incidence upon the BS 68.

The four laser beams L11 to L14 go along a plane (defined by the X and Z axes in FIG. 19) perpendicular the beam splitting surface of the BS 68 for incidence upon the BS 68.

Each of the laser beams L11 to L14 is incident at a predetermined angle θ (0°<θ<90°) in relation to the beam splitting surface of the BS 68 for the optical axis of the laser beam (L11 and L12) incident upon the BS 68 at the front side of the latter not to coincide with that of the laser beam (L13 and L14) incident upon the BS 68 at the rear side of the latter.

Further, the laser beam L11 emitted from the first laser source 61-1 and the laser beam L13 emitted from the third laser source 61-3 are incident upon the BS 68 in the same position on the beam splitting surface of the latter (one is incident upon the BS 68 at the front side of the latter while the other is incident at the rear side). Also, the laser beam L12 emitted from the second laser source 61-2 and the laser beam L14 emitted from the fourth laser source 61-4 are incident upon the BS 68 in the same position on the beam splitting surface of the latter (one is incident upon the BS 68 at the front side of the latter while the other is incident at the rear side).

Therefore, a part (L11_r), reflected by the BS 68, of the laser beam L11 emitted from the first laser source 61-1 and a part (L13_t), transmitted through the BS 68, of the laser beam L13 from the third laser source 61-3 are multiplexed coaxially to provide an output laser beam L21. Also, a part (L12_r), reflected by the BS 68, of the laser beam L12 from the second laser source 61-2 and a part (L14_t), transmitted through the BS 68, of the laser beam L14 from the fourth laser source 61-4 are multiplexed coaxially to provide an output light L22. Also, a part (L11_t), transmitted through the BS 68, of the laser beam L11 emitted from the first laser source 61-1 and a part (L13_r), reflected by the BS 68, of the laser beam L13 from the third laser source 61-3 are multiplexed coaxially to provide an output light L23. Further, a part (L12_t), transmitted through the BS 68, of the laser beam L12 from the second laser source 61-2 and a part (L14_r), reflected by the BS 68, of the laser beam L14 from the fourth laser source 61-4 are multiplexed coaxially to provide an output light L24.

Furthermore, the output beams L21 and L22 are reflected by the projection mirror 69 to be parallel to the output beams L23 and L24 for projection to the substrate 1.

Also, the BS 68 and projection mirror 69 are disposed for the optical path difference between the output beams L21 to L24 to be larger than the largest one of the lengths of coherence between the laser beams L21 to L24 emitted from the first to fourth laser sources 61-1 to 61-4.

More specifically, the BS 68 and projection mirror 69 may be disposed for the distance t0 between them to be larger than $L/(2 \cos \theta)$ (where L is the longest one of the coherence lengths set for the first to fourth laser sources 61-1 to 61-4, respectively.

In the beam splitter/multiplexer 65, a laser beam can be incident upon the BS 68 at each of the front and rear sides of the latter for splitting thereof into two laser beams, and the laser beams thus split can be multiplexed.

The laser annealing apparatus 60 constructed as having been described above functions as will be described hereinafter:

First, the emission controller 67 controls the first and second laser sources 61-1 and 61-2 to generate the pulsed laser beams L11 and L12, respectively. The laser beam L11 is shaped by the first collimator 62-1 into a parallel beam having a predetermined diameter. Also, the laser beam L12 is shaped by the second collimator 62-2 into a parallel beam having a predetermined diameter.

The laser beam L11 transmitted through the first collimator 62-1 and laser beam L12 transmitted through the second collimator 62-2 are incident upon the BS 68.

Each of the laser beams L1 1and L12 is split by the BS 68 into the transmitted and reflected parts. More particularly, the laser beam L11 is spilt into the transmitted part L11_t and reflected part L11_t. The transmitted part L11_t is incident upon the third convex lens 15c, while the reflected part L11-r is reflected by the projection mirror 69 and then incident upon the first convex lens Sa. Also, the laser beam L12 is split into the transmitted part L12_t and reflected part L12_r. The transmitted part L12_t is incident upon the fourth convex lens 15d, while the reflected part L12_r is reflected by the projection mirror 69 and then incident upon the second convex lens 15b.

The four convex lenses 15a to 15d included in the lens array 15 condense the incident laser beams L11_r, L11_t, L12_r and L12_t, respectively. These condensed four laser beams L11_r, L11_t, L12_r and L12_t are incident upon the condenser lens 66.

Then, the condenser lens 66 multiplexes the laser beams L11_r, L11_t, L12_r and L12_t for incidence upon the substrate 1 in the same range with a generally homogeneous intensity. An a-Si or the like placed on the substrate 1 will be annealed by a laser beam coming from the condenser 66 and having a homogeneous energy distribution.

Next, the laser emission controller 67 controls the third and fourth laser sources 61-3 and 61-4 to generate the pulsed laser beams L13 and L14, respectively, after the laser beams L11 and L12 are pulsed-generated.

The laser beam L13 is shaped by the third collimator 62-3 into a parallel beam having a predetermined diameter. Also, the laser beam L14 is shaped by the fourth collimator 62-4 into a parallel beam having a predetermined diameter.

The laser beam L13 transmitted through the third collimator 62-3 and laser beam L14 transmitted through the fourth collimator 62-4 are incident upon the BS 68.

Each of the laser beams L13 and 14 is split by the BS 68 into transmitted and reflected parts. More specifically, the laser beam L13 is split into the transmitted part L13_t and reflected part L13_r. The reflected part L13_r is incident upon the third convex lens 15c, while the transmitted part L13_t is reflected by the projection mirror 69 before being incident upon the first convex lens 15a. Also, the laser beams L14 is split into the transmitted part L14_t and reflected part L14_r. The reflected part L14_r is incident upon the fourth convex lens 15d, while the transmitted part L14_t is reflected by the projection mirror 69 and then incident upon the second convex lens 15b.

The four convex lenses 15a to 15d included in the lens array 15 condense the incident laser beams L13_r, L13_t, L14_r and L14_t, respectively. These condensed four laser beams L13_r, L3_t, L14_r and L14_t are incident upon the condenser lens 66.

Then, the condenser lens 66 multiplexes the laser beams L13_r, L13_t, L14_r and L14_t for incidence upon the substrate 1 in the same range with a generally homogeneous intensity.

As having been described in the foregoing, under the control of the laser emission controller 67 in the laser annealing apparatus 60, the first and second laser sources 61-1 and 61-2 emit pulsed laser beams at the same time, and in a predetermined time, the third and fourth laser sources 61-3 and 61-4 emit pulsed laser beams at the same time. That is to say, in the laser annealing apparatus 60, laser beams are emitted from the plurality of laser sources at the same time. Therefore, even when each of the solid-state lasers as the laser sources can emit only a laser beam whose intensity is not high, it is possible to sufficiently increase the intensity of the laser beams irradiated to the substrate 1. Also, since increasing the number of laser sources provided in the laser annealing apparatus 60 permits to increase the intensity of irradiated laser beams, the intensity of the laser beams incident upon the condenser lens 66 can be increased and thus the laser beams can be irradiated to a wider area on the substrate 1.

(6) SIXTH EMBODIMENT

The sixth embodiment of the present invention will be described hereinafter. The sixth embodiment of the present invention is a light irradiator which is used as a laser irradiating means in the laser annealing apparatus, for example.

Figure 20:
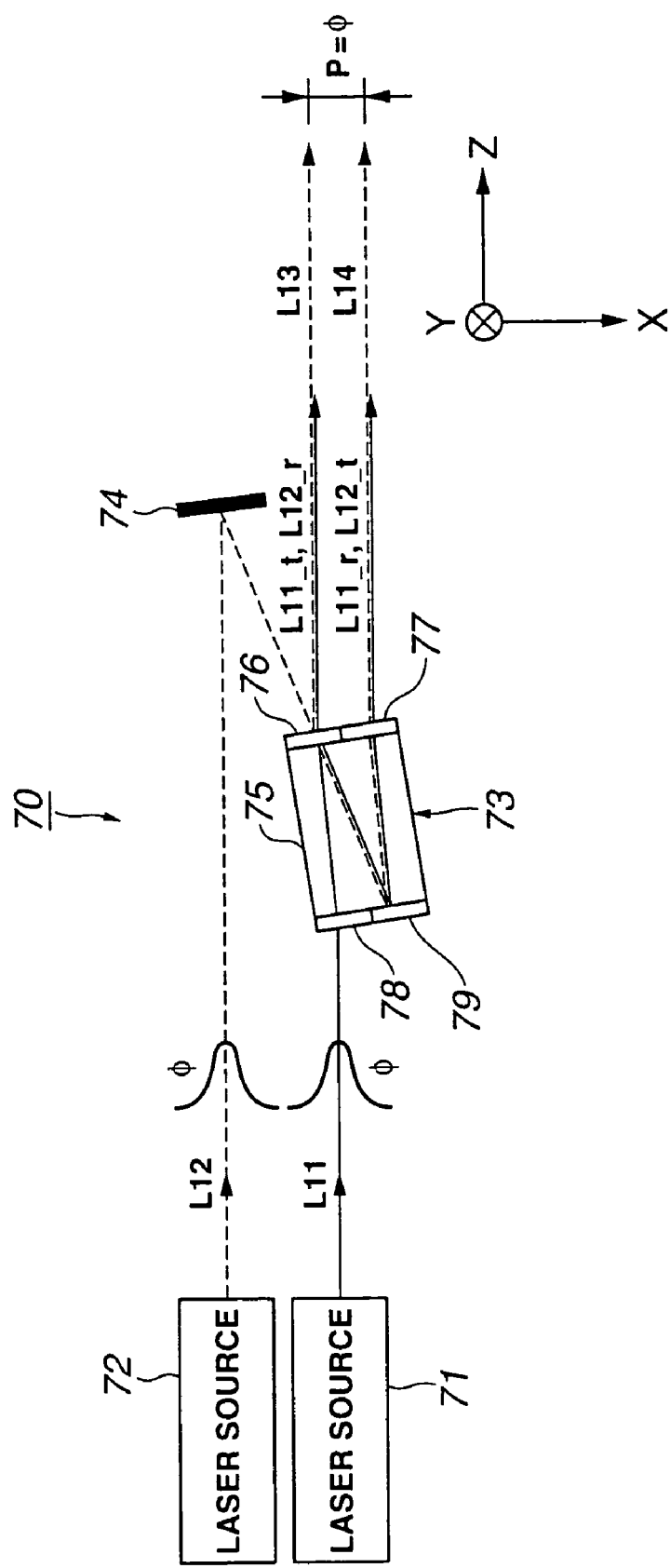
FIG. 20 illustrates the construction of a light irradiator as a sixth embodiment of the present invention.

The sixth embodiment of the present invention will be described below with reference to FIG. 20 showing the construction of the light irradiator as the sixth embodiment of the present invention.

Note that the light irradiator as the sixth embodiment of the present invention emits two parallel laser beams. In the following explanation, the optical-axial direction of the laser beams emitted from the light irradiator is taken as the Z direction, the direction in which the two laser beams are oriented in parallel to each other is taken as the X direction, and a direction perpendicular to the Z and X directions is taken as the Y direction.

The light irradiator as the sixth embodiment is generally indicated with a reference 70. As shown in FIG. 20, the light irradiator 70 includes a first laser source 71 which emits a first laser beam L11, a second laser source 72 which emits a second laser source L12, an optically-coupled device 73 which multiplexes the first and second laser beams L11 and L12 to provided two resultant beams, and a mirror 74 which guides the second laser beam L12 to the optically-coupled device 73.

The first and second laser sources 71 and 72 emit the laser beams L11 and L12, respectively, identical in wavelength to each other. Also, each of the first and second laser sources 71 and 72 uses a collimator lens or the like to shape the laser beam into a circular beam. The laser beams thus shaped have the same intensity. The diameters of both the laser beams L11 and L12 are $\phi$. It should be noted that since the first and second laser source 71 and 72 are different from each other, the laser beams L11 and L12 emitted from them are incoherent with each other.

The first laser beam L11 emitted from the first laser source 71 is incident upon the optically-coupled device 73, while the second laser beam L12 emitted from the second laser source 72 is reflected by the mirror 74 before being incident upon the optically-coupled device 73.

The optically-coupled device 73 includes a beam splitting coating 76. Each of the first and second laser beams L11 and L12 incident upon the optically-coupled device 73 is split by the beam splitting coating 76 into transmitted and reflected parts. It should be noted that the construction of the optically-coupled device 73 and the optical path for the laser beam inside the optically-coupled device 73 will be described in detail later.

The optically-coupled device 73 provides a transmitted beam L11_t as a part of the first laser beam L11 that is transmitted through the beam splitting coating 76, reflected part L11_r as a part of the first laser beam L11 that is reflected by the beam splitting coating 76, transmitted beam L12_t as a part of the second laser beam L12 that is transmitted through the beam splitting coating 76 and reflected part L12_r as a part of the second laser beam L12 that is reflected by the beam splitting coating 76.

The transmitted beam L11_t as a part of the first laser beam L11 that is transmitted through the beam splitting coating 76, and the reflected part L12_r of the second laser beam L12 that is reflected by the beam splitting coating 76, have the optical axes thereof coincident with each other, and multiplexed together by the optically-coupled device 73 to provide a resultant beam. The resultant beam provided by multiplexing the transmitted beam L11_t as a part of the first laser beam L11 that is transmitted through the beam splitting coating 76, and the reflected part L12_r of the second laser beam L12 that is reflected by the beam splitting coating 76, is taken as a first resultant beam L13. The reflected part L11_r of the first laser beam L11 that is reflected by the beam splitting coating 76, and the transmitted beam L12_t as a part of the second laser beam L12 that is transmitted through the beam splitting coating 76, have the optical axes thereof coincident with each other, and multiplexed together by the optically-coupled device 73 to provide a resultant beam. The resultant beam provided by multiplexing the reflected part L11_r of the first laser beam L11 that is reflected by the beam splitting coating 76, and the transmitted beam L12_t as a part of the second laser beam L12 that is transmitted through the beam splitting coating 76, is taken as a second resultant beam L14.

The first and second resultant beams L13 and L14 outgo from the optically-coupled device 73 in the Z direction. Also, the first and second resultant beams L13 and L14 are oriented in parallel to each other in the X direction. The interval P between the optical axes of the first and second resultant beams L13 and L14 is equal to the diameter $\phi$ of the original laser beams L11 and L12.

Figure 21:
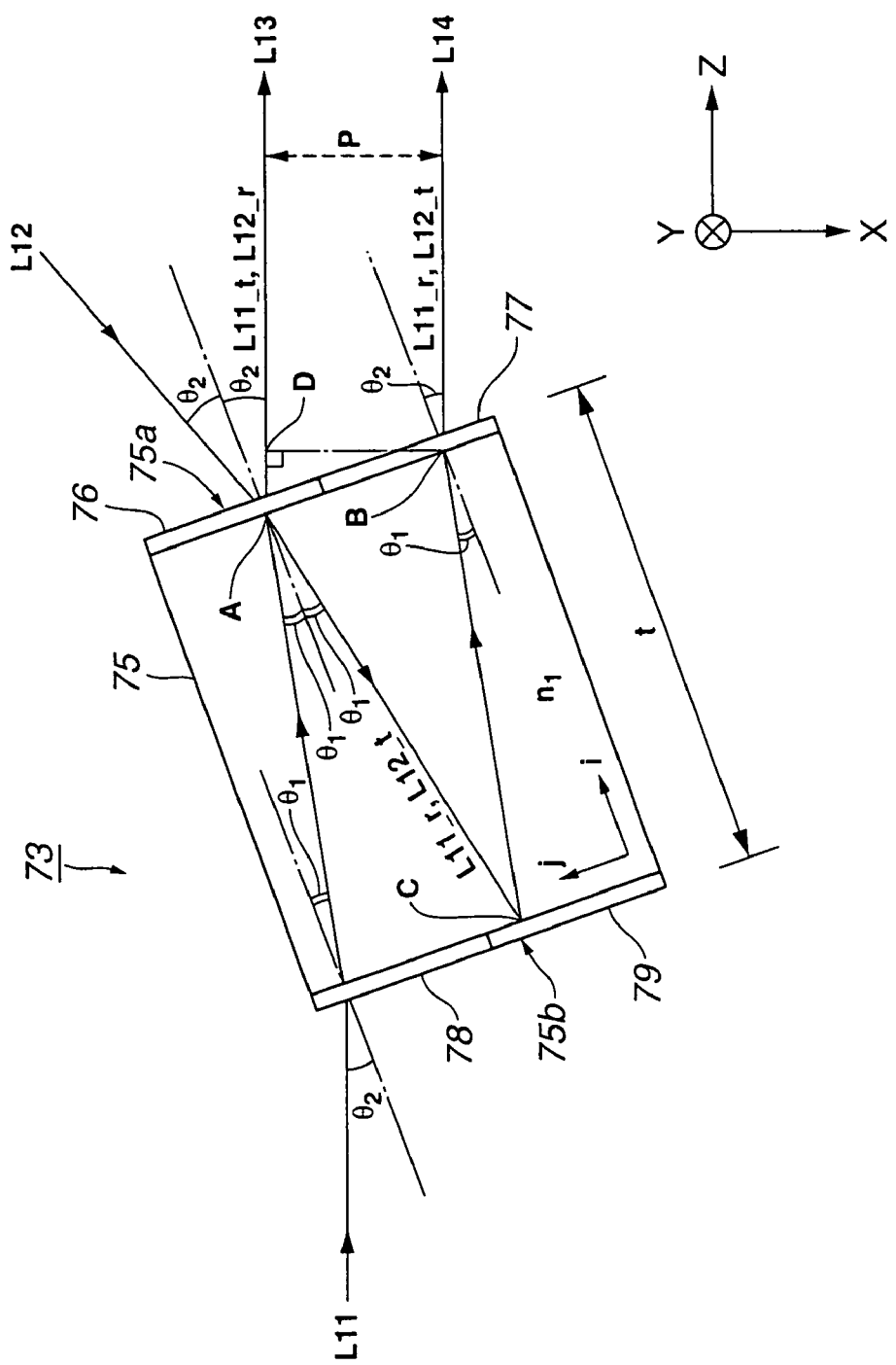
FIG. 21 illustrates the construction of an optically-coupled device used in the light irradiator as the sixth embodiment of the present invention shown in FIG. 20.

Next, the optically-coupled device 73 will be explained with reference to FIG. 21.

As shown, the optically-coupled device 73 includes a rectangular parallelopiped substrate 75 formed from a light-transmissive material having a refractive index $n_1$. It should be noted that a direction parallel to an arbitrary side of the rectangular parallelopiped is defined as longer-side direction (i direction). The length of the longer side-directional side of the substrate 75 may not be that of the longest side of the rectangular parallelopiped. Also, a direction of an arbitrary side perpendicular to the longer side (i direction) is defined as shorter-side direction (j direction).

The substrate 75 has the beam splitting coating 76 and a first anti-reflection coating 77 formed on one side 75a thereof perpendicular to the longer-side direction (i direction). Also, the substrate 75 has a second anti-reflection coating 78 and a total-reflection coating 79 formed on the other side 75b thereof perpendicular to the longer-side direction (i direction) parallel to the side 75a. The beam splitting coating 76 reflects and allows an incident laser beam to pass through at a ratio of 1:1 between reflection and transmission. The first and second anti-reflection coatings 77 and 78 allow an incident laser beam to pass through without reflecting the beam. The total-reflection coating 79 reflects an incident laser beam totally without allowing it to pass through. Each of these coatings is formed on the sides 75a and 75b by a technique like evaporation for example.

More specifically, the beam splitting coating 76 is formed in one of two areas defined by dividing the side 75a of the substrate 75 by two in the shorter-side direction (j direction). The first anti-reflection coating 77 is formed in the other area on the side 75a where the beam splitting coating 76 is not formed. Also, the second anti-reflection coating 78 is formed in one of two areas defined by dividing the side 75b of the substrate 75 in the shorter-side direction (j direction). The total-reflection coating 79 is formed in the other area on the side 75b where the second anti-reflection coating 78 is not formed. It should be noted that the beam splitting coating 76 and second anti-reflection coating 78 are formed in positions, respectively, opposite to each other. That is, in case the beam splitting coating 76 and first anti-reflection coating 77 are formed in this order in an arbitrary direction in the shorter-side direction (j direction), the second anti-reflection coating 78 and total-reflection coating 79 will be formed in this order in the arbitrary direction.

Note that the substrate 75 is a rectangular parallelopiped but its shape is not limited to this rectangular parallelopiped if it has the sides 75a and 75b which are at least flat and parallel to each other.

The optically-coupled device 73 constructed as above is disposed inside the light irradiator 70 with the longer-side direction (i direction) of its substrate 75 being oriented in the Z direction, the shorter-side direction (j direction) of the substrate 75 being oriented in the X direction and with the substrate 75 itself being turned a predetermined angle $\theta_2$ ($0<\theta_2<90°$) about the Y direction.

The optically-coupled device 73 thus disposed receives the incident first and second laser beams L11 and L12 having traveled along a plane perpendicular to the sides 75a and 75b of the substrate 75. Say, the first and second laser beams L11 and L12 are incident upon the optically-coupled device 73 after traveling along a plane defined by the X and Z axes.

The first laser beam L11 is incident at an angle $\theta_2$ upon the second anti-reflection coating 78 from outside the optically-coupled device 73.

On the assumption that the refractive index of air is $n_2$, the incident beam upon the substrate 75 and beam outgoing from the substrate 75 will have a relation of refraction between them, given by the following expression (11):

$$n_1 \sin \theta_1 = n_2 \sin \theta_2 \tag{11}$$

Note that since the refractive index of air can normally be regarded as "1", the expression (11) can be rewritten as given by the following expression (12):

$$n_1 \sin \theta_1 = \sin \theta_2 \tag{12}$$

Therefore, the first laser beam L11 incident upon the second anti-reflection coating 78 at the angle $\theta_2$ will be refracted at an angle $\theta_1$ before going into the substrate 75.

The incident first laser beam L11 passes through the substrate 75 and is incident at the angle $\theta_1$ from inside the optically-coupled device 73 upon the beam splitting coating 76 at a position A on the latter. The beam splitting coating 76 reflects and allow the incident first laser beam L11 to pass through at a ratio of 1:1 between reflection and transmission to split the incident laser beam into the transmitted part L11_t and reflected part L11_r. The transmitted part L11_t of the first laser beam L11 will go out at the angle $\theta_2$ toward outside the substrate 75 from the beam splitting coating 76 according to the relation given by the expression (11). The reflected part of the first laser beam L11 will go into the substrate 75 at the angle $\theta_1$.

On the other hand, the second laser beam L12 has the optical path thereof adjusted by the mirror 74, and is incident at the angle $\theta_2$ upon the beam splitting coating 76 at the position A from outside the optically-coupled device 73.

The beam splitting coating 76 reflects and allows the incident second laser beam L12 to pass through at a ratio of 1:1 between reflection and transmission to split the laser beam into the transmitted part L12_t and reflected parts L12_r. The transmitted part L12_t of the second laser beam L12 goes at the angle $\theta_1$ into the substrate 75 from the beam splitting coating 76 according the relation given by the expression (11). The reflected part L12_r of the second laser beam L12 is reflected at the angle $\theta_2$ toward outside the substrate 75.

Thus, the beam splitting coating 76 can provide the first resultant beam L13 produced by multiplexing the transmitted part L11_t of the first laser beam L11 and reflected part L12_r of the second laser beam L12, and also the second resultant beam L14 produced by multiplexing the reflected part L11_r of the first laser beam L11 and transmitted part L12_t of the second laser beam L12.

The first resultant beam L13 outgoes from the beam splitting coating 76 as it is to outside the substrate 75.

The second resultant beam L14 outgoes from the beam splitting coating 76 into the substrate 75, passes through the latter and is reflected by the total-reflection coating 79. After thus reflected by the total-reflection coating 79, the second resultant beam L14 is incident at the angle $\theta$ upon the first anti-reflection coating 77 at the position B. That is to say, the second resultant beam L14 will pass again through a boundary parallel to the beam splitting coating 76. The second resultant beam L14 outgoes from the first anti-reflection coating 77 at the angle $\theta_2$ to outside the substrate 75 according to the relation given by the expression (11).

Therefore, the optically-coupled device 73 can provide two resultant beams L13 and L14 having the optical axes thereof parallel to each other.

It should be reminded here that for an incoherent relation between the first and second resultant beams L13 and L14 outgoing from the optically-coupled device 73, the optical path difference between the first and second resultant beams L13 and L14 should be larger than the coherence length L set for the laser sources 11 and 12.

Assume here that the reflected part L11_r of the first laser beam L11 and transmitted part L12_t of the second laser beam L12 are reflected at a position C on the total-reflection coating 79 and a position D is selected along the optical axis of the first resultant beam L13. A straight line connecting the positions D and B is perpendicular to the optical axis of the first resultant beam L13.

In this case, on the assumption that the difference in length between the optical paths AC B and AD is larger than the coherence length L, the first and second resultant beams L13 and L14, outgoing from the optically-coupled device 73, can be put in an incoherent relation with each other.

Therefore, the distance t from the beam splitting coating 76 to the total-reflection coating 79, namely, the length t of the optically-coupled device 73 in the longer-side direction (t direction), may be set as given by the following expression (13):

$$t \geq L/2(n^2 - \sin^2 \theta_2)^{-1/2} \quad (13)$$

where $n = n_1$.

Also, since the optically-coupled device 73 refracts the second resultant beam L14 by a light-transmissive member having the refractive index $n_1$, the ratio between the interval P between the first and second resultant beams L13 and L14 and distance t from the beam splitting coating 76 to the total-reflection coating 79, that is, P/t, can be smaller than in the conventional light irradiator.

Even if the distance t is set for the first and second resultant beams L13 and L14 to be not coherent with each other, the optically-coupled device 73 can make the interval P coincide with the beam diameter $\phi$.

The interval P between the first and second resultant beams L13 and L14 can be made to coincide with the beam diameter $\phi$ under a condition as given by the following expression (14):

$$t = \phi(n^2 - \sin^2 \theta_2)^{1/2}/\sin 2\theta_2 \quad (14)$$

where $n = n_1$.

(7) SEVENTH EMBODIMENT

Figure 22:
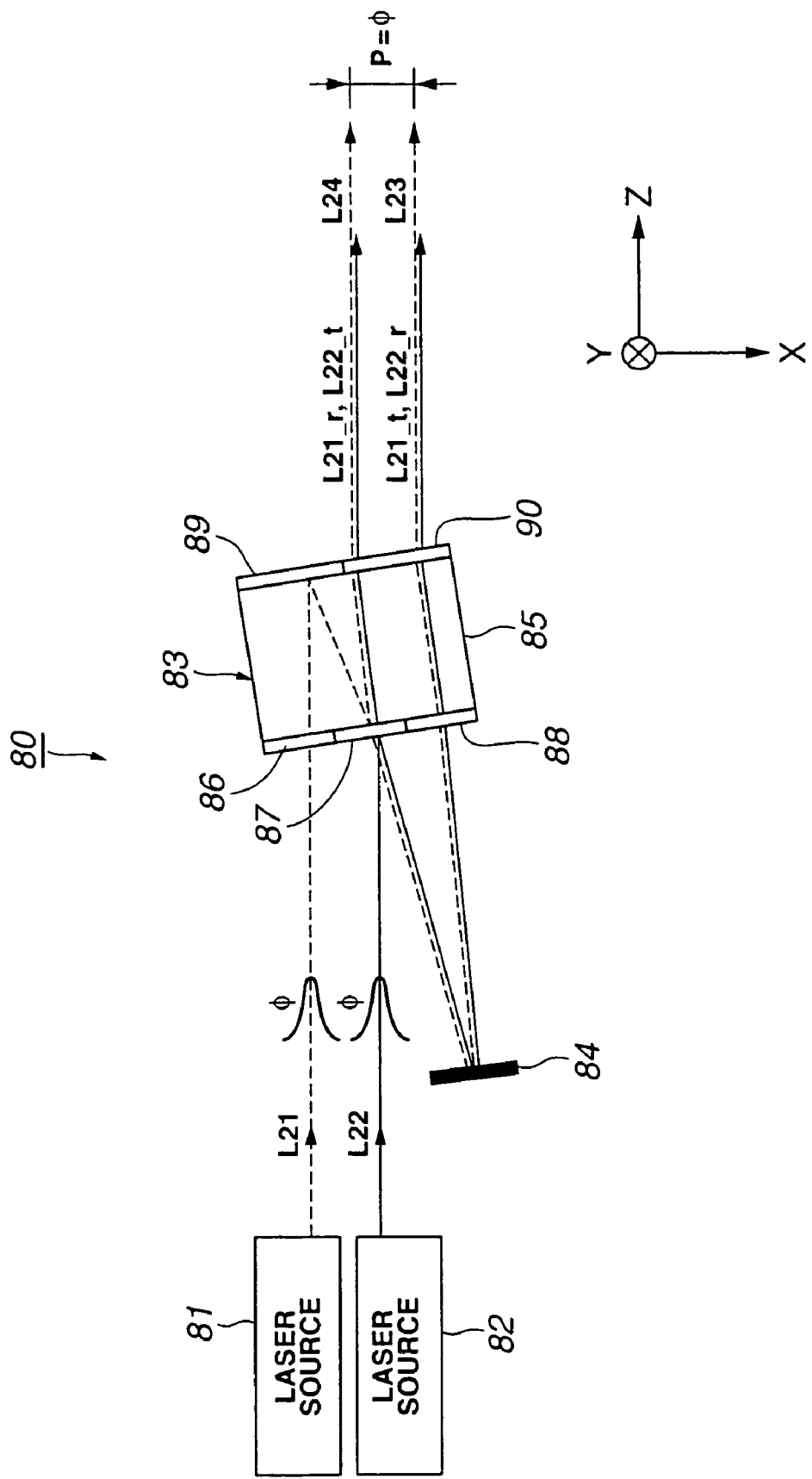
FIG. 22 illustrates the construction of a light irradiator as a seventh embodiment of the present invention.

The seventh embodiment of the present invention will be described hereinafter. The seventh embodiment of the present invention is a light irradiator used in the laser annealing apparatus, for example. FIG. 22 shows the construction of the light irradiator as the seventh embodiment.

Note that the light irradiator as the seventh embodiment of the present invention emits two parallel laser beams. In the following explanation, the optical-axial direction of the laser beams emitted from the light irradiator is taken as the Z direction, the direction in which the two laser beams are oriented in parallel to each other is taken as the X direction, and a direction perpendicular to the Z and X directions is taken as the Y direction.

The light irradiator as the seventh embodiment is generally indicated with a reference 80. As shown in FIG. 22, the light irradiator 80 includes a first laser source 81 which emits a first laser beam L21, a second laser source 82 which emits a second laser source L22, an optically-coupled device 83 which multiplexes the first and second laser beams L21 and L22 to provided two resultant beams, and a mirror 84 which reflects one of the two resultant beams produced by the optically-coupled device 83.

The first and second laser sources 81 and 82 emit the laser beams L21 and L22, respectively, identical in wavelength to each other. Also, each of the first and second laser sources 81 and 82 uses a collimator lens or the like to shape the laser beam into a circular beam. The laser beams thus shaped have the same intensity. The diameters of both the laser beams L21 and L22 are $\phi$. It should be noted that since the first and second laser source 81 and 82 are different from each other, the laser beams L21 and L22 emitted from them are incoherent with each other.

Both the first laser beam L21 emitted from the first laser source 81, and the second laser beam L22 emitted from the second laser source 82, are incident upon the optically-coupled device 83.

The optically-coupled device 83 includes a beam splitting coating 87. Each of the first and second laser beams L21 and L22 incident upon the optically-coupled device 83 is split by the beam splitting coating 87 into transmitted reflected parts. It should be noted that the construction of the optically-coupled device 83 and the optical path for the laser beam inside the optically-coupled device 83 will be described in detail later.

The optically-coupled device 83 provides a transmitted beam L21_t as a part of the first laser beam L21 that is transmitted through the beam splitting coating 87, reflected beam L21_r as a part of the first laser beam L21 that is reflected by the beam splitting coating 87, transmitted beam L22_t as a part of the second laser beam L22 that is transmitted through the beam splitting coating 87 and reflected beam L22_r as a part of the second laser beam L22 that is reflected by the beam splitting coating 87. The transmitted beam L21_t as a part of the first laser beam L21 that is transmitted through the beam splitting coating 87, and the reflected beam L22_r as a part of the second laser beam L22 that is reflected by the beam splitting coating 87, have the optical axes thereof coincident with each other, and multiplexed together by the optically-coupled device 83 to provide a resultant beam. The resultant beam provided by multiplexing the transmitted beam L21_t as a part of the first laser beam L21 that is transmitted through the beam splitting coating 87, and the reflected beam L22_r as a part of the second laser beam L22 that is reflected by the beam splitting coating 87, is taken herein as a first resultant beam L23. Also, the reflected beam L21_r as a part of the first laser beam L21 that is reflected by the beam splitting coating 87, and the transmitted beam L22_t as a part of the second laser beam L22 that is transmitted through the beam splitting coating 87, have the optical axes thereof coincident with each other, and multiplexed together by the optically-coupled device 83 to provide a resultant beam. The resultant beam provided by multiplexing the reflected beam L21_r as a part of the first laser beam L21 that is reflected by the beam splitting coating 87, and the transmitted beam L22_t as a part of the second laser beam L22 that is transmitted through the beam splitting coating 87, is taken herein as a second resultant beam L24.

The first and second resultant beams L23 and L24, once reflected by the mirror 84, pass again the optically-coupled device 83 and outgo from the optically-coupled device 83 to outside. The first and second resultant beams L23 and L24 going to outside outgo from the optically-coupled device 83 in the Z direction. Also, the first and second resultant beams L23 and L24 are oriented in parallel to each other in the X direction. The interval P between the optical axes of the first and second resultant beams L23 and L24 is equal to the diameter $\phi$ of the original laser beams L21 and L22.

Figure 23:
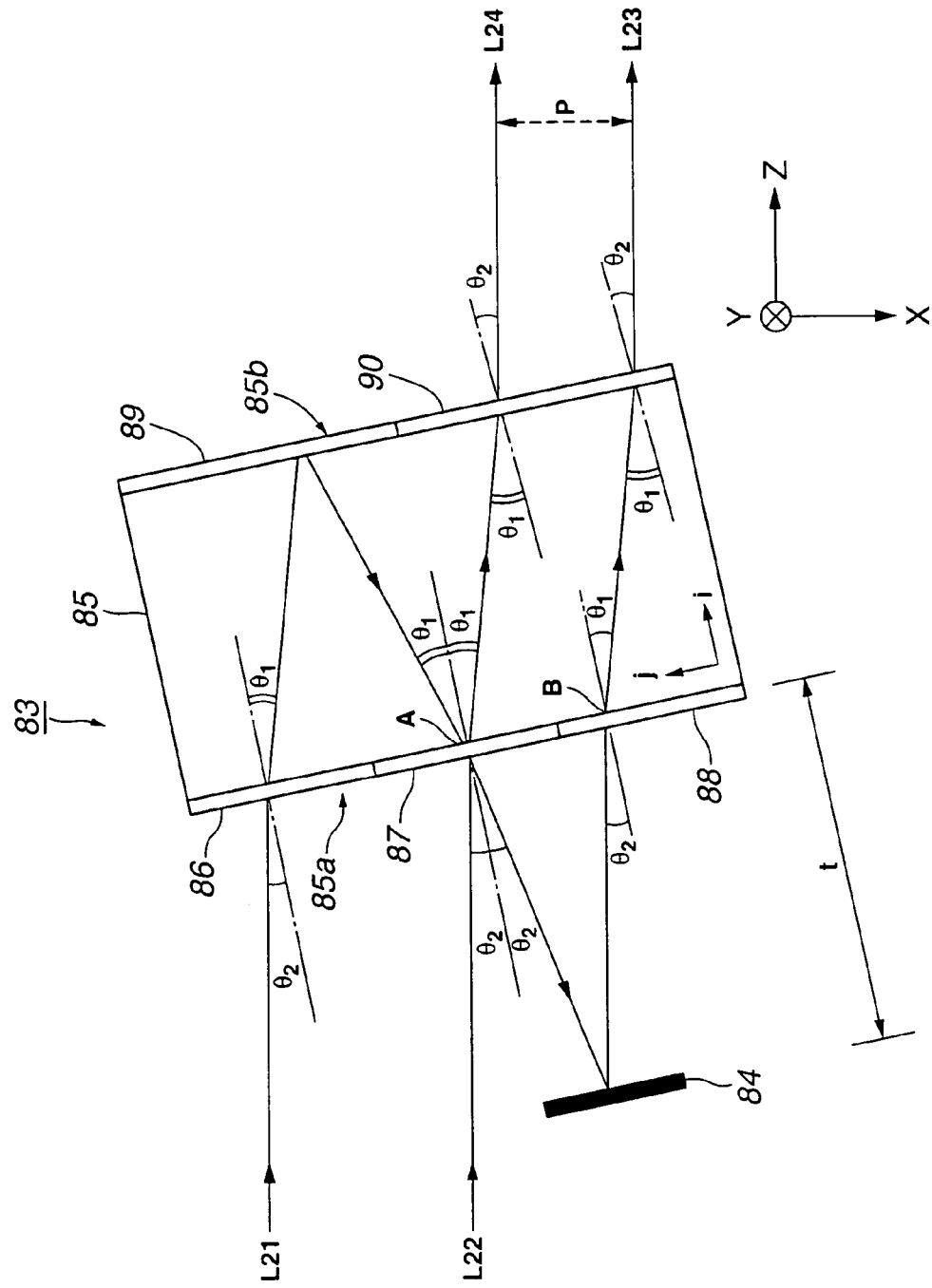
FIG. 23 illustrates the construction of an optically-coupled device used in the light irradiator as the seventh embodiment of the present invention shown in FIG. 22.

Next, the optically-coupled device 83 and mirror 84 will be explained with reference to FIG. 23.

As shown, the optically-coupled device 83 includes a rectangular parallelopiped substrate 85 formed from a transparent material whose refractive index is $n_1$. It should be noted that a direction parallel to an arbitrary side of the rectangular parallelopiped substrate 85 is defined as shorter-side direction (i direction). The length of the longer side-directional side of the substrate 85 may not be that of the longest side of the rectangular parallelopiped. Also, a direction of an arbitrary side perpendicular to the longer side (i direction) is defined as longer-side direction (j direction).

The substrate 85 has a first anti-reflection coating 86, beam splitting coating 87 and a second anti-reflection coating 88 formed on one side 85a thereof perpendicular to the shorter-side direction (i direction). Also, the substrate 85 has a total-reflection coating 89 and a third anti-reflection coating 90 formed on the other side 85b thereof perpendicular to the shorter-side direction (i direction) parallel to the side 85a. The beam splitting coating 87 reflects and allows an incident laser beam to pass through at a ratio of 1:1 between reflection and transmission. The first, second anti-reflection and third coatings 86, 88 and 90 allow an incident laser beam to pass through without reflecting the beam. The total-reflection coating 89 reflects an incident laser beam totally without allowing it to pass through. Each of these coatings is formed on the sides 85a and 85b by a technique like evaporation for example.

The first anti-reflection coating 86 is formed in any one of extreme ones of three areas defined by dividing the side 85a of the substrate 85 by three in the longer-side direction (j direction). The beam splitting coating 87 is formed in the middle one of the three areas defined by dividing the side 85a of the substrate 85 by three in the longer-side direction (j direction). Also, the second anti-reflection coating 88 is formed in the other extreme one of three areas defined by dividing the side 85b of the substrate 85 by three in the longer-side direction (j direction), where the first anti-reflection coating 86 is not formed.

The total-reflection coating 89 is formed in one of two areas defined by dividing the side 85b of the substrate 85 by two in the longer-side direction (j direction). The third anti-reflection coating 90 is formed in the other area on the side 85b where the total-reflection coating 89 is not formed. It should be noted that in case the first anti-reflection coating 86, beam splitting coating 87 and second anti-reflection coating 88 are formed in this order in an arbitrary direction in the longer-side direction (j direction), the total-reflection coating 89 and third anti-reflection coating 90 will be formed in this order in the arbitrary direction.

Also, the mirror 84 is disposed on the side 85a in the shorter-side direction (i direction) in relation to the optically-coupled device 83 and in parallel to the sides 85a and 85b.

The optically-coupled device 83 constructed as above is disposed inside the light irradiator 80 with the shorter-side direction (i direction) of its substrate 85 being oriented in the Z direction, the longer-side direction (j direction) of the substrate 85 being oriented in the X direction and with the substrate 85 itself being turned a predetermined angle $\theta_2$ ($0<\theta_2<90°$) about the Y direction. Also the mirror 84 is disposed inside the light irradiator 80 to be parallel to the sides 85a and 85b of the optically-coupled device 83.

The optically-coupled device 83 thus disposed receives the incident first and second laser beams L21 and L22 incident thereupon after traveling along a plane perpendicular to the sides 85a and 85b of the substrate 85. Namely, the first and second laser beams L21 and L22 are incident upon the optically-coupled device 83 after traveling along a plane defined by the X and Z axes.

The first laser beam L21 is incident at an angle $\theta_2$ upon the first anti-reflection coating 86 from outside the optically-coupled device 83.

The first laser beam L21 incident upon the first anti-reflection coating 86 at the angle $\theta_2$ will be refracted at an angle $\theta_1$ before going into the substrate 85 according the relation given by the above expression (11). The incident first laser beam L21 upon the optically-coupled device 83 passes through the substrate 85 and is reflected by the total-reflection coating 89. The first laser beam L21 reflected by the total-reflection coating 89 is incident at the angle $\theta_1$ from inside the optically-coupled device 83 upon the beam splitting coating 87 at the position A on the latter.

The beam splitting coating 87 reflects and allow the incident first laser beam L21 to pass through at a ratio of 1:1 between reflection and transmission to split the incident laser beam into the transmitted beam L21_t and reflected beam L21_r. The transmitted part L21_t of the first laser beam L21 will go out at the angle $\theta_2$ toward outside the base coating 85 from the beam splitting coating 87 according to the relation given by the expression (11). The reflected part L21_r of the first laser beam L21 will be reflected at the angle $\theta_1$ into the substrate 85.

On the other hand, the second laser beam L22 has the optical path thereof adjusted by the mirror 74, and is incident at the angle $\theta_2$ upon the beam splitting coating 87 at the position A from outside the optically-coupled device 83.

The beam splitting coating 87 reflects and allows the incident second laser beam L22 to pass through at a ratio of 1:1 between reflection and transmission to split the laser beam into the transmitted part L22_t and reflected part L22_r. The transmitted part L22_t of the second laser beam L22 goes at the angle $\theta_1$ into the substrate 85 from the beam splitting coating 87 according the relation given by the expression (11). The reflected part L22_r of the second laser beam L22 is reflected at the angle $\theta_2$ toward outside the substrate 85.

Thus, the beam splitting coating 87 can provide the first resultant beam L23 produced by multiplexing the transmitted part L21_t of the first laser beam L21 and reflected part L22_r of the second laser beam L22, and also the second resultant beam L24 produced by multiplexing the reflected part L21_r of the first laser beam L21 and transmitted part L22_t of the second laser beam L22.

The first resultant beam L23 outgoes from the beam splitting coating 87 as it is to outside the substrate 85 and is reflected by the mirror 84. The first resultant beam L23 reflected by the mirror 84 is incident at the angle $\theta_2$ upon the second anti-reflection coating 88 at the position B on the latter.

The first and second resultant beams L23 and L24 pass through the substrate 85 in parallel to each other, and incident at the angle $\theta_1$ upon the third anti-reflection coating 90 from inside the substrate 85. The first and second resultant beams L23 and L24 outgo from the third anti-reflection coating 90 at the angle $\theta_2$ to outside the substrate 85 according to according to the relation given by the expression (11).

Therefore, the optically-coupled device 83 can provide two resultant beams L23 and L24 having the optical axes thereof parallel to each other.

It should be reminded here that for an incoherent relation between the first and second resultant beams L23 and L24 outgoing from the optically-coupled device 83, the optical path difference between the first and second resultant beams L23 and L24 should be larger than the coherence length L set for the laser sources 21 and 22.

Therefore, the distance $\underline{t}$ from the beam splitting coating 87 to the mirror 84 should be set as given by the above expression (13).

Also, since the optically-coupled device 83 refracts the first and second resultant beams L23 and L14 by a light-transmissive member having the refractive index $n_1$, the ratio between the interval P between the first and second resultant beams L23 and L24 and distance $\underline{t}$ from the beam splitting coating 87 to the mirror 84, that is, P/t, can be smaller than in the conventional light irradiator.

Therefore, even if the distance $\underline{t}$ is set for the first and second resultant beams L23 and L24 to be incoherent with each other, the optically-coupled device 83 can make the interval P coincide with the beam diameter $\phi$, for example.

The interval P between the first and second resultant beams L23 and L24 can be made to coincide with the beam diameter $\phi$ under a condition as given by the above expression (14).

(8) EIGHTH EMBODIMENT

Figure 24:
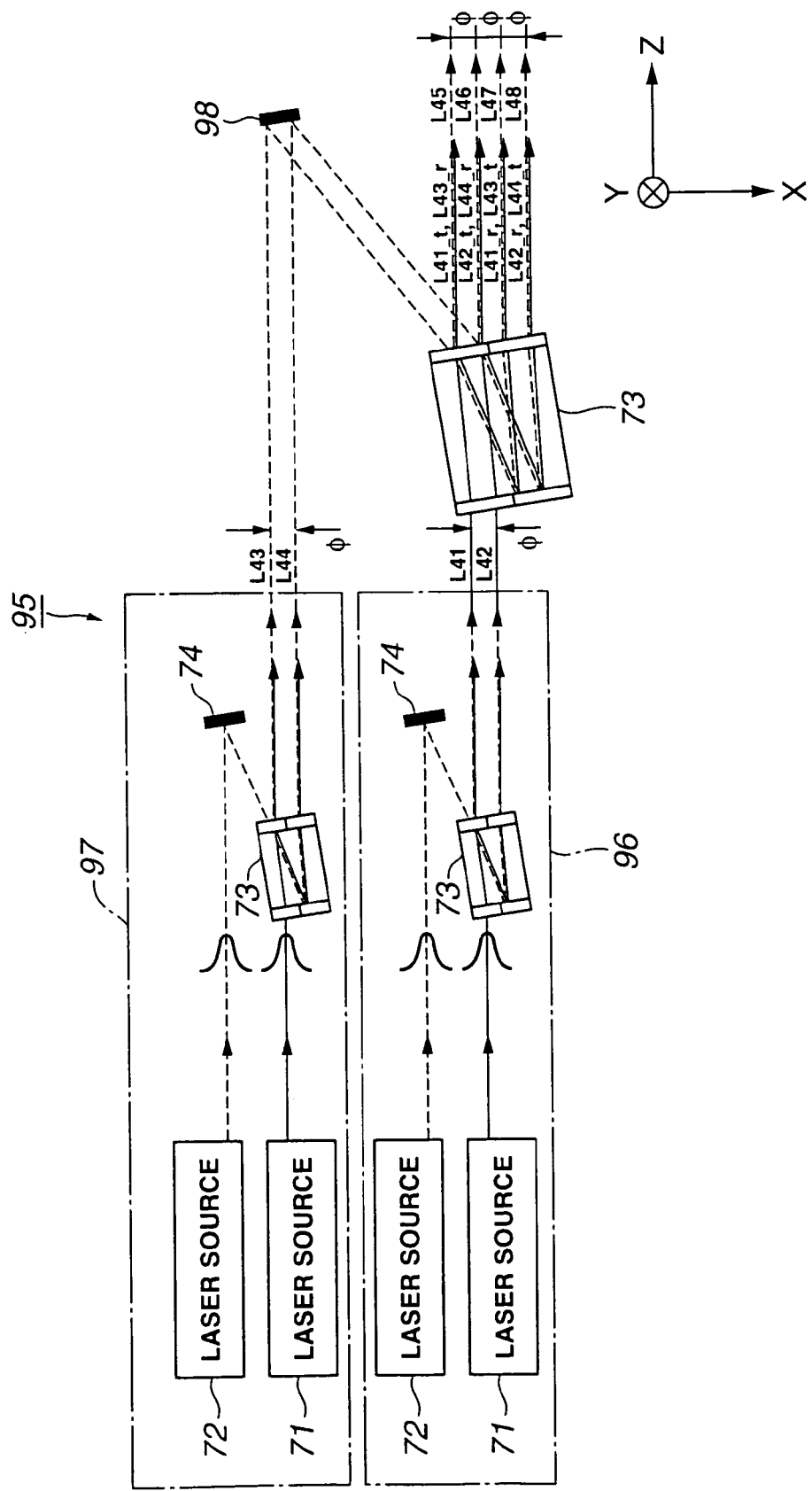
FIG. 24 illustrates the construction of a light irradiator as an eighth embodiment of the present invention.

The eighth embodiment of the present invention will be described hereinafter. The eighth embodiment of the present invention is a light irradiator which will be described hereinafter with reference to FIG. 24 showing the construction of the light irradiator.

Note that the light irradiator as the eighth embodiment of the present invention emits four parallel laser beams. In the following explanation, the optical-axial direction of the laser beams emitted from the light irradiator is taken as the Z direction, the direction in which the four laser beams are oriented in parallel to each other is taken as the X direction, and a direction perpendicular to the Z and X directions is taken as the Y direction.

The light irradiator as the eighth embodiment is generally indicated with a reference 95. As shown in FIG. 24, the light irradiator 95 includes a first laser emitter 96 which emits two parallel laser beams (a first laser beam L41 and second laser beam L42), second laser emitter 97 which emits two parallel laser beams (third laser beam L43 and fourth laser beam L44), an optically-coupled device 73 which multiplexes the first to fourth second laser beams L41 to L44 to provided four resultant beams, and a mirror 98 which guides the second and fourth laser beams L42 and L44 to the optically-coupled device 73.

The first and second laser emitters 96 and 97 are identical in construction to the light irradiator 70 as the sixth embodiment of the present invention. Therefore, each of the first and second laser emitters 96 and 97 emits two laser beams having a diameter $\phi$, oriented in parallel to each other at a distance $\phi$ from each other and incoherent with each other.

The first and second laser beams L41 and L42 emitted from the first laser emitter 96 are incident upon the optically-coupled device 73, while the third and fourth laser beams L43 and L44 emitted from the second laser emitter 97 is reflected by the mirror 98 before being incident upon the optically-coupled device 73.

The optically-coupled device 73 is identical in construction to the optically-coupled device 73 included in the sixth embodiment. That is, it includes a beam splitting coating 76. Each of the first to fourth beams L41 to L44 incident upon the optically-coupled device 73 is split by the beam splitting coating 76 into transmitted and reflected parts. It should be noted that the construction of the optically-coupled device 73 and the optical path for the laser beam inside the optically-coupled device 73 will be described in detail later.

The optically-coupled device 73 provides transmitted parts and reflected parts of the first to fourth laser beams L41 to L44 incident upon the optically-coupled device 73. A transmitted part L41_t of the first laser beam L41 and reflected part L43_r of the third laser beam L43 have the optical axes thereof coincident with each other, and multiplexed together by the optically-coupled device 73 to provide a resultant beam. A transmitted part L42_t of the second laser beam L42 and reflected part L44_r of the fourth laser beam L44 have the optical axes thereof coincident with each other, and multiplexed together by the optically-coupled device 73 to provide a resultant beam. A reflected part L41_r of the first laser beam L41 and transmitted part L43_t of the third laser beam L43 have the optical axes thereof coincident with each other, and multiplexed by the optically-coupled device 73 to provide a resultant beam. Also, a reflected part L42_r of the second laser beam L42 and transmitted part L44_t of the fourth laser beam L44 have the optical axes thereof coincident with each other, and multiplexed by the optically-coupled device 73 to provide a resultant beam.

In the following description, the resultant beam produced by multiplexing the transmitted part L41_t of the first laser beam L41 and reflected part L43_r of the third laser beam L43 is taken as a first resultant beam L45. The resultant beam produced by multiplexing the transmitted part L42_t of the second laser beam L42 and reflected part L44_r of the fourth laser beam L44 is taken as a second resultant beam L46. The resultant beam produced by multiplexing the reflected part L41_r of the first laser beam L41 and transmitted part L43_t of the third laser beam L43 is taken as a third resultant beam L47. Also, the resultant beam produced by multiplexing the reflected part L42_r of the second laser beam L42 and transmitted part L44_t of the fourth laser beam L44 is taken as a fourth resultant beam L48.

The first to fourth resultant beams L45 to L48 outgo from the optically-coupled device 73 in the Z direction. Also, the first to fourth resultant beams L45 to L48 are oriented in parallel to each other in the X direction. The interval P between the optical axes of the first to fourth resultant beams L45 to L48 is equal to the diameter φ of the original laser beams L41 to L44.

Figure 25:
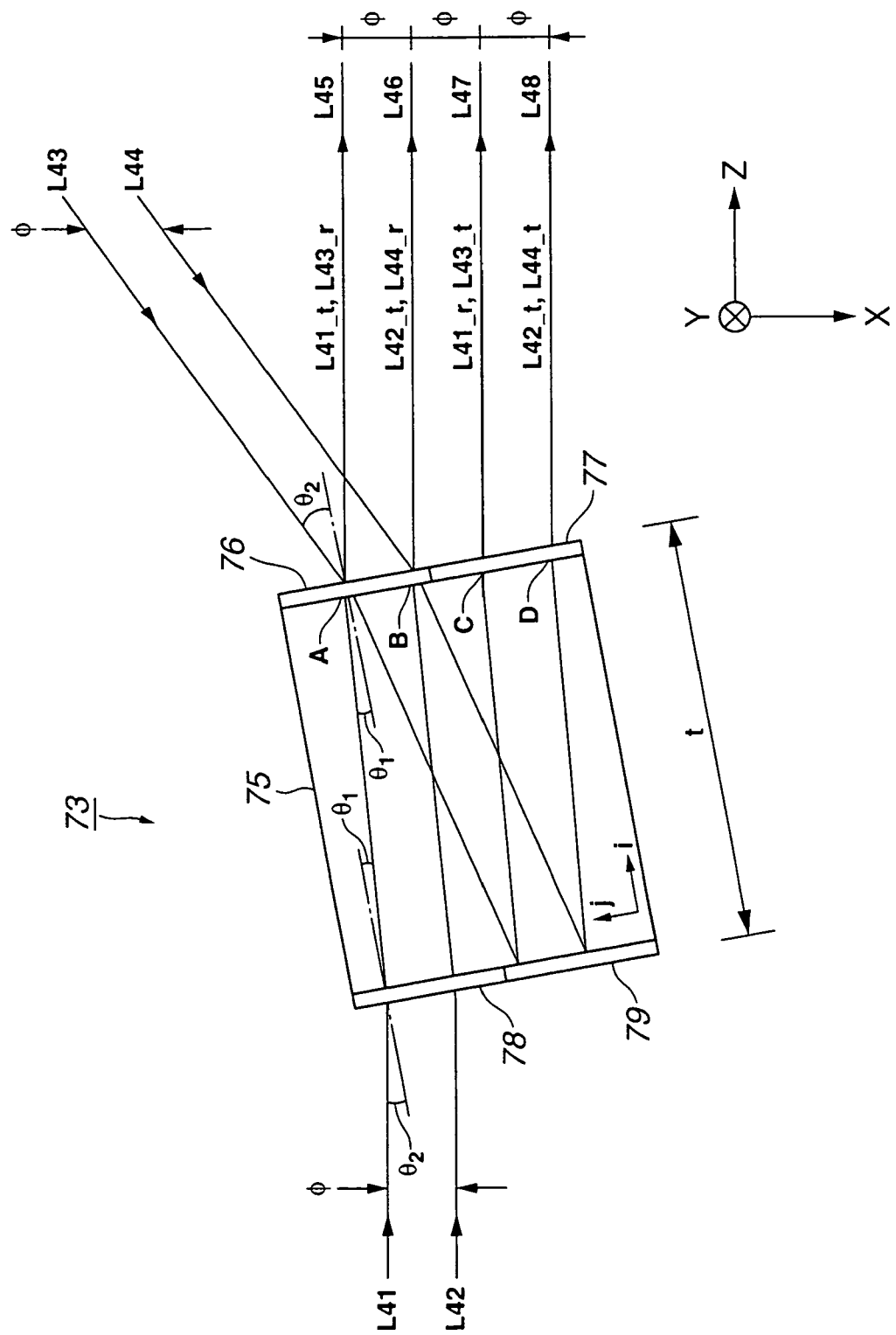
FIG. 25 illustrates the construction of an optically-coupled device used in the light irradiator as the eighth embodiment of the present invention shown in FIG. 24.

Next, the optically-coupled device 73 included in this eighth embodiment will be explained with reference to FIG. 25.

The optically-coupled device 73 is disposed inside the light irradiator 95 with the longer-side direction (i direction) of the substrate 75 being oriented in the Z direction, the shorter-side direction (j direction) of the substrate 75 being oriented in the X direction and the substrate 75 being turned a predetermined angle $\theta_2$ ($0<\theta_2<90$) about the Y direction.

Upon the optically-coupled device 73 disposed as above, there are incident the first to fourth laser beams L41 to L44 after traveling along a plane perpendicular to the sides 75a and 75b of the substrate 75. That is, the first to fourth laser beams L41 to L44 are incident upon the optically-coupled device after traveling along the X-Z plane.

The first and second laser beams L41 and L42 are incident at an angle $\theta_2$ upon the second anti-reflection coating 78 from outside the optically-coupled device 73. The first and second laser beams L41 and L42 having been incident upon the second anti-reflection coating 78 is refracted an angle $\theta_1$ before going into the substrate 75.

The first and second laser beams L41 and L42 incident upon the optically-coupled device 73 pass through the substrate 75 and are incident upon the beam splitting coating 76 at an angle $\theta_1$ from inside the optically-coupled device 73. The first laser beam L41 is incident upon the beam splitting coating 76 at the position A, while the second laser beam L42 is incident upon the beam splitting coating 76 at the position B. It should be noted that the X-directional distance between the positions A and B is equal to the beam diameter φ.

The beam splitting coating 76 splits each of the incident first and second laser beams L41 and L42 into transmitted and reflected parts at a ratio of 1:1 between the transmission and reflection. A part L41_t, transmitted through the beam splitting coating 76, of the first laser beam L41, and a part L42_t, transmitted through the beam splitting coating 76, of the second laser beam L42, are irradiated at an angle $\theta_2$ from the beam splitting coating 76 toward outside the substrate 75 according to the relation given by the above expression (11). A part L41_r, reflected by the beam splitting coating 76, of the first laser beam L41, and a part L42_r, reflected by the beam splitting member 76, of the second laser beam L42, are reflected at an angle $\theta_1$ into the substrate 75.

On the other hand, the third and fourth laser beams L43 and L44 have the optical paths thereof adjusted by the mirror 98, and are incident at an angle $\theta_2$ upon the beam splitting coating 76 from outside the optically-coupled device 73. The third laser beam L43 is incident upon the beam splitting coating 76 at the position A, while the fourth laser beam L44 is incident upon the beam splitting coating at the position B.

The beam splitting coating 76 splits each of the incident third and fourth laser beams L43 and L44 into transmitted and reflected parts at a ratio of 1:1 between the transmission and reflection. A part L43_t, transmitted through the beam splitting coating 76, of the third laser beam L43, and a part L44_t, transmitted through the beam splitting coating 76, of the fourth laser beam L44, are irradiated at an angle $\theta_1$ from the beam splitting coating 76 into the substrate 75 according to the relation given by the above expression (11). A part L43_r, reflected by the beam splitting coating 76, of the third laser beam L43, and a part L44_r, reflected by the beam splitting member 76, of the fourth laser beam L44, are reflected at an angle $\theta_2$ toward outside the substrate 75.

Thus, the beam splitting coating 76 can provide a first resultant beam L45 produced by multiplexing the transmitted part L41_t of the first laser beam L41 and reflected part L43_r of the third laser beam L43, a second resultant beam L46 produced by multiplexing the transmitted part L42_t of the second laser beam L42 and reflected part L44_r of the fourth laser beam L44, a third resultant beam L47 produced by multiplexing the reflected part L41_r of the first laser beam L41 and transmitted part L43_t of the third laser beam L43, and a fourth resultant beam produced by multiplexing the reflected part L42_r of the second laser beam L42 and transmitted part L44_t of the fourth laser beam L44.

The first and second resultant beams L45 and L46 are irradiated at they are from the beam splitting coating 76 to outside the substrate 75.

The third and fourth resultant beams L47 and L48 outgo from the beam splitting coating 76 into the substrate 75, pass through the substrate 75 and reflected by the total-reflection coating 79. The third and fourth resultant beams L47 and L48 are reflected by the total-reflection coating 79 and ten incident at an angle $\theta_1$ upon the first anti-reflection coating 77. That is to say, these resultant beams pass again through a boundary parallel to the beam splitting coating 76. The third resultant beam L47 is incident at the first anti-reflection coating 77 at a position C, while the fourth resultant beam L48 is incident upon the first-reflection coating 77 at a position D. It should be noted that the X-directional distance between the positions C and D is equal to the beam diameter φ. Also, the X-directional distance between the positions B and C is equal to the beam diameter φ. The third and fourth resultant beams L47 and L48 outgo from the first anti-reflection coating 77 at an angle $\theta_2$ to outside the substrate 75 according to the relation given by the above expression (11).

Therefore, the optically-coupled device 73 can provide the four resultant beams L45 to L48 having the optical axes thereof parallel to each other.

It should be reminded here that for an incoherent relation between the first to fourth resultant beams L45 and L48 outgoing from the optically-coupled device 73, the distance 1 from the beam splitting coating 76 to the total-reflection coating 79, namely, the length 1 of the optically-coupled device 73 in the longer-side direction (i direction), may be set as given by the following expression (15):

$$t \geq \{(L_{max}-L_{min})+L\}/2 \times (n^2-\sin^2\theta_2)^{-1/2} \quad (15)$$

where $L_{min}$ is the optical path length of one, whose optical length is the shortest, of a plurality of laser beams from the laser emitters 96 and 97, $L_{max}$ is the optical path length of one, whose optical path length is the longest, of the laser beams, and L is the coherence length of one, for which a shortest coherence length is set, of the four laser sources.

The interval P between the successive two of the first to fourth resultant beams L45 to L48 can be made to coincide with the beam diameter φ under a condition as given by the following expression (16):

$$t=\{2^{d-1}\phi(n^2-\sin^2\theta_2)^{1/2}/\sin 2\theta_2 \quad (16)$$

where $n=n_1$.

In the eighth embodiment, each of the optically-coupled devices 73 is two staged. However, the number (d) of the stages in the optically-coupled devices 73 is not limited to two, but it may be three or four. That is, the optically-coupled device 73 can multiplex a plurality of laser beams oriented in parallel to each other as long as the shorter-side length (in the j direction) is adjusted.

As above, the light irradiator 95 as the eighth embodiment of the present invention uses a plurality of optically-coupled devices 73 to multiple a plurality of laser beams. Therefore, the present invention enables to multiplex an increased number of laser beams by an increased number of multiplexing stages.

(9) NINTH EMBODIMENT

The ninth embodiment of the present invention will be described hereinafter. The ninth embodiment of the present invention is a laser annealing apparatus.

Note that the laser annealing apparatus as the ninth embodiment of the present invention uses the aforementioned light irradiator 95 as the eighth embodiment. The light irradiator 95 emits four parallel laser beams. In the following explanation, the optical-axial direction of the laser beam emitted from the light irradiator is taken as the Z direction, a direction in which the four laser beams are oriented in parallel to each other is taken as the X direction, and a direction perpendicular to the Z and X directions is taken as the Y direction.

Figure 26:
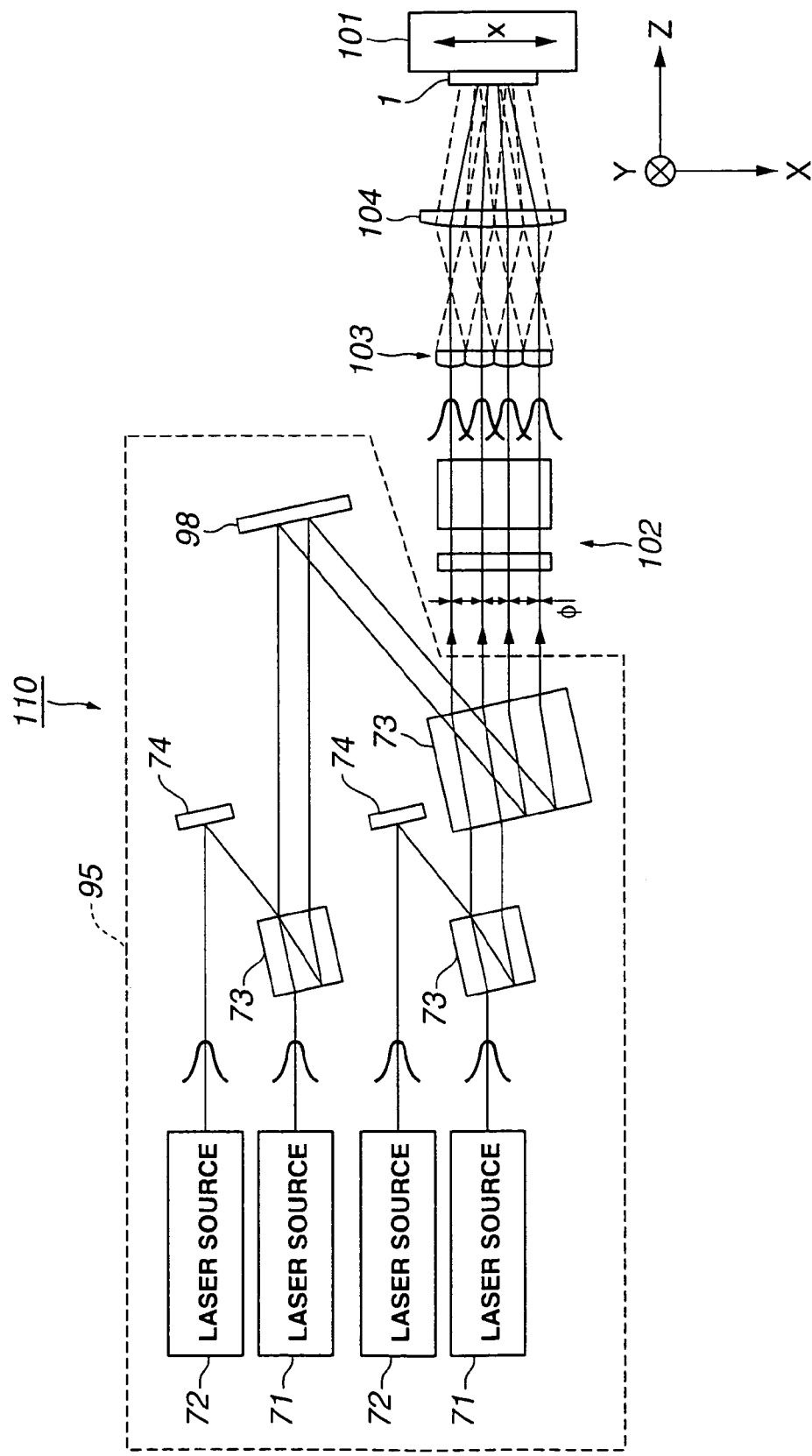
FIG. 26 illustrates the construction of a laser annealing apparatus as a ninth embodiment of the present invention, viewed from the Y direction.
Figure 27:
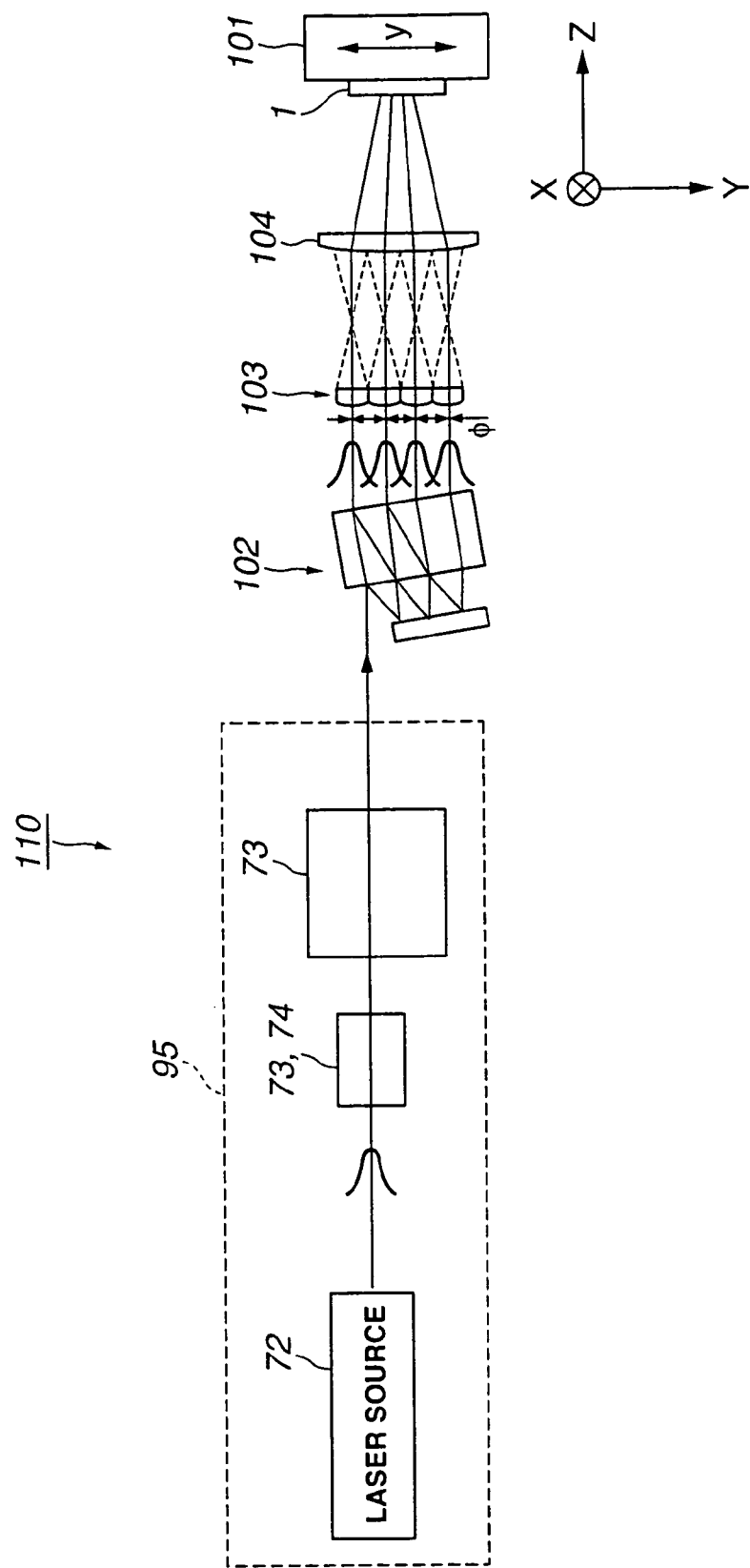
FIG. 27 illustrates the construction of the laser annealing apparatus as the ninth embodiment of the present invention, shown in FIG. 26, viewed from the X direction.

Referring now to FIGS. 26 and 27, there is schematically illustrated the construction of the laser annealing apparatus as the ninth embodiment of the present invention. The laser annealing apparatus is generally indicated with a reference 110. FIG. 26 shows the construction of the laser annealing apparatus 110 viewed from the Y direction, and FIG. 27 shows the construction of the laser annealing apparatus 110 viewed from the X direction.

As shown, the laser annealing apparatus 110 as the ninth embodiment of the present invention includes a stage 101 on which a substrate 1 to be annealed is to be mounted, a light irradiator 95 which emits four laser beams oriented in parallel to each other in the X direction, a beam splitter 102 which splits each of the four laser beams incident thereupon from the light irradiator 95 into four laser beams in the Y direction to provide a total of sixteen laser beams, a lens array 103 composed of sixteen convex lenses and receiving sixteen laser beams incident thereupon from the beam splitter 102, and a condenser lens 104 which guides the sixteen laser beams coming from the lens array 103 to a predetermined area on the substrate 1.

The stage 101 is equivalent to the stage 11 used in the laser annealing apparatus 10 as the first embodiment of the present invention. That is, the stage 101 is moved in a direction parallel to the main side thereof (in the X and Y directions in FIGS. 26 and 27) while holding the substrate 1 mounted on the main side thereof. In the laser annealing apparatus 110, the position of the substrate 1 in relation to the laser spot can be moved by moving the state 101. That is, by moving the stage 101, it is possible to control the position where the substrate 1 is to be annealed. It should be noted that the movement of the stage 101 is controlled by a controller (not shown).

As mentioned above, the light irradiator 95 used in this ninth embodiment is the light irradiator as the eighth embodiment of the present invention. Namely, is emits four laser beams having the diameter φ and oriented in parallel to each other in the X direction. The four laser beams emitted from the light irradiator 95 are incoherent with each other. Also, the four laser beams from the light irradiator 95 are incident upon the beam splitter 102.

The beam splitter 102 splits each of the incident four laser beams oriented in parallel to each other in the X direction by four in the Y direction to provide four laser beams having a diameter φ and oriented in parallel to each other in the Y direction. Therefore, the beam splitter 102 provides a total of sixteen laser beams oriented in the form of a 4×4 matrix at intervals φ on the X-Y plane. The beam splitter 102 is constructed as will be described in detail later.

The sixteen laser beams from the beam splitter 102 are incident upon the lens array 103.

The lens array 103 is composed of sixteen convex lens disposed in the form of a matrix. The convex lenses are disposed at an interval equivalent to the intervals of the output laser beams from the beam splitter 102. Each of the convex lenses is provided on the optical axis of each output laser beam. The output lasers from the lens array 103 are condensed once to provide secondary light sources, and then incident upon the condenser lens 104.

The condenser lens 104 multiplexes the sixteen laser beams condensed by the lens array 103, and focuses them on a predetermined area on the substrate 1.

Figure 28:
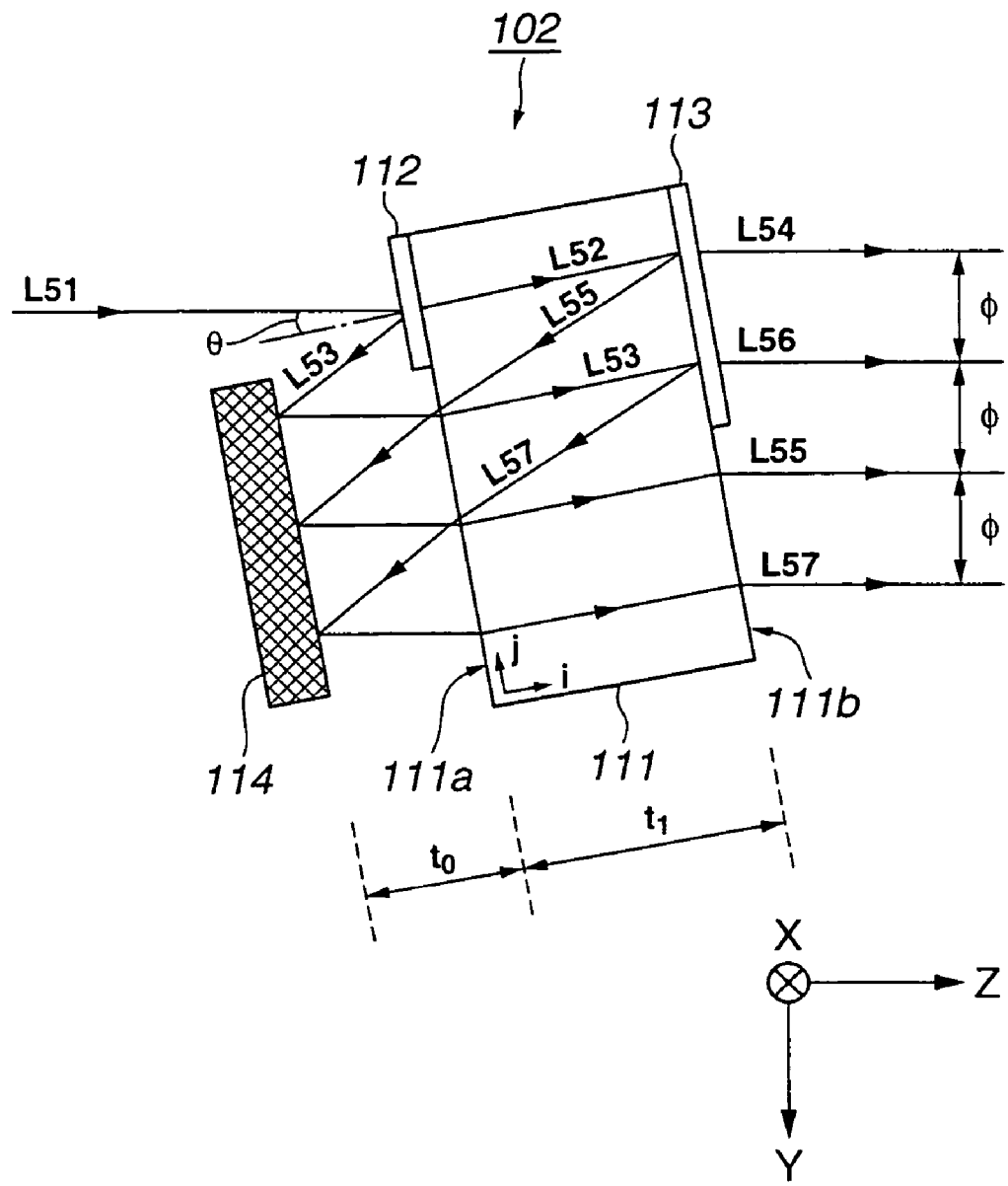
FIG. 28 illustrates the construction of a beam splitter unit included in the laser annealing apparatus as the ninth embodiment of the present invention shown in FIG. 26.

Next, the construction of the beam splitter 102 will be described in detail with reference to FIG. 28. It should be noted that FIG. 28 shows a view of the beam splitter 102 from the X direction.

The beam splitter 102 includes a rectangular parallelopiped substrate 111 formed from a transparent material having a refractive index $n_1$. The substrate 111 has a first coating-like beam splitter ("beam splitter" will be referred to simply as "BS" hereinafter) 112 formed on one side 111a thereof perpendicular to a direction (i direction in FIG. 28) parallel to an arbitrary side thereof, and a coating-like second BS 113 formed on the other side 111b thereof. The first and second BSs 112 and 113 have the beam splitting surfaces thereof parallel to each other, and are oriented side by side in the Z direction. The ratio between transmission and reflection of these first and second BSs 112 and 113 is 1:1. The first BS 112 is disposed nearer to the laser beam inlet side of the beam splitter 102 than the second BS 113.

Further, the beam splitter 102 includes a mirror 114 having the light reflecting surface thereof disposed in parallel to the beam splitting surfaces of the first and second BSs 112 and 113 and oriented along with the first and second BSs 112 and 113 in the Z direction. The mirror 114 reflects the laser beam incident upon the flat reflecting surface thereof. The mirror 114 is disposed nearer to the laser beam inlet side of the beam splitter 102 than the first BS 112.

The beam splitting surfaces of the first and second BSs 112 and 113 and the light reflecting surface of the mirror 114 are disposed perpendicularly to a plane defined by the X and Z axes and at a predetermined angle θ (0<θ<90°) in relation to a direction in which the laser beam is incident (namely, Z direction).

An arbitrary one of the incident laser beams upon the beam splitter 102, taken as a laser beam L51, will be explained below.

The fist BS 112 is provided on the optical path of the laser beam L51. The first BS 112 splits the incident first laser beam L51 into transmitted and reflected parts at a ratio between transmission and reflection of 1:1. The transmitted part of the laser beam L51 is taken as a laser beam L52, and reflected part is taken as a laser beam L53.

The laser beam L52 is transmitted through the first BS 112 into the substrate 111. Going into the substrate 111, the laser beam L52 is refracted at a predetermined angle. The refracted laser beam L52 passes through the substrate 111 and is incident upon the second BS 113. Also, the laser beam L53 is reflected by the first BS 112 and then incident upon the substrate 111. The laser beam L53 is reflected by the mirror 114 and then indicated upon the substrate 111, Incident upon the substrate 111, the laser beam L53 is refracted at a predetermined angle. The refracted laser beam L53 passes through the substrate 111 and is incident upon the second BS 113.

The second BS 113 is provided on the optical paths of the laser beams L52 and L53. The second BS 113 splits each of the incident laser beams L52 and L53 into transmitted and reflected parts at a ratio of 1:1 between transmission and reflection. The transmitted part of the laser beam L52 is taken as a laser L54, while the reflected part is taken as a laser beam L55. The transmitted part of the laser beam L53 is taken as a laser beam L56, while the reflected part is taken as a laser L57.

The laser beam L54 is transmitted through the second BS 113 and goes to outside the substrate 111. Going to outside the substrate 111, the laser beam L54 is refracted at a predetermined angle.

The laser beam L55 is reflected by the second BS 113, passes through the substrate 111, and goes from the side 111a to outside the substrate 111. The laser beam L55 is refracted at a predetermined angle when going to outside the substrate 111, and then incident upon the mirror 114. The laser beam L55 is reflected by the mirror 114, and then incident again upon the substrate 111. When being incident upon the substrate 111, the laser beam L55 is refracted. The laser beam L55 passes through the substrate 111, and goes from the side 111b to outside the substrate 111. Going to outside the substrate 111, the laser beam L55 is refracted at a predetermined angle.

The laser beam L56 is transmitted through the second BS 113 and goes to outside the substrate 111. Going to outside the substrate 111, the laser beam L56 is refracted at a predetermined angle.

The laser beam L57 is reflected by the second BS 113, passes through the substrate 111, and goes from the side 111a to outside he substrate 111. When going to outside the substrate 111, the laser beam L57 is refracted at a predetermined angle, and incident upon the mirror 114. The laser beam L57 is reflected by the mirror 114, and then incident again upon the substrate 111. When being incident upon the substrate 111, the laser beam L57 is refracted. The laser beam L57 passes through the substrate 111, and goes from the side 111b to outside the substrate 111. Going to outside the substrate 111, the laser beam L57 is refracted at a predetermined angle.

Note that the distance t0 from the first BS 112 to the mirror 114, and the distance t1 from the first BS 112 to the second BS 113, depend upon the coherence length L set for the laser source and construction of the light irradiator 95. The distance t0 should be set as given by the following expression (17):

$$t0 \geq \{(L_{max}-L_{min})+L\}/2 \times (1-\sin^2\theta_2)^{-1/2} \quad (17)$$

where $L_{min}$ is the optical path length of one, whose optical length is the shortest, of a plurality of laser beams from the light irradiator 95 and $L_{max}$ is the optical path length of one, whose optical path length is the longest, of the laser beams.

The distance t1 should be set as given by the following expression (18):

$$t1 \geq \{(L_{max}-L_{min})+L\}/2 \times (n^2-\sin^2\theta_2)^{-1/2} \quad (18)$$

where n is the refractive index of th substrate 111.

Also, the interval between two successive ones of the first to fourth laser beams L54 to L57 outgoing from the substrate 111 is set equal to the beam diameter $\phi$.

Figure 29:
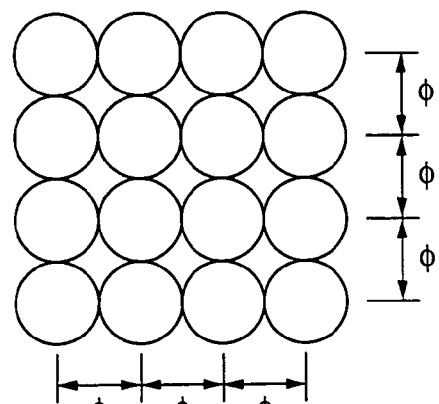
FIG. 29 shows the arrangement of optical axes of the laser beam emitted in the laser annealing apparatus as the ninth embodiment of the present invention shown in FIG. 26.

As shown in FIG. 29, the beam splitter 102 constructed as above can provide sixteen laser beams oriented in parallel at intervals (equal to the beam diameter) $\phi$ in a plane in the X-Y direction and not coherent with each other.

Figure 30:
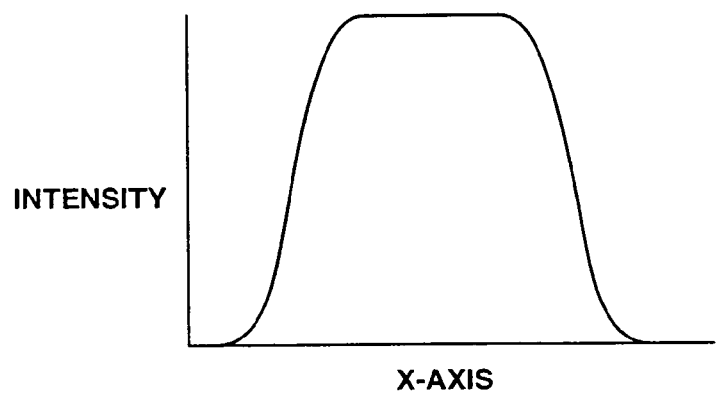
FIG. 30 shows an X-directional intensity distribution of the laser beam emitted to a substrate from the laser annealing apparatus as the ninth embodiment of the present invention shown in FIG. 26.
Figure 31:
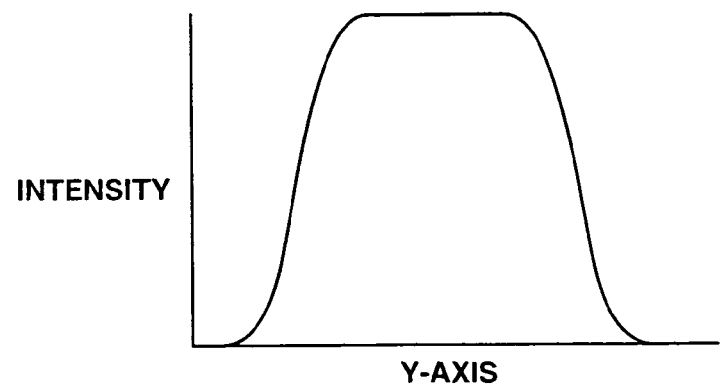
FIG. 31 shows a Y-directional intensity distribution of the laser beam emitted to a substrate from the laser annealing apparatus as the ninth embodiment of the present invention shown in FIG. 26.

In the laser annealing apparatus 100 as the ninth embodiment of the present invention, laser beams are multiplexed and split two-dimensionally to produce group of sixteen incoherent laser beams arrayed at intervals (equal to the beam diameter) $\phi$ in the form of a matrix. This group of laser beams is irradiated to the substrate 1 for annealing. Thus, the intensity of a laser spot focused on the substrate 1 can be distributed homogeneously in the X and Y directions as shown in FIGS. 30 and 31, for example.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A light irradiator comprising:
a laser source which emits a laser beam; a beam splitting means for splitting a laser beam emitted from the laser source into a plurality of laser beams; and
an irradiating means for receiving the plurality of laser beams incident thereupon and irradiating the incident laser beams to an object to be irradiated with the laser beams;
the beam splitting means including:
k (k is a natural number larger than 1) beam splitters each having a beam splitting surface which splits an incident laser beam into two laser beams, namely, reflected and transmitted parts, by reflecting and transmitting, the beam splitting surfaces being disposed in parallel to each other; and
a reflecting mirror having a light reflecting surface parallel to the beam splitting surface of each beam splitter and upon which the reflected parts from all the beam splitters is incident;
the laser beam emitted from the laser source being incident upon the first one, counted from the laser source, of the beam splitters;
the laser beam transmitted through the m-th beam splitter and the laser beam reflected by the m-th beam splitter and then by the reflecting mirror being incident upon the (m+1)th (m is a natural number) beam splitter;
the k-th beam splitter providing $2^{(k-1)}$ transmitted beams;
the reflecting mirror reflecting $2^{(k-1)}$ reflected parts incident thereupon from the k-th beam splitter; and
the distance between the beam splitting surface of the first beam splitter and that of the (m+1)th beam splitter, and the distance between the beam splitting surface of the first beam splitter and the reflecting surface of the reflecting mirror, being adjusted for an optical path difference between $2^k$ outgoing laser beams to be larger than a coherence length of the laser beam emitted from the laser source, and
the distance between the beam splitting surface of the m-th beam splitter and that of the (m+1)th beam splitter is larger than $(2^{(m-1)} \times L)/(2 \cos\theta)$ (where $\theta$ is an incident angle of a laser beam incident upon each beam splitter, and L is a coherence length of a laser beam emitted from the laser source).

2. The light irradiator as set forth in claim 1, wherein:
the distance between the beam splitting surface of the first beam splitter and the beam splitting surface of the reflecting mirror is larger than $L/(2 \cos \theta)$ (where $\theta$ is an incident angle of a laser beam incident upon each beam splitter, and L is a coherence length of a laser beam emitted from the laser source).

3. The light irradiator as set forth in claim 2, wherein the light intensity ratio between the reflected and transmitted beams split by the beam splitting surface of the beam splitter is 1:1.

4. The light irradiator as set forth in claim 2, wherein a light-transmissive material is disposed between the beam splitters to integrate the plurality of beam splitters with each other.

5. The light irradiator as set forth in claim 2, wherein a light-transmissive material is disposed between the beam splitter and reflecting mirror to integrate the plurality of beam splitters with each other.

6. The light irradiator as set forth in claim 1, wherein the laser source is a solid-state laser.

7. The light irradiator as set forth in claim 1, wherein the laser source is a semiconductor laser.

8. The light irradiator as set forth in claim 1, wherein the laser source emits a laser beam by pulse oscillation.

9. The light irradiator as set forth in claim 1, further comprising a parallelizing means for shaping a laser beam emitted from the laser source into a parallel beam;
the irradiating means being composed of more than one lens upon which the plurality of laser beams from the beam splitting means are incident.

10. The light irradiator as set forth in claim 1, further comprising a plurality of focusing lenses which focus the each laser beams coming from the beam splitting means;
the irradiating means receiving the laser beams incident thereupon through the plurality of focusing lenses.

11. The light irradiator as set forth in claim 1, wherein the irradiating means irradiates the plurality of laser beams to the same area.

12. The light irradiator as set forth in claim 1, comprising:
a plurality of laser sources; and a timing controlling means for timing in the emission of laser beams from the plurality of laser sources.

13. The light irradiator as set forth in claim 12, wherein each of the plurality of laser sources is a solid-state laser.

14. The light irradiator as set forth in claim 12, wherein each of the plurality of laser sources is a semiconductor laser.

15. The light irradiator as set forth in claim 12, wherein each of the plurality of laser sources emits a laser beam by pulse oscillation.

16. A laser annealing apparatus comprising:
a stage on which an object to be irradiated light is to be mounted;
a laser source which emits a laser beam;
a beam splitting means for splitting a laser beam emitted from the laser source into a plurality of laser beams; and
an irradiating means for receiving the plurality of laser beams incident thereupon and irradiating the incident laser beams to an object to be irradiated the laser beams;
the beam splitting means including:
k (k is a natural number larger than 1) beam splitters each having a beam splitting surface which splits an incident laser beam into two laser beams, namely, reflected and transmitted parts, by reflecting and transmitting, the beam splitting surfaces being disposed in parallel to each other; and
a reflecting mirror having a light reflecting surface parallel to the beam splitting surface of each beam splitter and upon which the reflected parts from all the beam splitters is incident;
the laser beam emitted from the laser source being incident upon the first one, counted from the laser source, of the beam splitters;
the laser beam transmitted through the m-th beam splitter and the laser beam reflected by the m-th beam splitter and then by the reflecting mirror being incident upon the (m+1)th (m is a natural number) beam splitter;
the k-th beam splitter providing $2^{(k-1)}$ transmitted beams;
the reflecting mirror reflecting $2^{(k-1)}$ reflected parts incident thereupon from the k-th beam splitter; and
the distance between the beam splitting surface of the first beam splitter and that of the (m+1)th beam splitter, and the distance between the beam splitting surface of the first beam splitter and the reflecting surface of the reflecting mirror, being adjusted for an optical path difference between $2^k$ outgoing laser beams to be larger than a coherence length of the laser beam emitted from laser source, and
a distance between the beam splitting surface of the m-th beam splitter and that of the (m+1)th beam splitter is larger than $(2^{(m-1)} \times L)/(2 \cos \theta)$ (where $\theta$ is an incident angle of a laser beam incident upon each beam splitter, and L is a coherence length of a laser beam emitted from the laser source).

17. The laser annealing apparatus as set forth in claim 16, wherein:
the distance between the beam splitting surface of the first beam splitter and the beam splitting surface of the reflecting mirror is larger than $L/(2 \cos \theta)$ (where $\theta$ is an incident angle of a laser beam incident upon each beam splitter, and L is a coherence length of a laser beam emitted from the laser source).

18. The laser annealing apparatus as set forth in claim 17, wherein the light intensity ratio between the reflected and transmitted beams split by the beam splitting surface of the beam splitter is 1:1.

19. The laser annealing apparatus as set forth in claim 17, wherein a light-transmissive material is disposed between the beam splitters to integrate the plurality of beam splitters with each other.

20. The laser annealing apparatus as set forth in claim 17, wherein a light-transmissive material is disposed between the beam splitter and reflecting mirror to integrate the plurality of beam splitters with each other.

21. The laser annealing apparatus as set forth in claim 16, wherein the laser source is a solid-state laser.

22. The laser annealing apparatus as set forth in claim 16, wherein the laser source is a semiconductor laser.

23. The laser annealing apparatus as set forth in claim 16, wherein the laser source emits a laser beam by pulse oscillation.

24. The laser annealing apparatus as set forth in claim 16, further comprising a parallelizing means for shaping a laser beam emitted from the laser source into a parallel beam;
the irradiating means being composed of more than one laser upon which the plurality of laser beams from the beam splitting means are incident.

25. The laser annealing apparatus as set forth in claim 16, further comprising a plurality of focusing lenses which focus condense the each laser beams coming from the beam splitting means;

the irradiating means receiving the laser beams incident thereupon through the plurality of focusing lenses.

26. The laser annealing apparatus as set forth in claim 16, wherein the irradiating means irradiates the plurality of laser beams to the same area.

27. The laser annealing apparatus as set forth in claim 16, comprising:
   a plurality of laser sources; and
   a timing controlling means for timing in the emission of laser beams from the plurality of laser sources.

28. The laser annealing apparatus as set forth in claim 27, wherein each of the plurality of laser sources is a solid-state laser.

29. The laser annealing apparatus as set forth in claim 27, wherein each of the plurality of laser sources is a semiconductor laser.

30. The laser annealing apparatus as set forth in claim 27, wherein each of the plurality of laser sources emits a laser beam by pulse oscillation.

31. An optically-coupled device comprising:
   a first optical means with an optical surface which reflects a part of a first coherent beam incident thereupon at one side thereof while allowing the rest of the first coherent beam to pass through, and allows a part of a second coherent beam incident thereupon at the other side thereof to pass through and multiplexes the transmitted part of the second coherent beam and the reflected part of the first coherent beam coaxially to form a first resultant beam while reflecting the rest of the second coherent beam and multiplexing the reflected part of the second coherent beam and the transmitted rest of the first coherent beam coaxially to provide a second resultant beam; and
   a second optical means with an optical surface provided in parallel to the first optical means to reflect the second resultant beam in a direction parallel to the first resultant beam; the incident angle of the first coherent beam being adjusted; and
   the optical surfaces of the first and second optical means being disposed such that the optical path difference between the first and second resultant beams is larger than the length of coherence between the first and second coherent beams and optical axis of the first and second resultant beams are at a predetermined distance from each other.

32. The optically-coupled device as set forth in claim 31, further comprising a light transmitting means provided between the optical surfaces of the first and second optical means and which has a refractive index n;
   the first coherent beam being incident at an angle $\theta_1$ upon the first optical means at the optical surface of the latter while the second coherent beam is incident at an angle $\theta_2$ upon the second optical means at the optical surface of the latter;
   the first and second coherent beams being equal in wavelength to each other and not interfering with each other; and
   the angles $\theta_1$ and $\theta_2$ being in a relation given by the following expression (1):

$$n \sin \theta_1 = \sin \theta_2 \quad (1).$$

33. The optically-coupled device as set forth in claim 31, wherein of the optical surface of the first optical means, the reflectance is equal to the transmittance.

34. The optically-coupled device as set forth in claim 32, wherein the distance between the optical surfaces of the first and second optical means is set as given by the following expression (2):

$$t \leq L/2 \times (1 - \sin^2 \theta_2)^{1/2} \quad (2)$$

where L is a distance of coherence between the first and second coherent beams.

35. The optically-coupled device as set forth in claim 32, wherein:
   the first and second coherent beams are equal in diameter to each other; and the distance t between the first and second coherent beams is set as given by the following expression (3):

$$t = \phi(n^2 - \sin^2 \theta_2)^{1/2} / \sin 2\theta_2 \quad (3)$$

where $\phi$ is the diameter of the first and second coherent beams.

36. An optically-coupled device comprising:
   a substrate formed from a light-transmissive material having a refractive index n to have first and second flat surfaces parallel to each other;
   a beam splitting coating formed on the first surface and having a reflectance and transmittance which are equal to each other;
   a first anti-reflection coating formed on the first surface;
   a second anti-reflection coating formed on the second surface; and
   a reflection coating formed on the second surface;
   the first surface having the area thereof divided into two in an arbitrary direction perpendicular to a direction in which the first and second surfaces are opposite to each other to define first and second sub-areas, counted from one end, of which the first sub-area has the beam splitting coating formed thereon while the second sub-area has the first anti-reflection coating formed thereon; and
   the second surface having the area thereof divided into two in the arbitrary direction to define first and second sub-areas, counted from the one end, of which the first sub-area has the second anti-reflection coating formed thereon while the second sub-area has the reflection coating formed thereon.

37. An optically-coupled device comprising:
   a substrate formed from a light-transmissive material having a refractive index n to have first and second flat surfaces parallel to each other;
   a beam splitting coating formed on the first surface and having a reflectance and transmittance which are equal to each other;
   a first anti-reflection coating formed on the first surface;
   a second anti-reflection coating formed on the first surface;
   a reflection coating formed on the second surface; and
   a third anti-reflection coating formed on the second surface;
   the first surface having the area thereof divided into three in an arbitrary direction perpendicular to a direction in which the first and second surfaces are opposite to each other to define first, second and third sub-areas, counted from one end, of which the first sub-area has the first anti-reflection coating formed thereon, the second sub-area has the beam splitting coating formed thereon, and the third sub-area has the second anti-reflection coating formed thereon;
   the second surface having the area thereof divided into two in the arbitrary direction to define first and second sub-areas, counted from the one end, of which the first area has the reflection coating formed thereon while the second area has the third anti-reflection coating formed thereon; and a reflecting mirror being provided on the first surface in parallel to the first and second surfaces.

38. A light irradiator comprising:
a first irradiating means for irradiating a first coherent beam;
a second irradiating means for irradiating a second coherent beam; and
an optically-coupled device;
the optically-coupled device including:
a first optical means with an optical surface which reflects a part of a first coherent beam incident thereupon at one side thereof while allowing the rest of the first coherent beam to pass through, and allows a part of a second coherent beam incident thereupon at the other side thereof to pass through and multiplexes the transmitted part of the second coherent beam and the reflected part of the first coherent beam coaxially to form a first resultant beam while reflecting the rest of the second coherent beam and multiplexing the reflected part of the second coherent beam and the transmitted rest of the first coherent beam coaxially to provide a second resultant beam; and
a second optical means with an optical surface provided in parallel to the first optical means to reflect the second resultant beam in a direction parallel to the first resultant beam;
an incident angle of the first coherent beam with the optical surface of the first optical means being adjusted; and
the optical surfaces of the first and second optical means being disposed such that the optical path difference between the first and second resultant beams is larger than the length of coherence between the first and second coherent beams and the first and second resultant beams are at a predetermined distance from each other.

39. The light irradiator as set forth in claim 38, wherein the optically-coupled device further comprises a light transmitting means provided between the optical surfaces of the first and second optical means and which has a refractive index n;
the first coherent beam being incident at an angle $\theta_1$ upon the first optical means at the optical surface of the latter while the second coherent beam is incident at an angle $\theta_2$ upon the second optical means at the optical surface of the latter;
the first and second coherent beams being equal in wavelength to each other and not interfering with each other; and
the angles $\theta_1$ and $\theta_2$ being in a relation given by the following expression (1):

$$n \sin \theta_1 = \sin \theta_2 \qquad (1).$$

40. The light irradiator as set forth in claim 38, wherein of the optical surface of the first optical means, the reflectance is equal to the transmittance.

41. The light irradiator as set forth in claim 39, wherein the distance between the optical surfaces of the first and second optical means is set as given by the following expression (2):

$$t \geq L/2 \times (1-\sin^2 \theta_2)^{-1/2} \qquad (2)$$

where L is a distance of coherence between the first and second coherent beams.

42. The light irradiator as set forth in claim 39, wherein:
optical axis of the first and second coherent beams are equal in diameter to each other; and
the distance t between the first and second coherent beams is set as given by the following expression (3):

$$t = \phi(n^2 - \sin^2 \theta_2)^{1/2}/\sin 2\theta_2 \qquad (3)$$

where $\phi$ is the diameter of the first and second coherent beams.

43. The light irradiator as set forth in claim 38, wherein:
the optically-coupled device has formed on one flat surface thereof the beam splitting coating and first anti-reflection coating, and on the other flat surface thereof a reflection surface as the reflecting means and the second anti-reflection coating;
the first irradiating means irradiates the first coherent beam for incidence upon the beam splitting coating through inside the substrate by irradiating the first coherent beam to the second anti-reflection coating at an angle $\theta_2$;
the second irradiating means irradiates the second coherent beam for incidence upon the beam splitting coating from outside the substrate;
the beam splitting coating irradiates the first resultant beam while irradiating the second resultant beam for passing through the substrate and incidence upon the reflection surface as the reflecting means; and
the reflection surface as the reflecting means reflects the second resultant beam while irradiating the second resultant beam through the first anti-reflection coating to outside.

44. The light irradiator as set forth in claim 38, wherein:
the optically-coupled device has formed on one flat surface thereof the beam splitting coating, first and second anti-reflection coatings, and on the other flat surface thereof a reflection surface and the third anti-reflection coating;
the first irradiating means irradiates the first coherent beam for incidence upon the beam splitting coating through the first anti-reflection coating and reflection coating by irradiating the first coherent beam to the first anti-reflection coating at an angle $\theta_2$;
the second irradiating means irradiates the second coherent beam for incidence upon the beam splitting coating from outside the substrate;
the beam splitting coating irradiates the second resultant beam through the third anti-reflection coating to outside while irradiating the first resultant beam for incidence upon the reflecting means; and
the reflecting means reflects the first resultant beam and irradiates the reflected first resultant beam through the second and third anti-reflection coatings to outside.

45. The light irradiator as set forth in claim 38, wherein:
the first irradiating means irradiates first g (g is an integer larger than 2) coherent beams oriented in parallel along a plane perpendicular to the beam splitting coating;
the second irradiating means irradiates second g coherent beams oriented in parallel along the plane perpendicular to the beam splitting coating; and
the h-th one (h is an integer larger than 1 and smaller than g) of the first coherent beams and h-th one of the second coherent beams are incident upon the beam splitting coating at the same position on the latter.

* * * * *